(12) United States Patent
Meyers et al.

(10) Patent No.: US 7,594,264 B2
(45) Date of Patent: Sep. 22, 2009

(54) PERFORMING ARTIST TRANSACTION SYSTEM AND RELATED METHOD

(76) Inventors: Eric F. Meyers, 125 Shell St., Manhattan Beach, CA (US) 90266; Steve E. Yarovinsky, 6665 Franklin Ave., #5, Hollywood, CA (US) 90028

( * ) Notice: Subject to any disclaimer, the term of this patent is extended or adjusted under 35 U.S.C. 154(b) by 632 days.

(21) Appl. No.: 10/057,845

(22) Filed: Jan. 24, 2002

(65) Prior Publication Data
US 2003/0139938 A1 Jul. 24, 2003

(51) Int. Cl.
*H04L 29/02* (2006.01)
(52) U.S. Cl. .......................... 726/21; 726/27
(58) Field of Classification Search ............ 726/18–19, 726/21, 27–30; 717/169, 175
See application file for complete search history.

(56) References Cited

U.S. PATENT DOCUMENTS

2001/0014948 A1* 8/2001 Ooki et al. .................. 713/201
2002/0129037 A1* 9/2002 Nathan ..................... 707/104.1

OTHER PUBLICATIONS http://www.castnet.com; Date of first application Oct. 1996 Found on http://web.archive.org/web/2001 Retreived on Aug. 17, 2005.*
http://www.joecipriano.com/login_client.asp, retrieved on Aug. 17, 2005.*
www.castnet.com.*
H. Mendelsohn, "The Online Casting Couch?," MicroTimes (1997), http://actors.castnet.net/pressroom/microtimes/microtimes.html. Accessed on Sep. 17, 2001.
B. Riggs, "Case Study—The Hollywood Connection—Citywide VPN Connects Agents, Actors, and Directors Throughtout Hollywood," LANTIMES Online (Jun. 22, 1998), http://actors.castnet.net/pressroom/lantimes/lantimes.html. Accessed on Sep. 17, 2001.

(Continued)

*Primary Examiner*—Gilberto Barron, Jr.
*Assistant Examiner*—Perungavoor Venkat
(74) *Attorney, Agent, or Firm*—Roberts, Mlotkowski, Safran & Cole, P.C.

(57) ABSTRACT

A method is provided for facilitating transactions involving a plurality of performing artists and a plurality of talent representative entities. Each of the performing artists is associated with one of the talent representative entities. The method includes storing on a machine-readable medium a plurality of talent files. Each of the talent files is associated with one of the plurality of performing artists and contains talent information for the one of the plurality of the performing artists. The method further includes enabling access to the stored talent file of the one of the plurality of performing artists by the one of the talent representative entities associated with the one of the plurality of performing artists, and denying access to the talent file of the one of the plurality of performing artists by the talent representative entities other than the one of the talent representative entities associated with the one of the plurality of performing artists. A related system also is provided. According to another aspect, a guest pass is provided so that unregistered guests may selectively access the talent file information.

57 Claims, 39 Drawing Sheets

OTHER PUBLICATIONS

M. Graser, "Actors Post Streaming Video, Resumes on Castnet.com," Variety.com (Nov. 16, 1998), http://actors.castnet.net/pressroom/variety/variety.html. Accessed on Sep. 17, 2001.

Miss Information, "How to Become a Movie Star . . . Sorta," The HSX Journal (Dec. 4, 1998), http://actors.castnet.net/pressroom/hsx/hsx.html. Accessed on Sep. 17, 2001.

R. Kozlowski & C. Kaufman, "Castnet.com Brings Agents, Casting Directors Online," Perform Ink (Dec. 4, 1998), http://actors.castnet.net/pressroom/performink/performink.html. Accessed on Sep. 17, 2001.

V. Kopytoff, "For Actors and Agents, Online Links to Casting Directors," The New York Times on the Web (Dec. 31, 1998), http://actors.castnet.net/pressroom/newyorktimes/index.html. Accessed on Sep. 17, 2001.

R. Kendt, The Hollywood Reporter (1999), http://actors.castnet.net/pressroom/hollywoodreporter/index.html. Accessed on Sep. 17, 2001.

C. Barton-Ross, "Hollywood and the Internet," Location Update (Mar. 1999), http://actors.castnet.net/pressroom/locationupdate/index.html. Accessed on Sep. 17, 2001.

P. McGlone, "Casting a Net for New Jersey Talent," The Star-Ledger (Mar. 28, 1999), http://actors.castnet.net/pressroom/starledger/index.html. Accessed on Sep. 17, 2001.

D. Monroe, "Fishing for Talent—Digitally," Wired News (Apr. 15, 1999), http://actors.castnet.net/pressroom/wired/index.html. Accessed on Sep. 17, 2001.

Internet Web Site: Castnet.com, http://www.castnet.com. Accessed on Jul 11, 2002 or Sep. 17, 2001. (9 pages).

Internet Web Site: ShowBizKid.com, http://www.showbizkid.com/thesite/aboutus.html. Accessed on Sep. 17, 2001. ( 1 page).

Internet Web Site: The Link, http://www.submitlink.com. Accessed on Sep. 17, 2001. (2 pages).

Internet Web Site: Academy Players Directory, http://www.acadpd.org. Accessed on Sep. 17, 2001. (7 pages).

T. Swanson, "Casting a Wide 'Net," eV (Oct. 2000), http://actors.castnet.net/pressroom/ev/10-2000.html. Accessed on Sept. 17, 2001.

A. Dellaflora, "Online Casting Service Widens Locals' Exposure," Albuquerque Journal (Apr. 18, 1999), http://actors.castnet.net/pressroom/albuquerquejournal/index.html. Accessed on Sept, 17, 2001.

M. Mackaron, "Review Your Casting Opportunities," The SAG New Mexico Actor Newsletter (Jul. 1999), http://actors.castnet.net/pressroom/sagnewmexico/index.html. Accessed on Sept 17, 2001.

D. Scheraga, "This is the Modern World, How the Web is Becoming the New Casting Central," Show Business Weekly (Jul. 14-20, 1999), http://actors.castnet.net/pressroom/showbusiness/index.html. Accessed on Sep. 17, 2001.

J. Pesselnick, "Hollywood's New Method—Online Casting," Weekly Variety (Aug. 23-29, 1999), http://actors.castnet.net/pressroom/variety/990901.htm. Accessed on Sep. 17, 2001.

B. Orwall, "The End of Schmooze?," The Wall Street Journal (Mar. 20, 2000), http://actors.castnet.net/pressroom/wsj/000320.html. Accessed on Sep. 17, 2001.

M. Graser, "PGA Gives Blessing to Castnet.com Site," Daily Variety (Mar. 21, 2000), http://actors.castnet.net/pressroom/variety/000321.html. Accessed on Sep. 17, 2001.

C. Ayon Lee, "Hollywood Eyes the Dot-com Life," dbusiness.com (Apr. 7, 2000), http://actors.castnet.net/pressroom/dbusiness/dbusiness.html. Accessed on Sep. 17, 2001.

"Virtual Casting," IFILM News (May 4, 2000), http://actors.castnet.net/pressroom/ifilmnews/index.html. Accessed on Sep. 17, 2001.

"Screen Testing, Thanks to the Internet, That Next Big Casting Call May Come Via the Modem," Movieline Magazine (May & Jul. 2000), http://actors.castnet.net/pressroom/movieline/index.html. Accessed on Sep. 17, 2001.

* cited by examiner

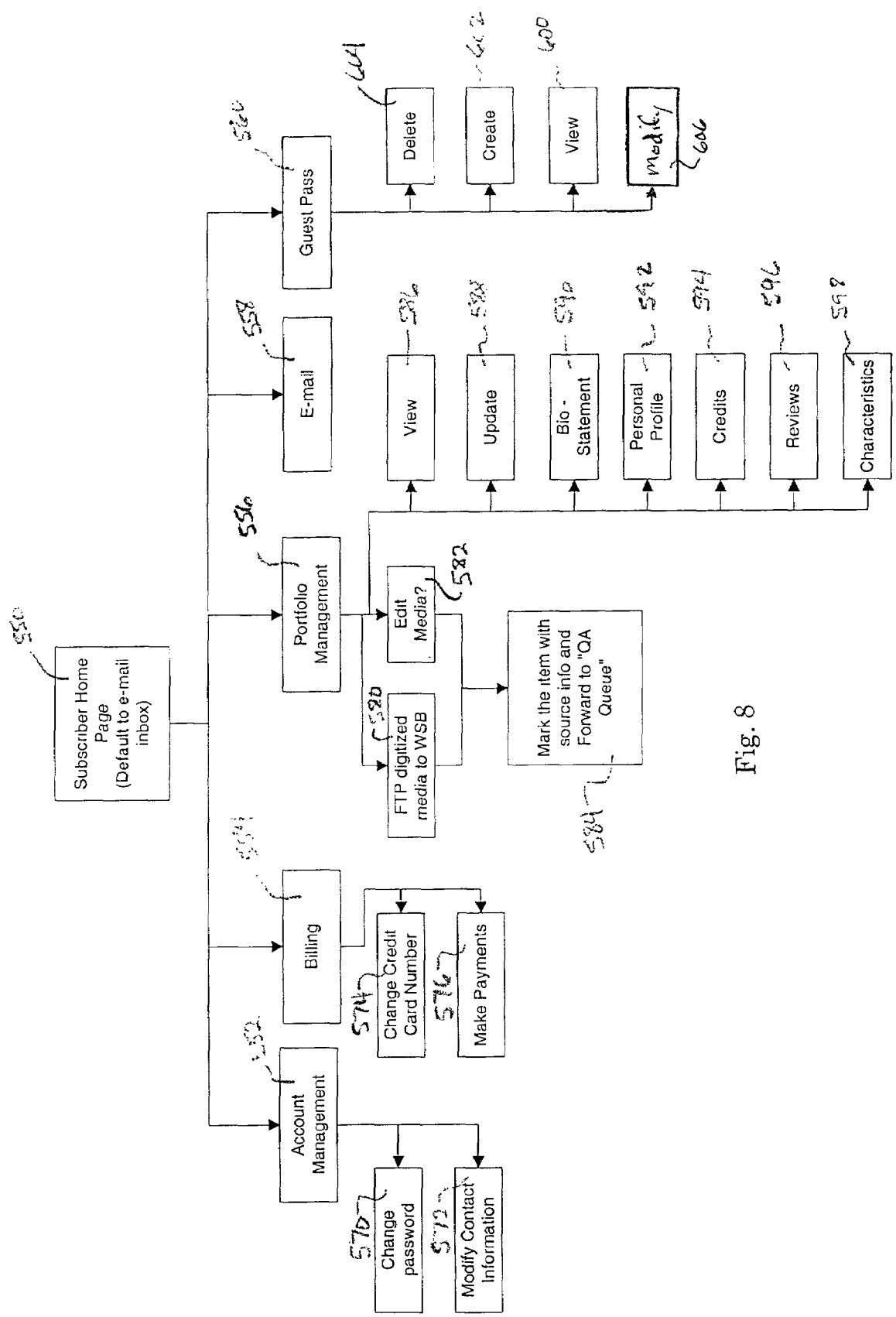

clients | create client | log out world showbiz.com

AGENCY ADMIN

Client List

Client List

Search Criteria
- Last name starts with: [    ]  Gender: [   ]
- Playing age range min: [    ] max [    ]

[Search]

| Client | Agent(s) |
|---|---|

[Next 10 >]

☐ PHOTO  Client 1    Agent 1

☐ PHOTO  Client 2    Agents 1 and 2

☐        John Doe    Agent 2

☐ PHOTO  Client 3    Agent 1

☐ PHOTO  Client 4    Agent 2

☐ PHOTO  Client 5    Agent 3

☐        Betty Johnson   Agent 2

[Next 10 >]

[Delete Checked Items]

Fig. 19

Fig. 20 world showbiz.com clients | create client | logout
Portfolio | profile | credits | media | view resume | AGENCY ADMIN

Portfolio

Client 1

Playing age range: 20 - 30
Availability: Oct 9 - Dec 10
Agent(s): Agent 1
Union(s): S.A.G.
Client ID: 5128

Video Clips

There are no video clips for this client

Client Credits

| Film: Title | Role | Studio/Prod. Co. | Director | Year |
|---|---|---|---|---|
| Film 1 | Cook | Studio 1 | Director 1 | 1995 |
| Film 2 | guy in space | Studio 2 | Director 2 | 1992 |

Credits

Client: Client 1

Film

| Delete | Title | Role | Studio/Prod. Co | Director | Year | |
|---|---|---|---|---|---|---|
| | | | | | | Add |
| ☐ | Film 1 | Cook | Studio 1 | Director 1 | 1995 | Edit |
| ☐ | Film 2 | guy in space | Studio 2 | Director 2 | 1992 | Edit |

Television

| Delete | Title | Role | Network | Studio/Prod. Co | Director | Year | |
|---|---|---|---|---|---|---|---|
| | | | | | | | Add |

Theater

| Delete | Title | Role | Theater/Co. | Director | Year | |
|---|---|---|---|---|---|---|
| | | | | | | Add |

Commercial

| Delete | Sponsor/Title | Role | Media | Director | Year | |
|---|---|---|---|---|---|---|
| | | | | | | Add |

Other

| Delete | Title | Role | Studio/Prod. Co. | Director | Year | |
|---|---|---|---|---|---|---|
| | | | | | | Add |

Delete Checked Items

Fig. 23

Credits

Client: Client 1

Film

| Delete | Title | Role | Studio/Prod. Co | Director | Year | |
|--------|-------|------|-----------------|----------|------|---|
| | | | | | | Add |
| ☐ | Film 1 | Cook | Studio 1 | Director 1 | 1995 | Edit |
| ☐ | Film 2 | guy in space | Studio 2 | Director 2 | 1992 | Edit |

Television

| Delete | Title | Role | Network | Studio/Prod. Co | Director | Year | |
|--------|-------|------|---------|-----------------|----------|------|---|
| | | | | | | | Add |

Theater

| Delete | Title | Role | Theater/Co. | Director | Year | |
|--------|-------|------|-------------|----------|------|---|
| | | | | | | Add |

Commercial

| Delete | Sponsor/Title | Role | Media | Director | Year | |
|--------|---------------|------|-------|----------|------|---|
| | | | | | | Add |

Other

| Delete | Title | Role | Studio/Prod. Co. | Director | Year | |
|--------|-------|------|------------------|----------|------|---|
| | | | | | | Add |

Delete Checked Items

Fig. 25

Client 1

S.A.G.

Represented by
WSB Agency
Agent 1
123-456-7890

| Film Title | Role | Studio/Prod. Co. | Director | Year |
|---|---|---|---|---|
| Film 1 | Cook | Studio 1 | Director 1 | 1995 |
| Film 2 | guy in space | Studio 2 | Director 2 | 1992 | world showbiz.com

| submissions | portfolio | resume | create submission | logout |

AGENT STEVE YAROVINSKY

Portfolio                                                            (this is not me)

PHOTO

Client 1

Playing age range: 2 - 15
Availability  7/20/01
Agent(s)  Agents 1 and 2
Union(s). A.F.T.R.A., S.A.G.

Video Clips
There are no video clips for this client

Client Credits

| Film Title | Role | Studio/Prod Co | Director | Year |
|---|---|---|---|---|
| Film 3 | same old bs | Studio 3 | Director 3 | 2001 |
| Film 4 | Hero | Studio 4 | Director 4 | 1997 |
| Film 5 | Lt | Studio 5 | Director 5 | 1996 |

*Agent 1*

| | |
|---|---|
| From: | Agent1@WSB.com |
| Sent: | Thursday, January 24, 2002 |
| To: | John@studio6.com |
| Subject: | Submission for Film 6 |

To whom it may concern,

Enclosed please find my suggestion for "Film 6".
To view my submission, go to the following website:

http://website.com

Note: To view the submission copy the link above and paste it in the address bar of your favorite browser.

*Agent 1*

Fig. 36

PERFORMING ARTIST TRANSACTION SYSTEM AND RELATED METHOD

BACKGROUND OF THE INVENTION

1. Field of the Invention

The present invention relates to automated and/or semi-automated systems and methods for managing and/or facilitating transactions in which the services, endorsements, etc., of performing artists are offered to users or consumers of the same or sought by the latter.

2. Description of the Related Art

The performing arts include such fields as movies, films and cinematography, live theater productions, dance performances, television performances, television and other audio-visual advertising, radio, modeling, musical performances, and the like. Accordingly, performing artists, commonly referred to as "talent," include such people as actors and actresses, models, dancers, radio personalities, musicians or recording artists, and the like.

In the entertainment industry and others involving performing arts, it is of course necessary for those who are in the business of enlisting the services of performing artists' services, referred to generally herein as "industry talent consumers," to procure the services of performing artists. Similarly, it is necessary for performing artists to make themselves known to and available to these industry talent consumers.

From a demand perspective, industry talent consumers typically start with a "project" for which the services of one or more performing artists are needed. The project, for example, may comprise a movie, a television show, a commercial, a musical concert, and the like. As part of this project, there will be one or more "roles" that must be filled or satisfied by one or more performing artists. The industry talent consumer thus faces the need for high quality, highly skilled performing artists, who often must be uniquely qualified or suited for each of the roles in question, and of course must be available when needed. These often specific and unique needs sometimes arise suddenly, for example, as story lines or scripts change, as currently-enlisted performing artists become unavailable or unsuited for the role, etc.

In filling this demand, the industry talent consumer requires information about available performing artists. To obtain such information, it is generally necessary to first communicate information about the project and related roles so that the community of performing artists and their representatives are aware of the particular need for their services associated with the project. In traditional transactions involving performing artists, a common although merely illustrative scenario might involve the following circumstances. An industry talent consumer, having a new project with roles to be filled, provides notification to performing artists or their representative of this information. In the movie and television industries, for example, an announcement typically is made within the relevant performing arts community. This may involve notification by the producer of the producer's intent to make a new movie. The notice typically will include the nature of the movie, a summary of the plot, the characters or "roles" that will appear in the movie, etc. The notification typically will provide not only an identification of the role or roles to be filled, but also information on such role or roles. In the movie industry, this is commonly referred to as a "breakdown." The notification may be directed to a specific performing artist or specific performing artists, it may be directed to a specific agency or agencies, it may be broadcast to the general community of performing artists in the field, etc.

From the supply perspective, the performing artists of course generally want their services to be in demand, and want to be enlisted to fill the choice roles available at any given time. There is a strong demand among actors and actresses, for example, to obtain parts or roles in movies, television shows, advertising, etc. Similarly, there is substantial demand among musicians and musical groups to obtain engagements in which they may perform. The same can be said for nearly every performing arts field. The competition for choice roles can be and often is substantial. The movie and television ("TV") industries, for example, generally are characterized by having a very large number of performing artists who are vying for a relatively limited number of performance opportunities. Many more people would like to have starring roles in movies each year, for example, than there are starring roles available. Only a select number of performing artists are actually able to command these limited number of roles. It is necessary, therefore, as a practical matter in the performing arts fields, for performing artists to make themselves known to industry talent consumers.

To meet this need among performing artists to market themselves effectively, it has long been a custom in these industries that the performing artists compile information about themselves, referred to generally herein as "talent information," often in the form of a "portfolio," suitable for presentation to the industry talent consumers. The specific talent information that is compiled in a given instance depends upon the industry, the particular artist, his or her experience or credits, and potentially a host of other factors. In the movie, television, and like industries, for example, the talent information typically includes a front facial photograph (a "headshot"), a resume, and in some cases video or audio segments of the performing artist that demonstrate his or her performing abilities. In the radio industry, the talent information may comprise audio segments of the artist. In the modeling industry, the talent information typically comprises a photographic portfolio demonstrating the model in various settings, poses, etc.

It is common in the performing arts for the performing artist or talent to enlist the services of one or more talent representatives, such as talent agents, talent agencies, managers or the like. These representatives typically are individuals who are knowledgeable about the industry, and who typically have significant personal contacts with or otherwise have favorable access to the talent information users. Talent agents in the movie and television industries, for example, would be expected to know or at least have access to producers, directors, casting directors, studios, and other people and organizations who seek the services of performing artists. Accordingly, as part of the information flow, it is necessary to accommodate the roles and information flow requirements associated with these representative entities.

When a performing artist or his or her representative learns of the availability of a new role, it is important to submit talent information on the performing artist, in hopes of securing the role for that artist. It many cases it is critically important to respond as quickly as possible. This communication of talent information is known in some performing arts fields as a "submission." The submission may comprise the entire portfolio for that artist, but in many cases it comprises a selected portion of the portfolio specifically tailored to address the particular role at hand, and to maximize the interest of the industry talent user in that performing artist. This selected talent information may include, for example, photographs of the performing artist, sample film or video segments demonstrating the artist's acting ability, written information concerning the artists, e.g., such as other movies, plays, etc. in which the performing artist has performed, (e.g., ("credits"), audio segments that provide exemplars of the performing artist's voice, speech quality, command of the language, accent, etc., the availability of the performing artist, and the like. In a typical situation, the talent representative for the performing artist will draw from materials available to him or her to compile a collection of information on the performing artist suitable under the circumstances. This information is put into a form suitable for presentation to the user, and it is then physically transported to the user for consideration. Once the submission is made, the recipient can inspect and consider the materials and make an assessment as to whether the proposed performing artist is suitable for the role in question. Where there is a competition for the role, as is common, the submission may be used to aid in further analysis to determine which one among the various candidate performing artists is most suitable or desirable and will receive an award of the role.

Known approaches to these techniques of managing, compiling, submitting and using talent information regarding performing artists have been limited in a number of senses. Perhaps the most pronounced limitation resides in the fact that access to the talent information users typically is limited. The demands for access to talent information users, such as producers, casting directors, booking agents and the like typically is substantial. It is common for there to be many more performing artists, and aspiring performing artists, than there are talent information users. Moreover, talent information users often are not inclined to spend the potentially substantial resources of time, energy and money to evaluate a previously unknown performing artist. In addition, they commonly do not wish to be required to spend the resources to eliminate potentially large numbers of performing artists who are not appropriately qualified, not desirable under the circumstances, etc.

Another limitation lies in the potentially substantial logistical requirements and resource requirements involved in preparing and delivering performing artist information to the talent information user in a suitable form, e.g., in an attractive submission that is specifically tailored to the needs of the talent information user.

Another limitation of known approaches and techniques lies in the fact that many performing artists, particularly the very well known and popular established performing artists, do not always want their information shared, distributed, or otherwise provided to anyone other than specifically authorized talent information users. This is a common circumstance for well known actors who wish to maintain positive and vigilant control over access by the public to the actor's image, likeness, etc. Talent agents and agencies similarly generally do not want their information, e.g., the information of their clients, shared or otherwise accessed or used without specific authorization. This also includes the common desire among agencies for their talent information to be kept exclusive, and not provided to other agents or agencies not within or affiliated with their agency.

With the emergence of wide area networks such as the Internet and the World Wide Web, a number of sites have arisen that are intended to provide performing artists information. Some of these sites provide talent or performing artist information regarding performing artists who have subscribed to the site. The information on these sites is generally accessible to certain talent information users, so that any talent information user may access any talent file on the site. This is problematic in some situations in that it does not afford a satisfactory level of privacy and access control required by some talent information providers. Moreover, such sites typically do not permit subscribers to be organizations, or do not permit organizations to have control over such things as who is to be given access to their talent files.

OBJECTS OF THE INVENTION

Accordingly, an object of the present invention is to provide a system and method for facilitating transactions involving a plurality of talent information users and talent information providers wherein talent information and talent files can be transferred and/or communicated quickly, efficiently and cost effectively.

It is also an object of the present invention to provide a system and method for facilitating transactions involving a plurality of talent information users and talent information providers wherein access to selected ones of the talent files and the talent information is restricted and may be controlled.

It is also an object of the present invention according to another aspect to provide a system and method for facilitating transactions involving a plurality of talent information users and talent information providers wherein access to selected ones of the talent files and the talent information is restricted and may be controlled, but wherein limited or selected access to talent files and/or talent information may be provided to individuals or entities not normally authorized to access the files or information.

Additional objects and advantages of the invention will be set forth in the description which follows, and in part will be apparent from the description, or may be learned by practice of the invention. The objects and advantages of the invention may be realized and obtained by means of the instrumentalities and combinations pointed out in the appended claims.

SUMMARY OF THE INVENTION

To achieve the foregoing objects, and in accordance with the purposes of the invention as embodied and broadly described in this document, a method is provided for facilitating transactions involving a plurality of performing artists and a plurality of talent representative entities. Each of the performing artists is associated with one of the talent representative entities. The method comprises storing on a machine-readable medium a plurality of talent files. Each of the talent files is associated with one of the plurality of performing artists and comprises talent information for the one of the plurality of the performing artists. The method further comprises enabling access to the stored talent file of the one of the plurality of performing artists by the one of the talent representative entities associated with the one of the plurality of performing artists, and denying access to the talent file of the one of the plurality of performing artists by the talent representative entities other than the one of the talent representative entities associated with the one of the plurality of performing artists.

The one of the talent representative entities may comprise, for example, a talent representative, a talent agent, a plurality of talent agents within a talent agency, a group of affiliated talent agencies, a talent manager, and the like.

In accordance with a presently preferred version of the method, the one of the talent representative entities comprises a plurality of talent representatives. One of the talent representatives of the one of the talent representative entities is associated with the one of the plurality of the performing artists. Preferably, the enabling of access to the stored talent file of the one of the plurality of performing artists by the talent representative entity comprises enabling access to the stored talent file of the one of the plurality of performing artists to the talent representative associated with the one of the plurality of performing artists and denying access to the talent file of the one of the plurality of performing artists to talent representatives of the one of the talent representative entity other than the talent representative associated with the one of the plurality of performing artists.

The preferred version of the method comprises designating selected ones of the talent files as restricted access talent files, and associating with each of the restricted access talent files a restricted access talent file identifier. It also comprises enabling a talent information user to have access to the restricted access talent file identifiers, but denying the talent information user access to the talent information that comprises the restricted access talent files.

In a related aspect of the preferred but merely illustrative method, selected ones of the talent files are designated as restricted access talent files, and the preferred method comprises enabling a talent information user to conduct a search of the stored talent information to obtain a search output comprising at least one of the restricted access talent files. The search output excludes the talent information for each of the at least one restricted access talent files but includes a restricted access talent file identifier for each of the at least one restricted access talent files in the search output.

Optionally but preferably, the method further comprises issuing at least one guest pass for a guest pass accessible one of the talent files, communicating the at least one guess pass to a guest pass holder, and enabling access to the guest pass accessible one of the talent files to the guest pass holder.

In accordance with another aspect of the invention, a method is provided for facilitating transactions involving a plurality of performing artists, talent representatives and talent representative organizations. Each of the performing artists is associated with one of the talent representative organizations. The method comprises storing on a machine-readable medium a plurality of talent files. Each of the talent files is associated with one of the plurality of performing artists and comprises talent information for the one of the plurality of the performing artists. The method further comprises designating a talent representative organization administrator for each of the talent representative organizations, and using the talent representative organization administrator for one of the talent representative organizations to designate selected ones of the talent representatives within the one talent representative organization to be an authorized talent representative. The talent representative organization administrator has authority exclusive of the talent representatives of the one talent representative organization to make the designation of the authorized talent representative. The method further comprises enabling access by the authorized talent representative to the stored talent files of the performing artists associated with the one of the plurality of the talent representative organizations, and denying access to the talent files of the performing artists associated with the one of the talent representative organizations by the talent representatives other than the authorized talent representative. Preferably but optionally, the talent representative organization administrator designation comprises designating a plurality of talent representative organization administrators.

In accordance with a separate but related aspect of the invention, one of the plurality of talent representative organization administrators comprises a "super user." The method preferably but optionally comprises designating a super user for each of the talent representative organizations, and using the super user for the one of the talent representative organizations to designate the talent representative organization administrator.

In accordance with another aspect of the invention, a method is provided for facilitating transactions involving a plurality of performing artists and a talent information user. The method comprises storing on a machine-readable medium a plurality of talent files. Each of the talent files is associated with one of the plurality of performing artists and comprising talent information for the one of the plurality of the performing artists. The method also comprises designating selected ones of the talent files as restricted access talent files, and associating with each of the restricted access talent files a restricted access talent file identifier. It also comprises enabling the talent information user to have access to the restricted access talent file identifiers, but denying the talent information user access to the talent information that comprises the restricted access talent files.

Preferably, the method comprises enabling the talent information user to conduct a search of the stored talent information to obtain a search output comprising at least one of the restricted access talent files. The search output excludes the talent information for at least one restricted access talent files but includes a restricted access talent file identifier for each of the at least one restricted access talent files in the search output.

The method also optionally may comprise issuing to the talent information user an authorization pass for the at least one restricted access talent files, and enabling access to talent information in the at least one restricted talent files based upon the authorization pass. The authorization pass may comprise an access code, a password, a card, and the like.

In one preferred version of the method, the authorization pass enables the talent information user to access the talent information of the at least one restricted talent file for a limited period of time. The authorization pass also may enable the talent information user to access the talent information of the at least one restricted talent file for a limited number of accesses. The authorization pass also may enable the talent information user to access the talent information of the at least one restricted talent file for a limited portion of the at least one restricted talent files.

In accordance with another aspect of the invention, a method is provided for facilitating transactions involving a plurality of performing artists. The method comprises storing on a machine-readable medium a plurality of talent files wherein each of the talent files comprises talent information for the one of the plurality of the performing artists. The method also comprises issuing at least one guest pass for a guest pass accessible one of the talent files, communicating the at least one guess pass to a guest pass holder, and enabling access to the guest pass accessible one of the talent files to the guest pass holder.

Optionally but preferably, the guest pass may comprise an access code, a password, a card, and the like. In preferred versions of the method, a distinction is made between registrants and non-registrants, the guest pass holder preferably comprises one of the non-registrants. Access to the one of the guess pass accessible one of the talent files preferably is denied to non-registrants other than the guest pass holder.

The guest pass holder may comprise, for example, a talent information user. The access enabling may comprise enabling access to the guest pass accessible one of the talent files to the gust pass holder for a limited period of time, for a limited number of accesses, enabling access to a limited portion of the guest pass accessible one of the talent files, and the like.

In accordance with another aspect of the invention, a system is provided for facilitating transactions involving a plurality of performing artists and a plurality of talent representative entities for a system user. Each of the performing artists is associated with one of the talent representative entities. The system comprises storage means for storing a plurality of talent files. Each of the talent files is associated with one of the plurality of performing artists and comprises talent information for the one of the plurality of the performing artists. The system also comprises processing means operatively coupled to the storage means for processing requests for the talent files and the talent information, and user interface means operatively coupled to the processing means for communicating the requests for the talent files and the talent information, and for communicating the talent files and talent information to the system user. The system further comprises access control means operative with at least one of the processing means and the storage means for enabling access to the stored talent file of the one of the plurality of performing artists by the one of the talent representative entities associated with the one of the plurality of performing artists, and for denying access to the talent file of the one of the plurality of performing artists by the talent representative entities other than the one of the talent representative entities associated with the one of the plurality of performing artists.

Preferably but optionally, the access control means comprises logic means operatively coupled to the processing means for comparing a pre-stored talent representative entity access code with a user-inputted code provided by the system user and, if the pre-stored talent representative entity access code matches the user-inputted code, causing the processing means to enable the system user to have access to the stored talent file of the one of the plurality of performing artists. The access control means also may comprise logic means operatively coupled to the processing means for comparing a pre-stored talent representative access code with a user-inputted code provided by the system user and, if the pre-stored talent representative access code matches the user-inputted code, causing the processing means to enable the system user to have access to the stored talent file of the one of the plurality of performing artists.

In accordance with certain preferred embodiments of the system, the storage means comprises a restricted access talent file code associated with each of restricted access ones of the talent files, and the access control means comprises logic means operatively coupled to at least one of the processing means and the storage means for using one of the restricted access talent file codes for one of the restricted access talent files and a user-inputted code provided by the system user to selectively cause the processing means to enable the system user to have access to the one of the restricted access talent files associated with the one of the restrictive access talent file codes. The access control means may comprise logic means for outputting a restricted access talent file identifier code in response to a request for the talent information in the restricted access talent file associated with the restricted access talent file identifier code.

The preferred system embodiments also may comprise searching means for enabling the system user to conduct a search of the stored talent files and for creating search results, and search output means for outputting the search results to the system user.

The system also may comprise means for designating selected ones of the talent files as restricted access talent files, and searching means for enabling a system user to conduct a search of the stored talent information to obtain a search output comprising at least one of the restricted access talent files. The search output excludes the talent information for each of the at least one restricted access talent files but includes a restricted access talent file identifier for each of the at least one restricted access talent files in the search output.

In accordance with another aspect of the invention, a system is provided for receiving talent information from a plurality of talent information providers. The talent information providers comprises a plurality of talent representative entities, and provide the talent information to a plurality of talent information users. The system comprises a storage subsystem for storing the talent information organized into a plurality of talent files. Each of the talent files is associated with one of the talent representative entities. The system also comprises a processing device operatively coupled to the storage subsystem for processing requests for the talent files and the talent information, and a user interface operatively coupled to the processing device for communicating requests for the talent information by the talent information users to the processing device, and for communicating the talent files and talent information to the user interface. The system further comprises access control means operatively coupled to at least one of the processing device and the storage subsystem for enabling access to the requested talent files associated with the one of the talent representative entities by the one of the talent representative entities, and for denying access to the requested talent files associated with the one of the talent representative entities by others of the talent representative entities. It also comprises an output device for outputting the requested talent files to the one of the talent representative entities.

In accordance with still another aspect of the invention, a system is provided for facilitating transactions involving a plurality of performing artists and a guest pass holder. The system comprises storage means for storing a plurality of talent files, wherein each of the talent files is associated with one of the plurality of performing artists and comprises talent information for the one of the plurality of the performing artists. The system also comprises processing means operatively coupled to the storage means for processing a request from the guest pass holder for access to one of the talent files, and user interface means operatively coupled to the processing means for communicating the request for the one of the talent files and a guest pass code to the processing means, and for selectively communicating the one of the talent files to the guest pass holder. The system further comprises access control means operative with at least one of the processing means and the storage means and responsive to a guest pass code for enabling the access to the one of the talent files by the guest pass holder upon receipt of the guest pass for the one of the talent files.

The access control means may comprise means for enabling the guest pass holder to the access to the one of the talent files for a limited period of time, for a limited number of accesses, access may be restricted to a limited portion of the one of the talent files, etc.

BRIEF DESCRIPTION OF THE DRAWINGS

The accompanying drawings, which are incorporated in and constitute a part of the specification, illustrate a presently preferred embodiments and methods of the invention and, together with the general description given above and the detailed description of the preferred embodiments and methods given below, serve to explain the principles of the invention. Of the drawings:

FIG. 3, comprising

FIG. 8 is a flow diagram outlining processing associated with the "Subscriber Home Page" in accordance with the preferred system embodiment and method, and as is associated with page 5 of the preferred Web Site;

FIG. 19 shows an illustrative Agency Administration page for the Web Site, in which the Clients tab has been selected;

FIG. 20 shows a screen that is part of the Agency Administration page of FIG. 19, wherein the Create Client tab has been selected;

FIG. 21 shows a screen that is part of the Agency Administration page of FIG. 19, wherein the Portfolio tab has been selected;

FIG. 22 shows a screen that is part of the Agency Administration page of FIG. 19, wherein the Client Profile tab has been selected;

FIG. 23 shows a screen that is part of the Agency Administration page of FIG. 19, wherein the Credits tab has been selected;

FIG. 25 shows a screen that is part of the Agency Administration page of FIG. 23, after information has been added according to FIG. 24;

FIG. 27 shows a screen that is part of an Agent Web page for the presently preferred system embodiment and method, wherein the Portfolio tab has been selected for a particular client;

FIG. 28 shows an illustrative Agent page for the Web Site according to the presently preferred system embodiment and method, wherein the Current tab has been selected;

FIG. 30 shows a screen that is part of the Agent Web page of FIG. 28, wherein information for a current submission is shown;

FIG. 32 shows a screen that is part of the Agent Web page of FIG. 28, wherein performing artists have been selected as part of a submission;

FIG. 33 shows a screen that is part of the Agent Web page of FIG. 28 and that is used to forward the submission;

FIG. 35 shows a screen that is part of the Agent Web page of FIG. 28, wherein the Sent Submissions tab has been selected;

FIG. 36 shows a screen that includes an e-mail message to the intended recipient for the submission, indicating that the submission has been sent.

DETAILED DESCRIPTION OF THE PREFERRED EMBODIMENTS AND METHODS

Figure 1:
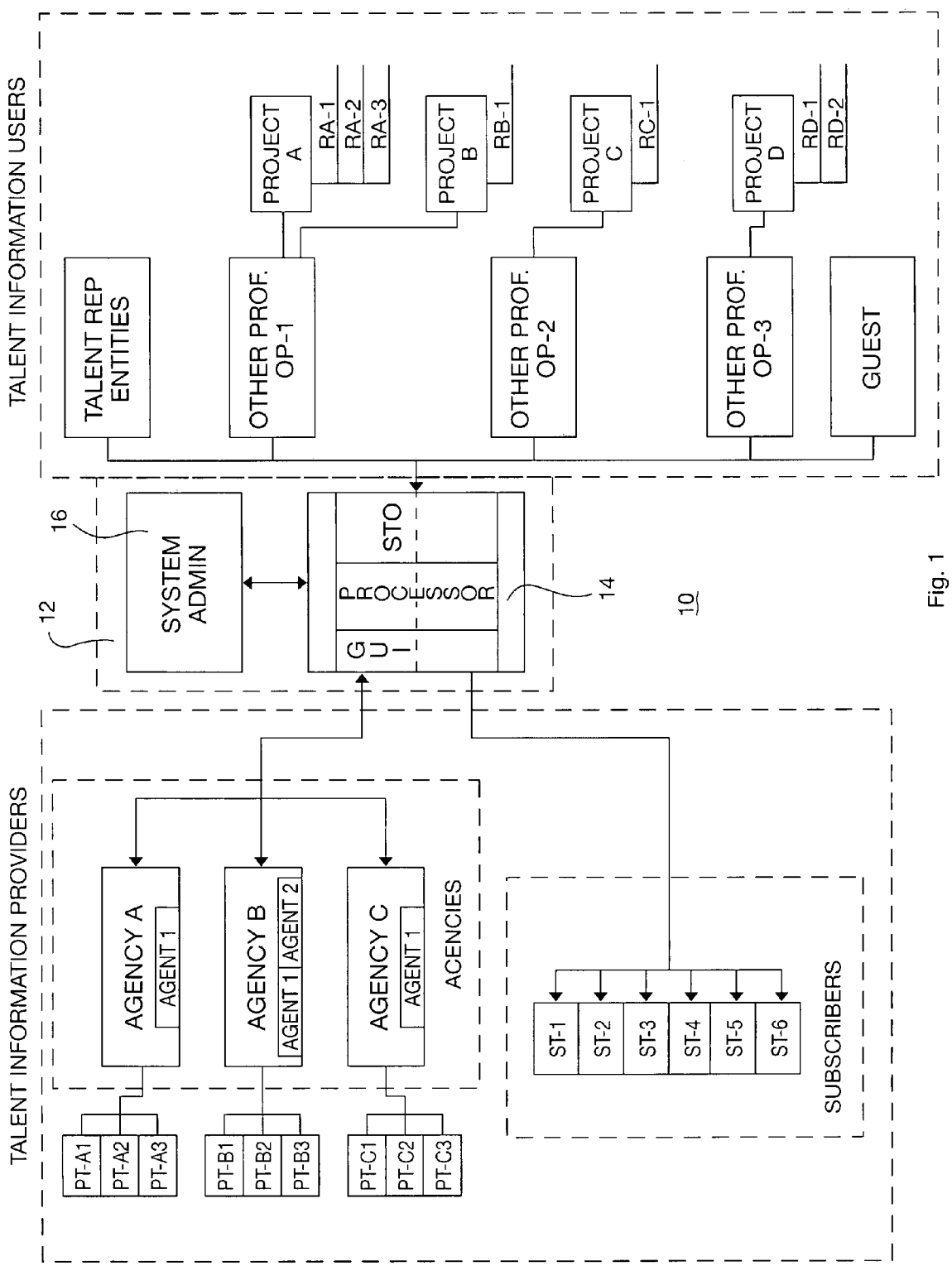
FIG. 1 is a block diagram showing the general architecture of a preferred system embodiment and method according to the present invention.

Reference will now be made in detail to the presently preferred embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in this section in connection with the preferred embodiments and methods. The invention according to its various aspects is particularly pointed out and distinctly claimed in the attached claims read in view of this specification, and appropriate equivalents.

The system and method according to the invention are designed to facilitate transactions involving talent information providers and talent information users. Examples would include transactions in which the services of performing artists are offered to consumers of such services, as noted above. In describing the presently preferred embodiments and methods according to the invention, a number of terms will be used, the definitions or scope of which will now be described.

A "performing artist" as the term is used herein is used in its common but broad sense to include those individuals or groups of individuals who provide services to the public in the recognized performing arts fields, such as acting, radio or other broadcast announcement, modeling, dancing, musical performing, and the like. A performing artist also is commonly referred to in the industry, and herein, as "talent." Performing artists or talent for present purposes may be segregated into two groups, i.e., professional talent and aspiring talent or subscribers. "Professional talent" (also denoted herein as "PT") comprises those performing artists who are currently, or who have been, actively engaged or employed in a performing arts field, and who are generally known in the field as an established performing artist. Examples of professional talent would include an actor that already has performed in a major motion picture in a lead or significant role, and who would be expected to be a viable candidate for future roles in upcoming productions. An "aspiring talent" is a performing artist that is aspiring to be a professional talent, but has not yet acquired sufficient notoriety to be considered professional talent. Such individuals or groups, when they have registered in connection with the preferred system embodiment and method, are also referred to herein as a "subscriber" or "subscriber talent" (also denoted herein as "ST").

The "services" of a performing artist as the term is used herein may be interpreted broadly to include not only the physical performance of services, such as in acting in a role or part, playing in a musical performance, and the like, but also passive activities such as an endorsement, permitting the likeness of the performing artist to be used, etc.

A "talent representative entity" as the term is used herein refers generally to an entity, whether an individual, an organization, or otherwise, that acts on behalf of a performing artist as a representative of that artist. Where the talent representative entity is an individual, regardless of his or her affiliation or membership in an organization, he or she is referred to herein as a "talent representative." Examples of talent representatives would include talent agents, talent managers, and the like. Where the talent representative is an organization, it is referred to herein as a "talent representative organization." Examples of talent representative organizations would include a talent agency, an affiliated group of talent agencies, modeling agencies, and the like.

A "talent information provider" as the term is used herein refers to an individual or entity that provides talent information. The most common example of talent information provider in the case of professional talent would be the talent representative or talent representative organization that is associated with and that represents the professional talent. In the case of an aspiring talent or a "subscriber," the talent information provider typically would be the aspiring talent himself or herself, given that many aspiring performing artists are not yet represented by an agent or manager, although this of course would not necessarily be the case.

A "talent information user" as the term is used herein refers generally to an individual or entity that uses talent information in a professional or commercial capacity. Examples of talent information users would include producers, promoters, directors, casting directors, program directors, choreographers, marketing agencies, and the like. It should be noted that, although talent representative entities normally function in role as a talent information providers, they also may function as talent information users, for example, when they are seeking new performing artists to represent.

The term "Other Professionals" as it is used herein refers to talent information users other than talent representative entities. Examples of Other Professionals would include producers, promoters, directors, casting directors, choreographers, marketing agencies, attorneys, and the like. The reason for this distinct term will become more apparent in view of the following description, but suffice it here to say that in accordance with certain aspects of the invention, access to talent information and talent files can be limited from one agency to another, primarily because these agencies typically are in competition with one another. Such information may not, however, be limited as to talent information users other than agencies, given that this competitive arrangement usually does not exist as to these individuals or entities, and the performing artists and their representatives have as a principal objective getting their talent information in the hands of these Other Professionals.

In accordance with one aspect of the invention, a system is provided for facilitating transactions involving a plurality of performing artists and a plurality of talent representative entities for a system user. In accordance with another aspect of the invention, a method is provided for facilitating transactions involving a plurality of performing artists and a plurality of talent representative entities. In the preferred system embodiments and methods, it will be assumed that each of the "professional talent" performing artists is associated with one of the talent representative entities and the subscriber talent are not, unless otherwise indicated. This is not, however, necessarily limiting.

To provide illustrative but preferred examples of these aspects of the invention, a system 10 according to a presently preferred but merely illustrative embodiment of the invention will now be described with reference to the drawing figures. The preferred but merely illustrative method according to this aspect of the invention will be described with reference to the preferred system embodiment, although the method is not limited to this specific system embodiment.

Figure 2:
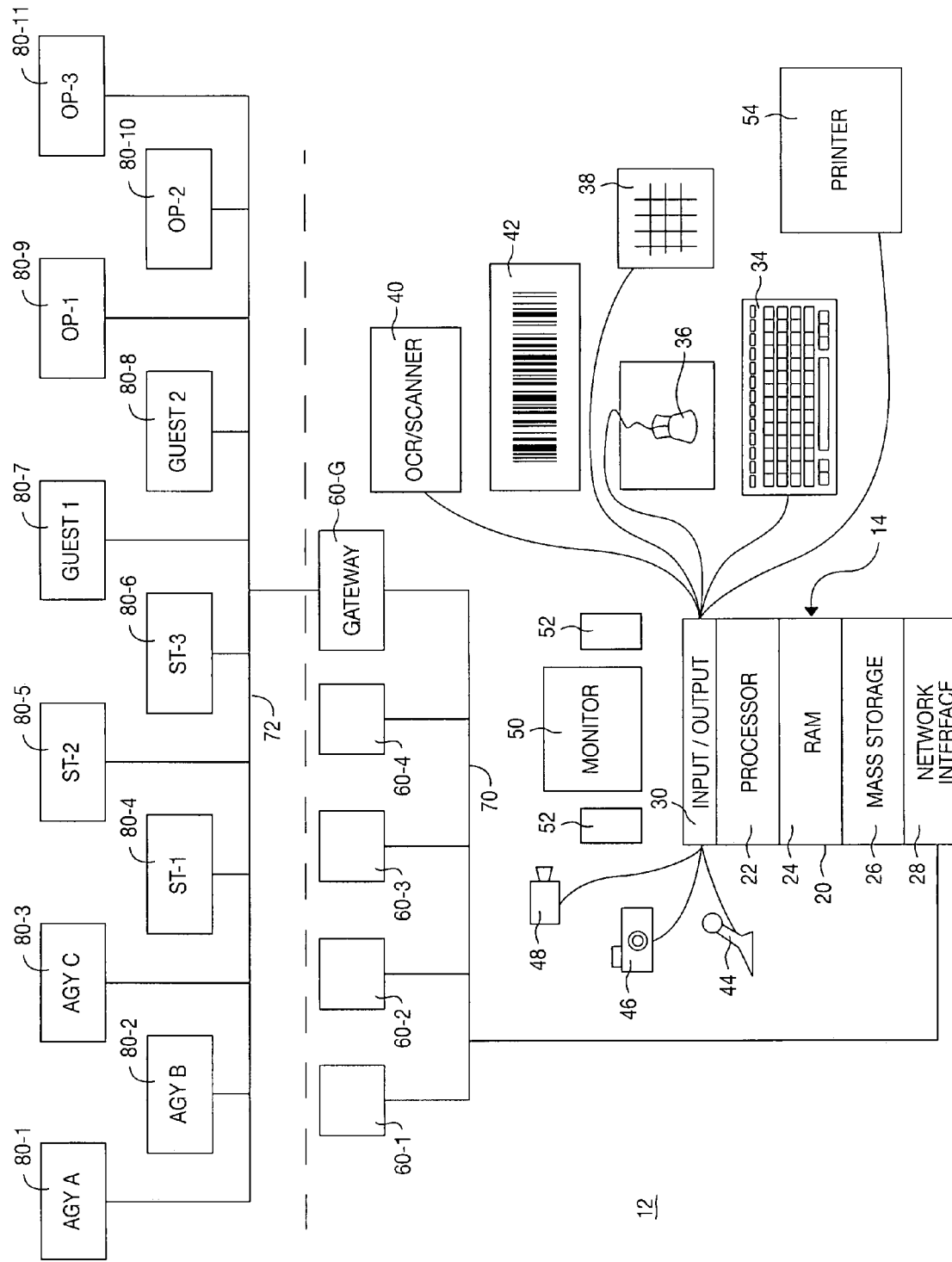
FIG. 2 is a functional block diagram of a computer system and network in accordance with the preferred system of FIG. 1 and the preferred method according to the invention.

A functional block diagram of the architecture of system 10 is shown in FIG. 1, and a functional block diagram of the hardware comprising system 10 is shown in FIG. 2. From an architectural perspective, system 10 comprises a central controller 12, which in this embodiment and method comprise a computer 14 physically located at a central headquarters. The system and method comprise a system administration function, represented generally at block 16, which preferably is associated with and undertaken at controller 12.

In accordance with the preferred system architecture and method, controller 12 is operatively coupled to and generally accessible at a top level with a plurality of system users. The system users comprise talent information providers, shown diagramatically in FIG. 1 at the left, and talent information users, shown diagramatically in FIG. 1 at the right. Talent information providers may comprise performing artists, both professional and aspiring, talent representative entities, and the like.

The talent information providers associated with this illustrative system and method include professional talent associated with an Agency A, i.e., PT-A1, PT-A2, PT-A3, . . . , those associated with an Agency B, i.e., PT-B1, PT-B2, PT-B3, . . . , and those associated with an Agency C, i.e., PT-C1, PT-C2, PT-C3, . . . In these simplified examples, Agency A includes only a single agent, i.e., agent 1. Agency B comprises two agents, i.e., agent 1 and agent 2. Agency C in this example has only a single agent. In practice, agencies typically include a number of agents, not infrequently numbering in the tens to perhaps into the hundreds.

It is assumed in this illustrative example that each of these agencies has a computer similar to computer 14, which is operatively connected to computer 14 via a remote connection, such as via the Internet or similar network connection. They may but need not have a remote connection to the professional talent associated with their respective agencies.

The talent information providers also comprise a plurality of performing artists who fall within the definition as provided herein of subscriber talent. As shown in FIG. 1, these comprise subscriber talent ST-1, ST-2, ST-3, . . . Each of these performing artists either has or has access to a machine that is operatively coupled via remote access, e.g., the Internet, to computer 14.

Talent information users in accordance with the presently preferred system and method are shown diagramatically at the right in FIG. 1. These talent information users in this illustrative example comprise Other Professionals OP-1, OP-2, OP-3, . . . , and talent representative entities. The Other Professionals may comprise individuals or organizations. Each of the Other Professionals is assumed to have at least one "project" in which each project has at least one "role." A "project" as the term is used herein refers broadly to a planned activity in which the services or likeness of a performing artist are to be enlisted or used. Examples of projects would include a movie production, a television show, a commercial, a radio show, a musical performance or concert, a modeling assignment, and the like. A "role" as the term is used herein refers broadly to a character, activity or series of activities, etc. that is to be undertaken by a given performing artist. Examples of roles would include a given character in a movie or television production. In this illustrative example, Other Professional OP-1 has two projects, i.e., Projects A and B. Project A has three roles, i.e., RA-1, RA-2 and RA-3 and Project B has one Role RB-1. Other Professional OP-2 has one project, Project C, with one role, RC-1. Other Professional OP-3 has one project, Project D, with two roles, RD-1 and RD-2.

As indicated above and as shown in FIG. 1, a talent representative entity also may comprise a talent information user. Talent agents or agencies, for example, function as talent information users when they use talent information for performing artists who are not currently associated with their agency, e.g., to find new performing artists to enlist their services and become associated with their agency.

FIG. 2 shows an illustrative functional and hardware diagram in accordance with the preferred system embodiment and method. The preferred system embodiment preferably comprises as a central component of controller 12 computer 14. Computer 14 preferably comprises a commercially available general-purpose digital computer such as personal computer or small business computer. Examples of such computer would include a current generation, commercially available general purpose computer platform, e.g., based upon a current generation, commercially available microprocessor such as those from Intel Corporation of Santa Clara, Calif., Advanced Micro Devices, Inc. of Sunnyvale, Calif., and the like.

In accordance with this aspect of the invention, the system comprises storage means for storing a plurality of talent files, wherein each of the talent files is associated with one of the plurality of performing artists and comprises talent information for the one of the plurality of the performing artists. The system also comprises processing means operatively coupled to the storage means for processing requests for the talent files and the talent information.

In the presently preferred system embodiment, computer 14 comprises a cabinet 20 such as a tower configured to house components, e.g., as are described herein below, located within a system headquarters on system management center.

The processing means as implemented in the presently preferred embodiment comprises processor 22, housed within cabinet 20 of computer 14 and processor memory 24. Processor 22 may comprise any of the aforementioned commercially available processing devices. In this illustrative but preferred system embodiment, processor 22 comprises a current-generation Intel microprocessor such as a PENTIUM 4-based microprocessor chip set.

The storage means of system 10 comprises cache memory and random access memory ("RAM"), a mass storage device or devices 26, which may comprise one or some combination of a floppy disk or diskette drive, a hard magnetic disk or Winchester drive, a tape drive, a ZIP disk, a compact disk ("CD"), a ZIP disk, a tape drive, and the like. The storage means also may comprise storage devices in or operating in conjunction with one or more of workstations 60, e.g., using a distributed database approach.

The system according to this aspect of the invention also comprises user interface means operatively coupled to the processing means for communicating the requests for the talent files and the talent information, and for communicating the talent files and talent information to the system user. With reference to the presently preferred embodiment, the user interface means may comprise any one of a number of hardware and/or software configurations for providing the appropriate access. The user interface means, for example, may comprise network interface 28, which in turn may comprise any one or combination of a number of interface devices for connecting computer 14 to other computers or to a network. Typical examples include a modem, a network interface card, and the like.

Computer 14 also comprises input/output circuitry 30 for addressing input and output requirements of the various devices, interfaces, etc. coupled to it. Input/output circuitry 30 may comprise one or more serial ports, one or more parallel ports, and the like, and associated circuitry as is known in the field and commercially available. The user interface means thus also may comprise the networked computers or local area networks capable of accessing the preferred system, e.g., comprising machines 80-1, 80-2, 80-3, . . . (FIG. 2)

Processor 22 is operatively coupled to the user interface means for receiving inputs to processor 22. The input means for system 10 thus also may comprise various forms of input devices, for example, comprising a keyboard 34, a pointing device 36 such as a mouse, tracking ball or the like, and possibly to a keypad 38. Computer 14 also may comprise other input devices, for example, such as an optical character reader and/or scanner 40, a bar code reader 42, microphone 44, a digital camera 46, a video camera 48, etc.

Computer 14 also may comprise various output devices, for example, such as a display monitor 50, one or more audio speakers 52, a printer 54, and the like.

System 10, in addition to computer 14, comprises a plurality of workstations 60-1, 60-2, 60-3, . . . and a network gateway or authorization machine 60-G configured with computer 14 in a local area network 70. In this embodiment, machines 60-1, 60-2, 60-3, . . . comprise machines essentially identical to computer 14. They are provided in this illustrative but preferred embodiment to enable more than one user, e.g., so that more than one individual may perform system-related functions, such as registration of new users, input of newly received talent information, etc., simultaneously. In this particular embodiment, machine 14 serves as the "server" for local area network 70, while machines 60-1, 60-2, 60-3, . . . serve as workstations or terminals for entry and modification of data, comprising talent information and system administration data.

It will be appreciated by those of ordinary skill in the art that it is not necessary to have this collection of machines, and that a single machine properly configured could provide the desired functionality. The multiple machines also need not be configured into a local area network. For example, they may be at remote locations and operationally coupled via a dedicated network, a wide area network, modem connections, the Internet, and the like. The plurality of machines within the local area network as shown here is merely a presently preferred configuration, e.g., to facilitate use of the system by multiple users with the headquarters, as system support personnel, etc.

Computer 14 and preferably the workstations 60 (i.e., 60-1, 60-2, 60-3, . . . ) comprise computer software including an operating system such as WINDOWS®, UNIX, or the like, as well as applications software, utilities, and other known and commercially available packages. System 10 also utilizes a database system for entry, storage, modification, querying, etc. of talent information. As noted above, in the presently preferred system embodiment and method, computer 14 functions as a server, to which workstations 60 are operatively coupled. The database, for example, may comprise a commercially available database, such as those available from Oracle, Sybase, Informix, Microsoft, etc.

The connection of computer 14 and each of the workstations may be made by any of a number of means known in the art and commercially available, such as by high speed modem, digital subscriber line, Integrated Services Digital Network, dedicated high speed lines such as T-1 or T-3 lines, and the like. Each of the machines within the local area network comprise network interface software, such as an appropriate browser and applications software for receiving, managing, viewing, etc. data from the network 70, including HTML, XML, graphics, video, audio, and the like. The presently preferred embodiment utilizes commercially-available versions of such software, for example, including the INTERNET EXPLORER® browser software, commercially available from Microsoft Corp. or the NETSCAPE NAVIGATOR® browser software, commercially available from Netscape. Graphics packages may include, for example, any of the commercially available packages from managing JPG or GIF file formats or the like. Presently preferred video applications software includes REAL PLAYER, commercially available from Real Networks, Inc. of Seattle, Wash.

The local area network 70 is assumed herein to be used by "internal system users," which are individuals employed by the entity implementing the preferred system and method and operating local area network 70. This includes but is not limited to a System Administrator. Local area network 70 within the system headquarters is operably coupled to, or is selectively operably coupled to, a network such as a wide area network 72, preferably the Internet, or the like, and is accessible to a number of system users.

System users external to and not affiliated with the system headquarters comprise "registered users" and "unregistered users." A "registered user" is a user, for example, a subscriber, a talent representative entity, or an Other Professional, who has registered with the system and is authorized to access and/or use portions of the system and method that otherwise are not available to unregistered users. In accordance with the preferred system embodiment and method, the system and method are available at a top level or publicly accessible level ("Home Page") by anyone with access to network 72. To gain access to portions of the system or method beyond this publicly-available Home Page, that user normally must go through a registration process, including providing information about that user and paying a registration or user fee. When these things are done, the user becomes a registered user and is recognized as such by the system and method. As the name implies, an "unregistered user" is a user who has not registered and normally cannot gain access to or use the system or method beyond the publicly available portion or Home Page. An exception to this, referred to herein as a "guest pass holder," will be described in greater detail herein below.

Accordingly, a plurality of machines or networks 80-1, 80-2, 80-3, . . . corresponding to system users (e.g., the public) are operatively coupled to computer 14 via network 72. In this illustrative preferred system embodiment and method, each of these machines or networks 80-1, 80-2, 80-3, . . . comprises the computer, server or network of each of the system users. Accordingly, as shown in FIG. 2, machine 80-1 corresponds to the machine or network for Agency A, machine 80-2 corresponds to the machine or network for Agency B, machine 80-3 corresponds to the machine or network for Agency C, and so on. Similarly, machines 80-4 through 80-6 correspond to the machines or networks of subscriber talent ST-1 through ST-3, and so on. Machines 80-7 and 80-8 correspond to the machines or networks of non-registered "guess pass holders" 1 and 2, as will be described in greater detail below.

In accordance with the presently preferred system embodiment and method, talent information is inputted to computer 14 via network 72 or in any of the import devices of computer 14 or workstations 60, and is stored on the machine-readable medium. As noted above, the storage means used for storing this talent information and talent files may comprise any storage device operable with processor 22 and capable of storing the talent information and files for the particular application.

The talent information preferably is organized into a database to facilitate storage, management and retrieval. In the presently preferred embodiment and method, the talent information is stored as a plurality of tables in a relational database, for example, such as a SQL database, constructed using the SQL SERVER® database application, commercially available from Microsoft Corp. The collection of talent information relating to a particular performing artist is referred to in this embodiment and preferred method as a "talent file." In database terms, the talent file for a particular performing artists would comprise all of the table entries that relate to that performing artist.

The talent information in this embodiment and method may comprise any one or combination of text (e.g., resumes, etc.), photographs, graphics, video, audio, and the like. As noted, this talent information is organized into a plurality of talent files, wherein each talent file corresponds to a particular performing artist (or group of performing artists).

Figure 3A:
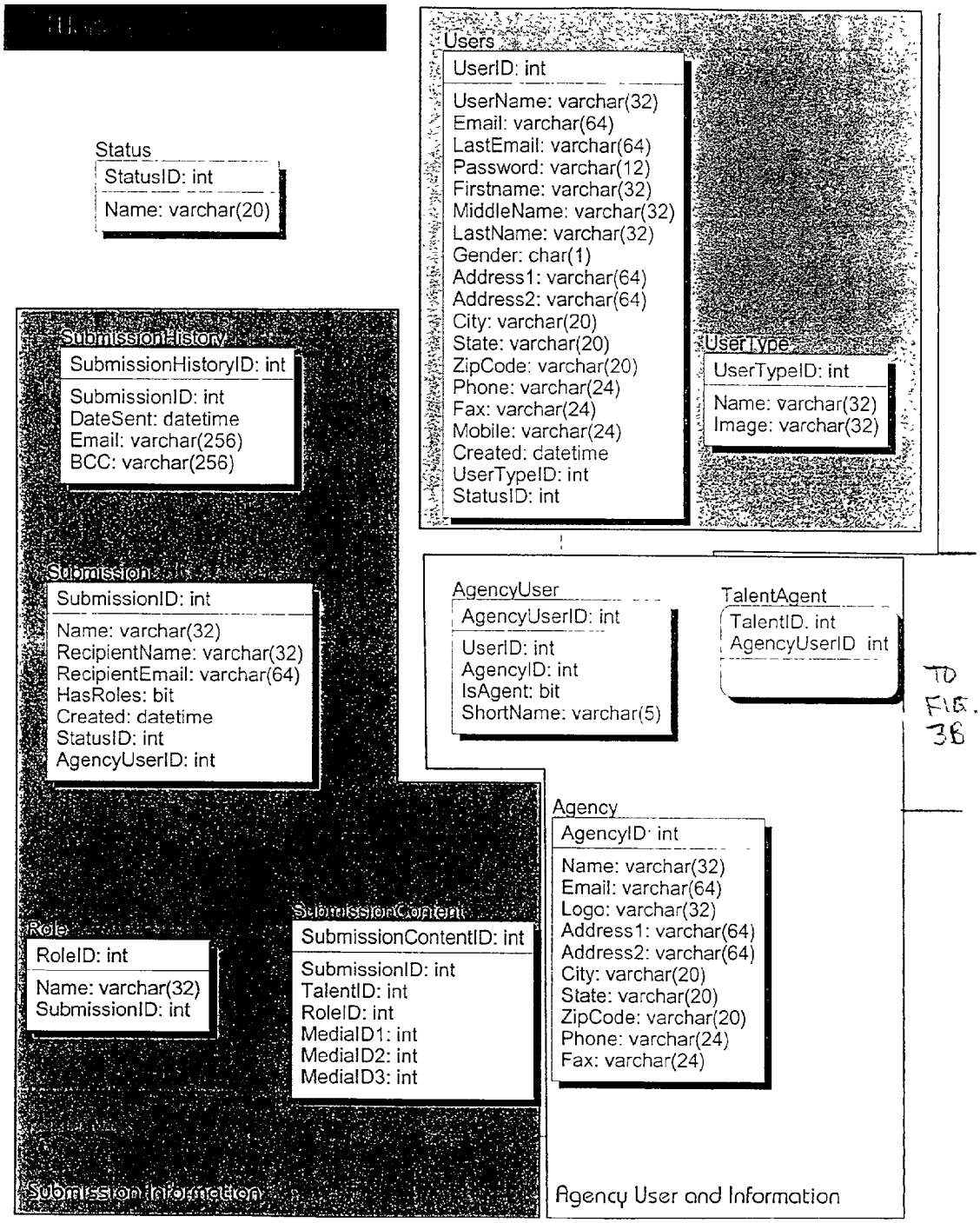
FIGS. 3A and 3B, shows a database schema and structure for the preferred system and method illustrated by FIGS. 1 and 2.
Figure 3B:
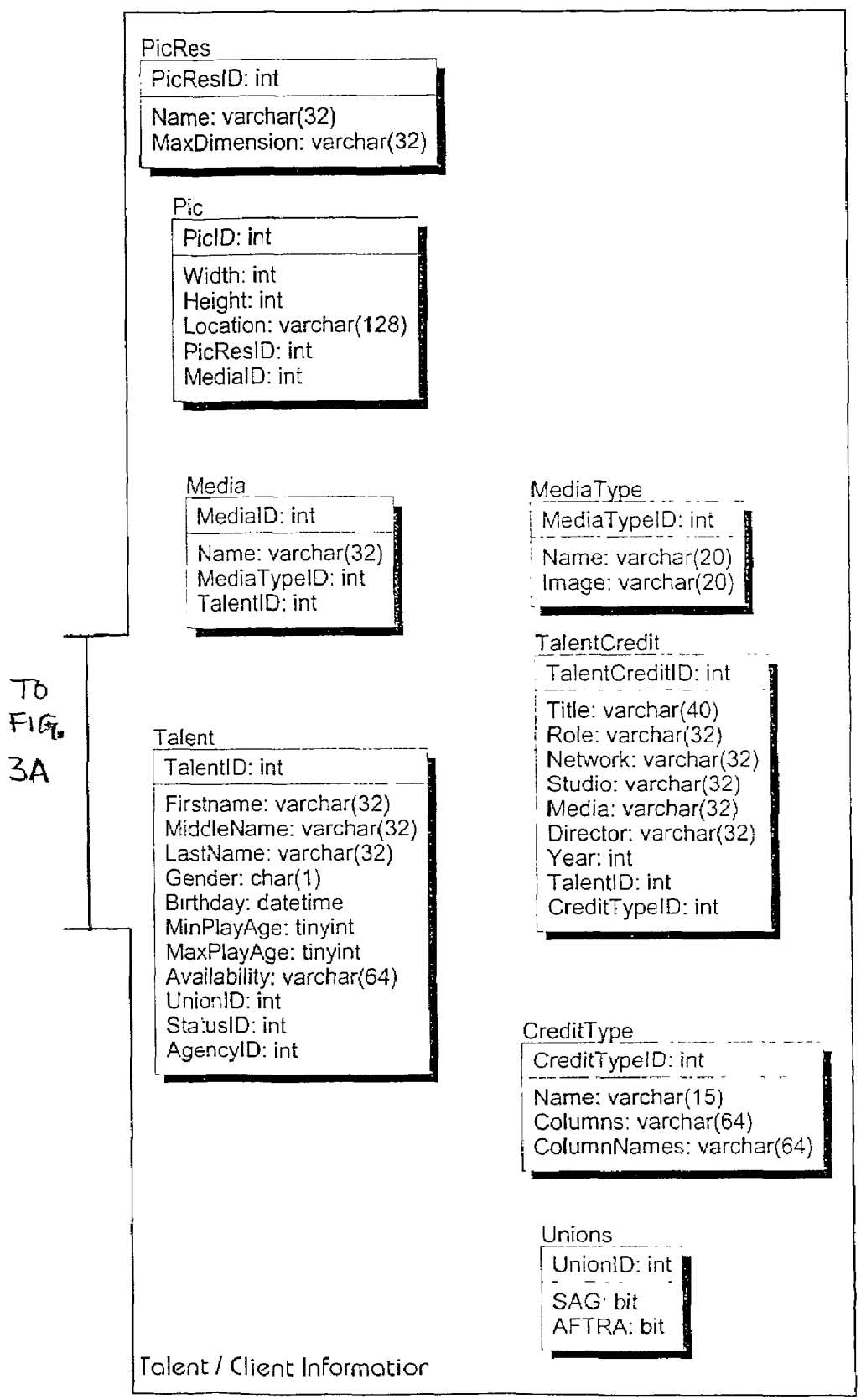

The tables, relations, formats and schema for the database according to the presently preferred system embodiment and method are shown in FIG. 3, which comprises FIGS. 3A and 3B. This database is implemented using a current version of SQL SERVER® from Microsoft Corp. The data tables are grouped into four main groups: (a) user information, (b) agency user and information, (c) talent/client information, and (e) submission information. The user group includes a Users table and a UserType table. The agency user and information group comprises an AgencyUser table, a TalentAgent table, and an AgencyID table. The talent/client information group comprises a Talent table, a PicRes table, a Pic table, a Media table, a MediaType table, a TalentCredit table, a CreditType table, and a Unions table. The submission information group comprises a SubmissionHistory table, a Submission table, a SubmissionContent table, and a Role table. The database also includes a Status table. Each of these tables is configured to contain the fields and contents as depicted in FIG. 3. The internal system user may select which fields are to be primary, which are to be searched, which are to be linked, and the like, based on the specific application and circumstances. Similarly, each of the tables and table groups may have links and relations as specified by the internal system user in a particular application.

Talent information may be added to the database in a variety of ways. One involves manual input, e.g., via keyboard 34. Another comprises direct transfer from the talent information provider to the database, e.g., via digital transfer over network 72. Still another method involves the talent information provider providing the System Administrator with the talent information in digital format, for example, such as text files or word processing files, digital graphics files, etc. on a diskette, a ZIP disk, a CD, or the like. The talent information provider also may provide video, for example, on a VHS tape. It may be possible to input some of this information directly into the database. In some instances it will be necessary or desirable to convert the data as provided by the talent information provider into a digital format, or from one digital format to another.

The presently preferred system embodiment and the presently preferred method are implemented in the form of an Internet Web Site housed on computer 14, as generally illustrated in FIGS. 1 and 2. The Web Site resides on computer 14, or optionally on machines 60 within the local area network. The Web Site comprises a number of HTML Web pages, the organization and processing flows for which are shown in FIGS. 4 through 17. The Web Site is generally accessible, at least at its Home Page, via the Internet or similar wide area network.

Figure 4:
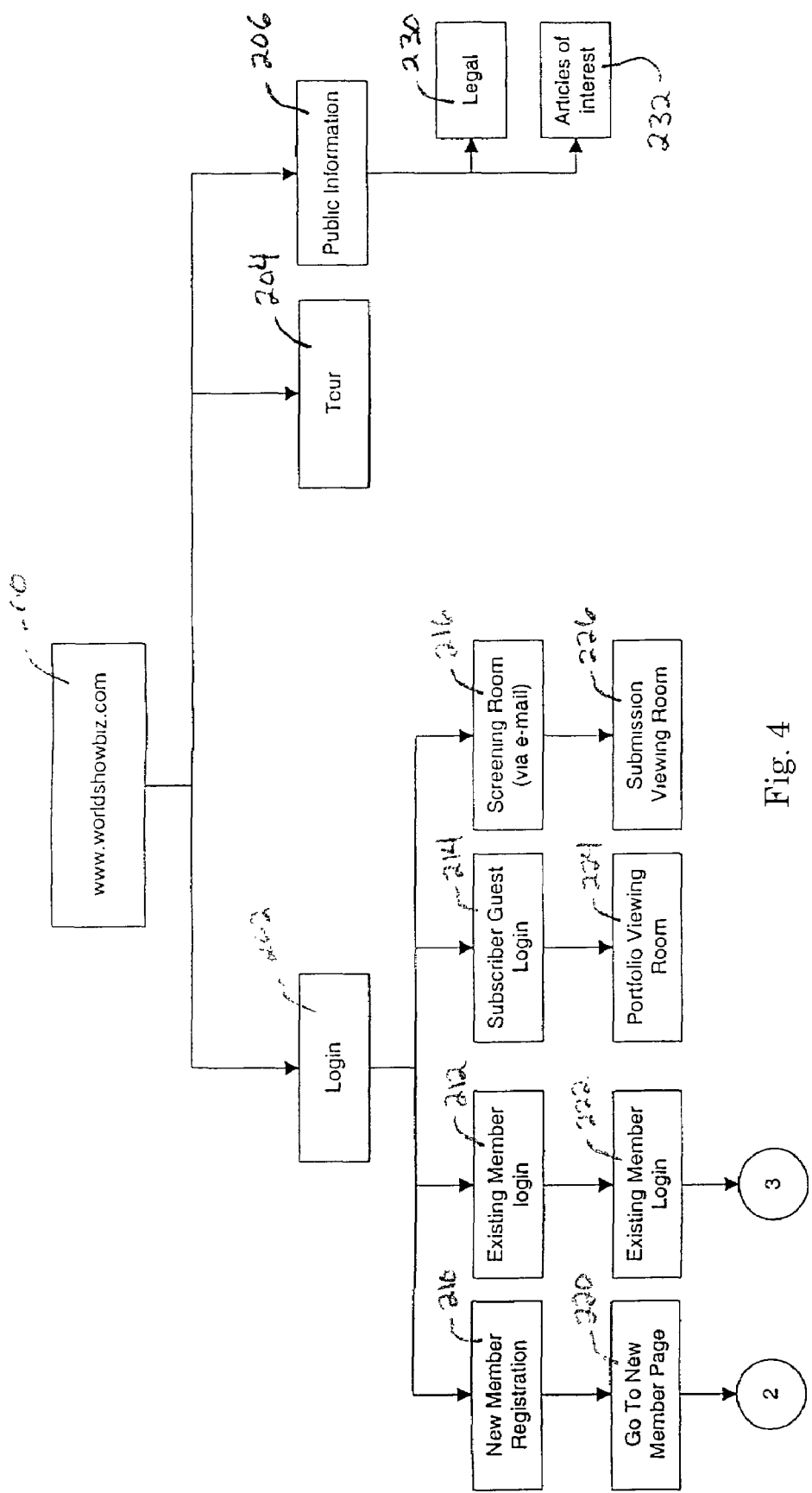
FIG. 4 provides a flow diagram illustrating processing according to the presently preferred system embodiment and method, which in the illustrative example are associated with page 1 of the preferred Internet Web Site.
Figure 5:
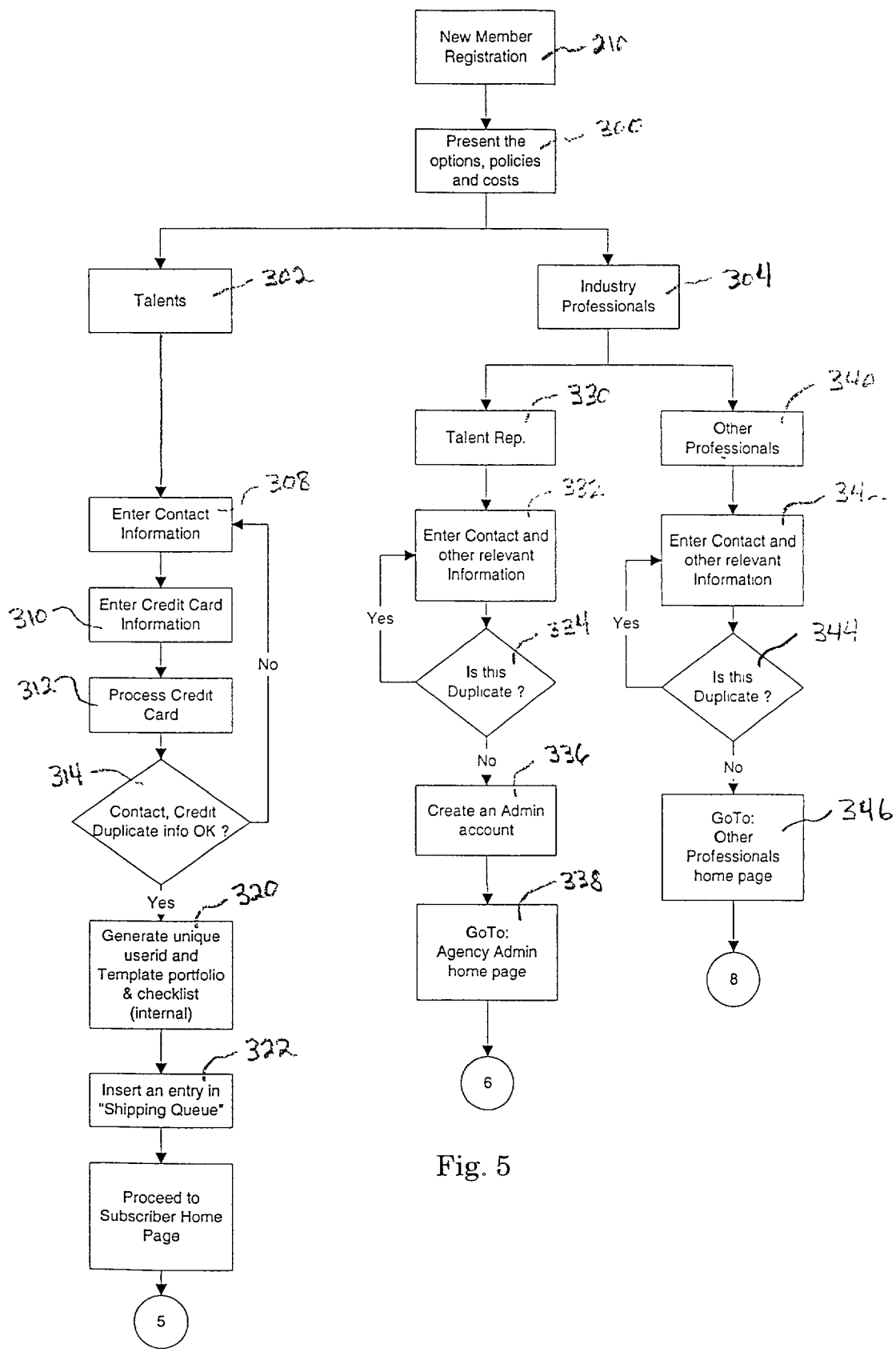
FIG. 5 is a flow diagram outlining the processing associated with "New Member Registration" in accordance with the preferred system embodiment and method, and which is associated with page 2 of the preferred Internet Web Site.

The Web Site implementing the presently preferred system embodiment and method has a "Home Page" that is brought up when the domain name of the Site is called by a user. FIG. 4 shows the logical flows associated with the opening presentation or "Home Page" of the Site. This Home Page would be accessible to anyone who is on or has access to the Internet or other network upon which the system and method or implemented. Entry to the Home Page is indicated by block 200. Access to the system beyond the Home Page in the preferred system embodiment and method is limited to four classes of user: (a) "new member" users wishing to register for fuller use of the Web Site, (b) existing members or registrants, (c) an "authorized guest or guest pass holder" with a valid "guest pass," and (d) a "screening room" pass holder. Upon entry to the Home Page, three options are provided to the user: (a) login 202, (b) tour the Site 204, and (c) public information 206. Login 202 may be used by a new member who desires to register as a subscriber to the Site 210, an existing member login 212, as a subscriber "guest" login 214 (described in greater detail below), and to access the screening room 216 (also described in greater detail below). In the circumstance in which the user is not presently a member of the Site but wishes to become a member (block 210), processing is transferred to the new member page (block 220) that constitutes Web Site page 2 (FIG. 5).

Figure 6:
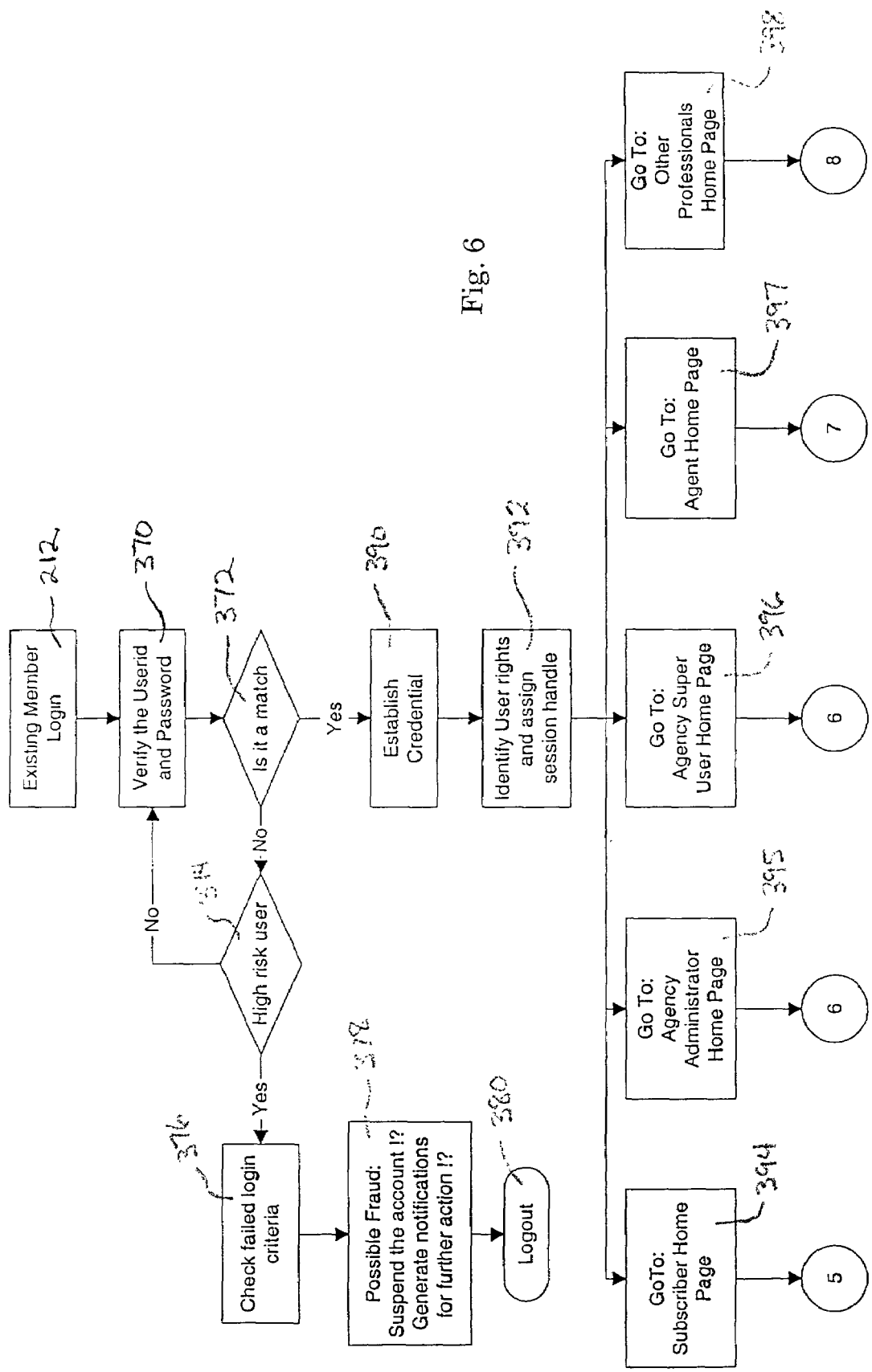
FIG. 6 is a flow diagram showing processing associated with "Existing Member Login" in accordance with the preferred system embodiment and method, and as is associated with page 3 of the preferred Internet Web Site.

If the user is an existing member and wishes to log in, processing is transferred to the existing login member page (block 222), which constitutes page three of the Web Site (FIG. 6).

In the event the user is a subscriber "guest," processing is transferred to the "portfolio viewing room," which will be described in greater detail below.

If the user desires a tour of the Site, processing proceeds at block 204. This causes the user to be provided with a general tour of the Site, which may be at the discretion of the system designer. The tour, for example, may provide an overview of the system and method, sample talent portfolios, etc.

Under the "public information" area (block 206), information that is intended to be freely available to the public, such as legal information (copyright notices, terms and conditions for use of the Site, disclaimers, block 230), related articles, publications, other Web site links (block 232), etc., may be made available.

New Member Registration processing and processing flows are outlined in FIG. 5. This figure represents the processing and flows associated with page 2 of the Web Site in accordance with the preferred system embodiment and method. Processing for New Member Registration begins at block 300 by presenting the system user with options, policies, costs, etc. for becoming a registered user or subscriber of the system.

Once the user has inspected the options, policies, costs, etc. displayed as part of block 300, the system and method cause the user to indicate whether he or she is an aspiring performing artist, i.e., a "subscriber talent," or an industry professional, i.e., "professional talent." If the indication is that the new member registrant is an aspiring talent, processing proceeds block at 302, at the left side in FIG. 5. If the user is an industry professional or representative of one, processing proceeds to block 304 at the right side of FIG. 5.

Assuming the new member registrant is a subscriber talent, processing proceeds at block 308, where the user is prompted to enter contact information, such as address and telephone information. At block 310, the user is prompted to enter credit card information for payment of the subscription or registration fee. Block 312 involves the processing associated with charging the credit card and processing the credit card information to secure payment of the subscription fee through that credit card. Quality control checks are made at block 314 to ensure that the contact information, credit card information, credit card processing information, etc., meets formatting parameters and are acceptable and valid. In the event errors are detected at block 314, processing is returned to block 308 and the user is prompted to reenter the information for blocks 308 and 310. Credit card processing at block 312 also is repeated.

If the quality control and validation checks at block 315 are completed successfully, processing proceeds to block 320, at which processing is undertaken to generate a unique user identification, a template portfolio, and a checklist. This information initially is used internally within computer 14, and is not presented to the new member/subscriber at this point.

In the preferred system and method, a new member that is in the "subscriber talent" category is provided with this standard or template portfolio or resume, a checklist for creating and/or compiling talent information, and possibly other material, and he or she then will be responsible for collecting the talent information, putting it in the appropriate format, and providing it to the System Administrator. The provision of the documents and information represented by block 320 may be via remote means, for example, by transmitting them over the Internet or a network path. They also may be transmitted by physical delivery through the mail, by courier, etc.

When processing at block 320 has been completed, an entry is made in a "shipping queue," which comprises an active list of new member registrants to whom the materials reflected in block 320 are to be sent. This is indicated at block 322. Once processing at block 322 is completed, it proceeds to the "Subscriber Home Page," which in the preferred embodiment and method comprises page 5 of the Web Site (FIG. 8).

Where the new member registrant is an industry professional or representative of one, processing proceeds from block 304 of FIG. 5. The system prompts the user to indicate which he or she is, a talent representative or an "Other Professional." Where the new member registrant is a talent representative, processing proceeds at block 330. If the new member registrant is an Other Professional, processing proceeds at block 340.

Figure 9:
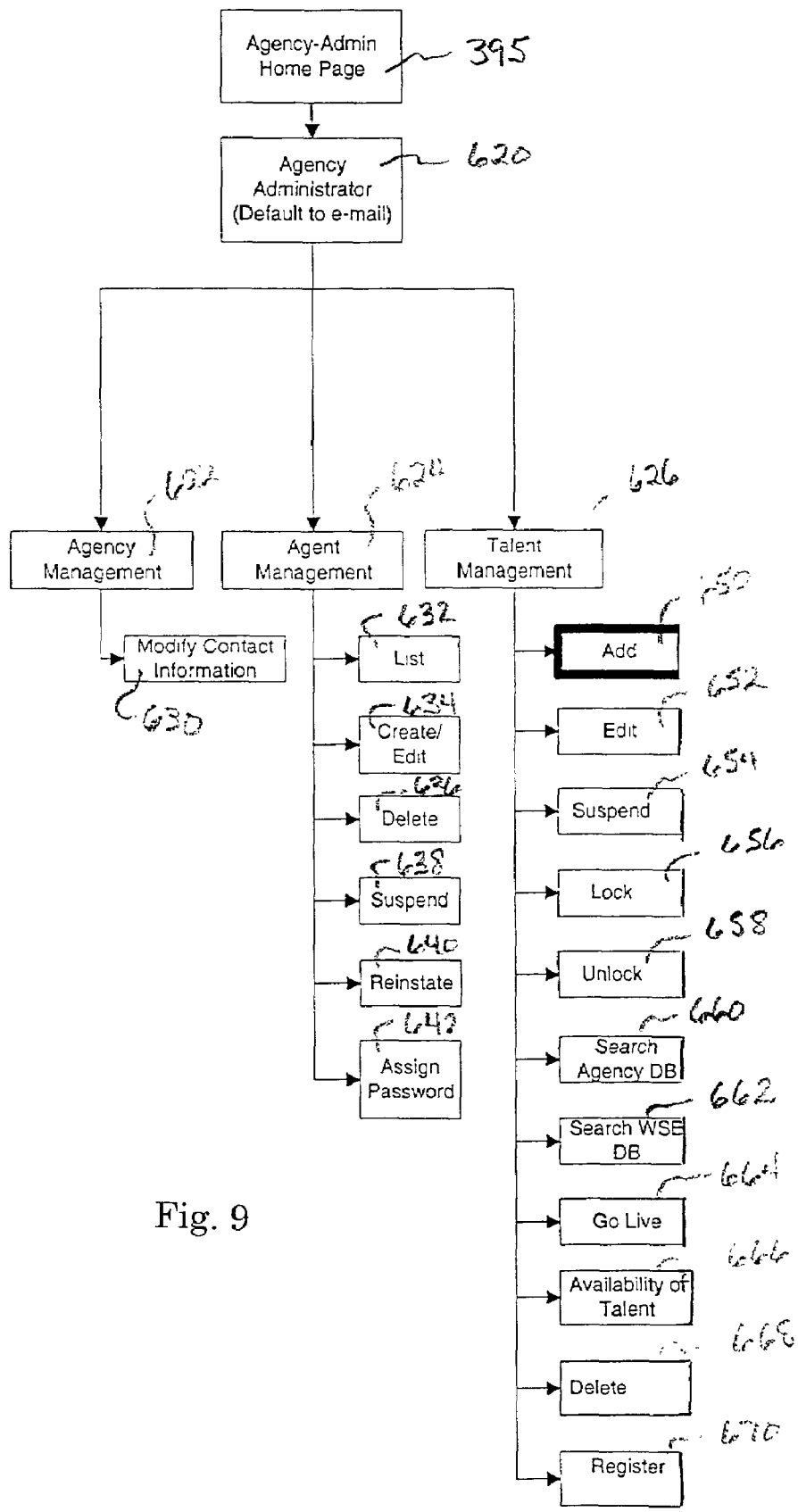
FIG. 9 is a flow diagram outlining processing associated with the "Agency Administrator" in accordance with the preferred system embodiment and method, and as is associated with page 6 of the preferred Web Site.
Figure 12:
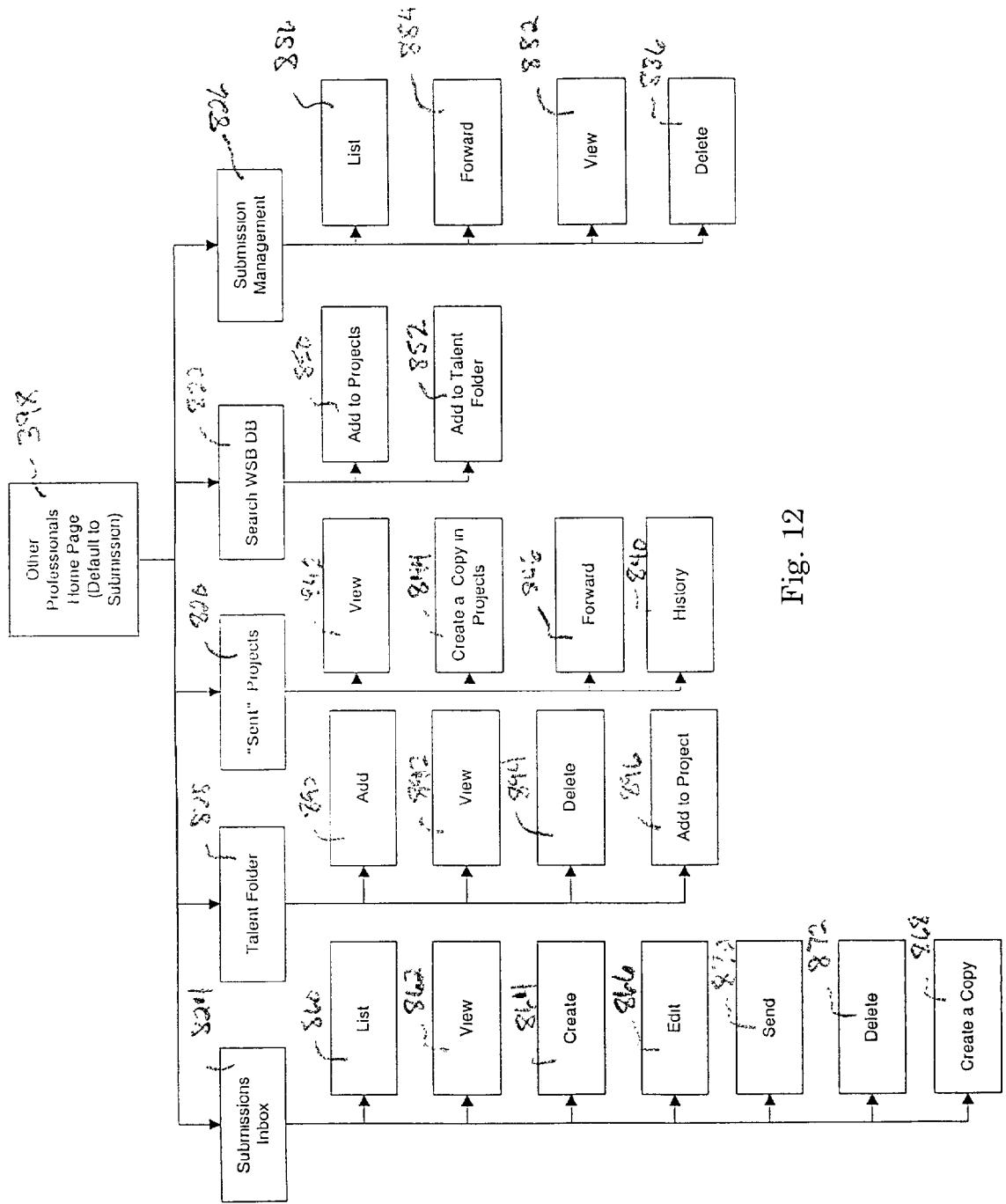
FIG. 12 is a flow diagram illustrating processing associated with the "Other Professionals Home Page" in accordance with the preferred system embodiment and method, and as is associated with page 8 of the preferred Web Site.

Referring first to the former instance, in which the industry professional is a talent representative, processing proceeds from block 330 as follows. The system and method prompt the user to enter contact and other relevant information at block 332. Examples of other relevant information may include area of activity, specialization or expertise, projects in which the agency or its talent is or has been involved, etc. At block 334, the system and method check the information provided at block 332 to determine whether it is a duplicate of information already in the system. If it is a duplicate, processing proceeds back to block 332 with a prompt to reenter the information. If a duplicate is not detected at block 334, processing proceeds to block 336, at which the system performs the tasking to create an administrative account. Processing control then is transferred (block 338) to the Agency Administration Home Page, which is page 6 of the Web Site (FIG. 9).

Where the New Member Registrant is in the "Other Professionals" category, processing proceeds from block 340 to block 342, at which the user is prompted to enter contact and other relevant information similar to that of block 332. At block 344, the information entered at block 342 is checked to identify duplication. If duplication exists, processing is returned to block 344 with a prompt to correct or otherwise address the duplication. If a duplication issue is not detected at block 344, processing proceeds to block 346 where control is transferred to the "Other Professionals Home Page," which is page 8 of the Web Site (FIG. 12). If the Other Professional is required to pay for registration, processing may be added as generally described for subscribers, e.g., block 310, 312 and 314.

Once the new member registration applicant provides the appropriate registration information, and thus has applied for registration, processing is transferred to address it, for example, as will be described below in connection with FIG. 7 (7A and 7B). If the registration application is accepted, the applicant becomes a registered system user and is given a user name or identification ("ID") and password.

Referring back to FIG. 4, where the system and method user that attempts to log on at block 202 as an existing member (block 212), a user authentication or verification procedure is undertaken. The processing for an existing member login is associated with page 3 of the Web Site, and the associated processing is outlined in FIG. 6. With reference to FIG. 6, processing for Existing Member Login (starting at block 212) begins by verifying the user ID and password (block 370). If they do not match the user ID and password for a given user (block 372), the system queries to determine whether the user ID or password are associated with a high risk user (block 374). If not, processing is returned to block 370 for reentry and verification of the user ID and password. If it is determined at block 374 that a high risk user is involved, processing is transferred to block 376, where a set of "failed login criteria" are checked. A high risk user may be any system user or talent on the system which poses a relatively high risk of unauthorized access attempts. In the movie field, for example, the high risk users may include major or "list" actors and actresses. The high risk users in connection with the preferred embodiment and method are defined or predetermined through system administration, as discussed in greater detail below. Block 376 may and preferably does involve allowing the user to log in several times, preferably two or three, before determining that the user is to be considered unauthorized and a possible fraud.

Block 378 represents actions that may be taken where a high risk user is detected at block 374. This processing may and preferably does depend at least in part on which if any of the failed login criteria of block 376 have been met. The actions associated with processing for block 378 may include suspending an existing account, generating a notification for further action, providing warnings to the user, attempting to obtain further information from the user, etc. Upon completion of the processing in block 378, the user optionally but preferably is logged off of the system and the method terminates (block 380).

Returning to block 372 of FIG. 6, if the user ID and password match for a particular registered user, processing continues at block 390, at which the credential or category of the user is established. This processing may and preferably is used to determine the landing page or entry point within the preferred system and method for continued access and processing. Examples of credentials or classes within the meaning of block 390 may, for example, comprise a subscriber (subscriber talent) an agency administrator, an agency "Super User" (described in greater detail below), an agent, an "Other Professional," and the like.

In accordance with one aspect of the invention, access is enabled to the stored talent file of the one of the plurality of performing artists by the one of the talent representative entities associated with the one of the plurality of performing artists, and access is denied to the talent file of the one of the plurality of performing artists by the talent representative entities other than the one of the talent representative entities associated with the one of the plurality of performing artists. The talent representative entity may comprise a talent representative, such as a talent agent, a talent agency, a plurality of talent agents within the talent agency, a group of affiliated talent agencies, a talent manager, and/or the like, as noted above. Similarly, the one of the talent representative entities may comprise a plurality of talent representatives, one of the talent representatives of the one of the talent representative entities being associated with the one of the plurality of the performing artists, and the enabling of access to the stored talent file of the one of the plurality of performing artists by the talent representative entity may comprise enabling access to the stored talent file of the one of the plurality of performing artists to the talent representative associated with the one of the plurality of performing artists and denying access to the talent file of the one of the plurality of performing artists to talent representatives of the one of the talent representative entity other than the talent representative associated with the one of the plurality of performing artists.

In accordance with the system aspect of the invention, access control means operative with at least one of the processing means and the storage means is provided for enabling access to the stored talent file of the one of the plurality of performing artists by the one of the talent representative entities associated with the one of the plurality of performing artists, and for denying access to the talent file of the one of the plurality of performing artists by the talent representative entities other than the one of the talent representative entity associated with the one of the plurality of performing artists.

In system terms, the access control means according to the presently preferred embodiment comprises processor 22, storage 24 and 26, and associated software for storing, retrieving and applying the set of authorizations and accesses that are afforded to each system user. As implemented in the presently preferred system embodiment and method, once the credential or class of the user have been established, the preferred system and method continue processing at block 392 to identify the user rights authorized for that specific user, and a session handle is assigned. Processing in block 392 may and preferably does comprise the use of a "privileges matrix" table, or the like. One axis, side, or dimension includes various rights or privileges with regard to the system and method, and on the other side or axis lists the registered users. Other designs or configurations, however, are possible. With such means, access to the system and method, and more specifically access to specific files within the system and method, may be limited or restricted and controlled. Agents from one agency may be prevented from having access to talent files of any other agency. Similarly, agents of a given agency may be restricted so that they have access only to the talent files of the performing artists they represent, even to the exclusion of other talent files for performing artists represented by other agents within their agency. Similarly, these access control means may be used to define and restrict or control the authorization or ability to modify, delete, or otherwise affect such files. They may be used, for example, to enable Agency Administrators and Agency Super Users to have the appropriate access, but no more.

Once processing in block 392 is completed, control of processing is transferred to the page of the Web Site that is appropriate for that class of user, and possibly that specific user. Specifically with regard to the preferred system embodiment and method, if the user is a subscriber (block 394), control is transferred to the Subscriber Home Page (page 5 of the Web Site, FIG. 8 here). If the user is an agency administrator (block 395), control is transferred to the agency Administrator Home Page (Web Site page 6, FIG. 9). If the user is an agency Super User, processing also is transferred to the Agency Super User Home Page (page 6 of the Web Site, FIG. 10) (block 396). If the user is an agent, processing is transferred to the Agent Home Page (block 397), which is page 8 of the Web Site (FIG. 11). If the user is an "Other Professional," processing is transferred to the Other Professional's Home Page (block 398) that is page 8 of the Web Site (FIG. 12).

In the presently preferred system embodiment and method, the privileges matrix, in conjunction with the user's user name and password, define or designate the class of the user (e.g., subscriber talent, professional talent, talent representative entity, Other Professional, etc.), the specific talent representative entity involved, if there is one, related or affiliated talent representative entities, if applicable, etc. As to talent representative entities, it also may and preferably does comprise the specific talent, e.g., the professional talent, whom the talent representative entity, and/or the specific talent representative, is associated. This would include, for example, the fact that Talent Agent No. A1 is with Talent Agency A, and is the agent for professional talent PT-A1 and PT-A2. Talent Agent No. A1 also may be given access to the talent file for professional talent PT-A3, because PT-3 is associated with Talent Agency A. Talent Agent No. 1, however, may not be given access to the talent file for professional talent PT-B1, because he or she is not associated or affiliated with him or her, and professional talent PT-B1 therefore is not associated with that agent. Other agents from Talent Agency A similarly would be denied access to talent files for professional talent PT-B1 for the same reason.

In this embodiment and method, restricted accesses are implemented and controlled by providing each talent representative with a pass code or related access code. This code would be entered by the talent representative entity or members of it to access talent associated with that representative entity. The access control means thus may comprise logic means operatively coupled to the processing means, and preferably integral with the processing means and part of it, for comparing a pre-stored talent representative entity or talent representative access code with a user-inputted code provided by the system user. The logic means may comprise, for example, the arithmetic logic unit of processor 22 or comparator circuitry within processor 22. If the pre-stored talent representative entity access code matches the user-inputted code, it causes the processing means to enable the system user to have access to the stored talent file of the one of the plurality of performing artists. It also may comprise a lockup table that correlates users with accessible talent files or other rights and/or privileges.

It was noted above, for example, with reference to FIG. 1, that the preferred system embodiment and method comprise a system administration. The implementation of this system administration in the presently preferred system embodiment and method comprises processing and flows as shown in FIG. 7 (comprising FIGS. 7A and 7B), which comprises page 4 of the preferred Web Site.

The system administration processing begins when the System Administrator (an internal system user authorized to access and use the system administration software and processing functionality as described here), logs onto the system, as indicated at block 400 of FIG. 7. The system prompts the System Administrator to enter his or her user ID and password, at block 402. The system software processes this information at block 404 by checking it against the user IDs and corresponding passwords of authorized system users. If they do not match, processing continues at block 406 to determine whether the user ID or password are associated with a high risk user, similar to the processing at block 374 in FIG. 6. If a high risk user is identified, block 408 is used to check against failed login criteria, block 410 is used to process and perform functions associated with the presence of a high risk user and the various failed login criteria, and the user may be logged out at block 412, similarly to the processing in corresponding blocks 376, 378 and 380 of FIG. 6.

If the user ID and password are those of a valid and authorized System Administrator in block 404, processing continues at block 414 by establishing the class of user and/or access authorizations. In this instance, the user is a System Administrator, which serves as his or her user class. The user's right are then identified, e.g., using the previously-described privileged matrix, a session identification or handle is assigned, and the user's e-mail inbox is brought up to identify new and unopened e-mails, as indicated at block 416.

Figure 7A:
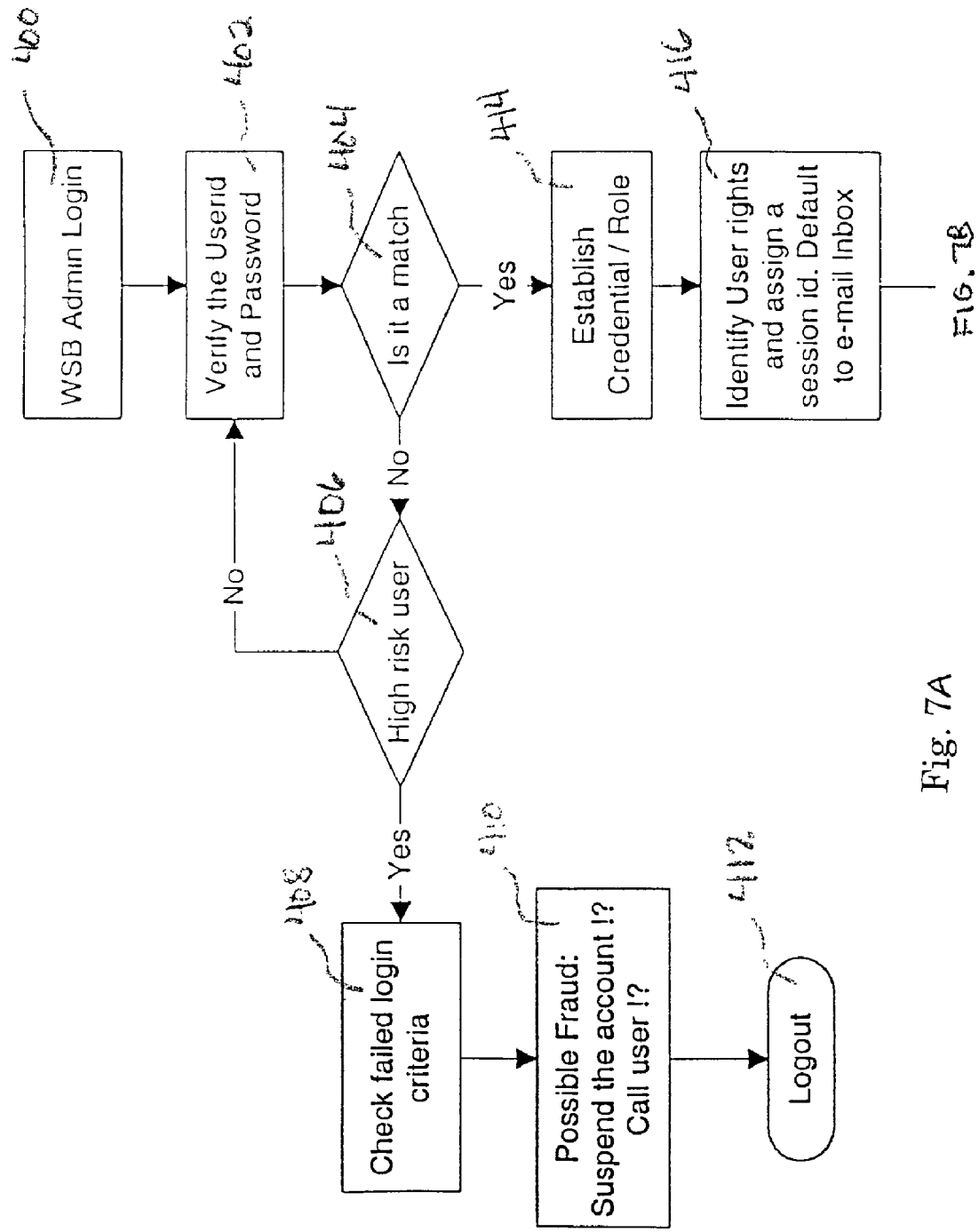
FIG. 7, comprising FIGS. 7A and 7B, comprises flow diagrams illustrating processing associated with System Administration in accordance with the preferred system embodiment and method, and as is associated with page 4 of the preferred Web Site.
Figures 7A, 7B:
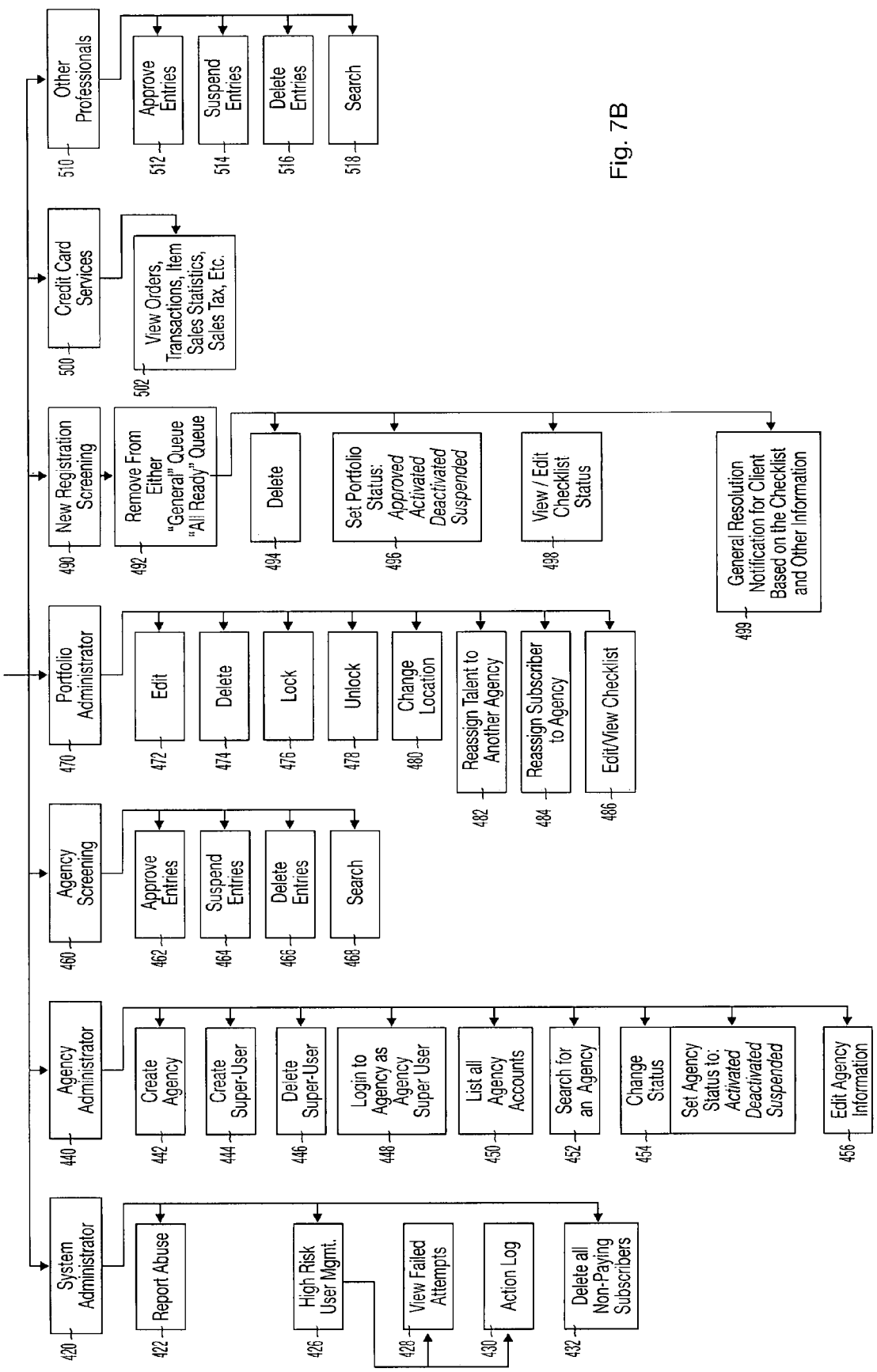

Once processing associated with block 416 of FIG. 7A has been completed, processing continues as shown in FIG. 7B.

Options available to the system administrator in the preferred embodiment and method comprise general system administration (block 420), agency administration (block 440), agency screening (block 460), portfolio administration (block 470), new registration screening (block 490), credit card management services (block 500), and Other Professionals management (block 510).

General system administration processing for the preferred system embodiment and method (block 420) comprises report abuse processing as indicated in at block 422. Processing also includes high-risk user management processing, as indicated at block 426. This processing involves the system administration and management of associated system and method processing related to high risk users, for example, associated with blocks 374, 376, 378 and 380 of FIG. 6 relating to existing member login, and blocks 406, 408, 410 and 412 of FIG. 7A associated with administrator login procedures. The processing features pursuant to high risk user management block 426 include the capability to list and delist users as "high risk," the capability to view failed attempts to log on (block 428), and the capability to view and modify the action log (block 430), which lists any actions to be taken with regard to high risk user-related attempts to log on. See, for example, block 378 of FIG. 6 and block 410 of FIG. 7A.

Processing under block 420 also includes the capability to view, monitor, and modify or delete subscriber account information, as indicated at block 432. Processing under block 432 comprises the ability to delete from the system as authorized or registered users any subscribers that have failed to pay the subscription fee or other required fees according to the terms of their system use, etc.

As specifically implemented in the preferred embodiment and method, the System Administrator is provided with the capability to administer a number of functions and tasks relating to agencies that are registered users of the system and method, as generally indicated at block 440 in FIG. 7B. The System is afforded the capability to create a new agency member (block 442), to create a new Super-User (block 444), or to delete an existing Super-User (block 446). The System Administrator also is given the capability to log on to the system, or gain access to portions of the system, pertaining to a particular subscriber agency, and to access, use, modify, etc. information and files for that agency as if the System Administrator were a Super-User, as indicated at block 448. The system also affords the ability to list all agency accounts, as indicate at block 450, or to search the system for a particular agency, as indicated at block 452. The System Administrator may change the status of an agency registered to the system, as indicated at block 454. Illustrative examples of status categories that may be set for an agency include: "activated," "deactivated," "suspended," and the like. The System Administrator also is given the ability to edit agency information and files, as indicated at block 456.

In accordance with the preferred system embodiment and method, the System Administrator also is provided with the capability to perform agency screening, as indicated at block 460 in FIG. 7B. Processing under the agency screening category comprises the capability to approve entries such as search requests (block 462), to suspend entries (block 464), to delete entries (block 466), and to search agency entries, e.g., to ascertain whether a particular agency appears in the system (block 468).

Also in accordance with the preferred system embodiment and method, the System Administrator is given the capability to administer talent files and talent information using a portfolio administrator, as indicated generally at block 470 in FIG. 7B. Using this portfolio administrator, the System Administrator may perform tasking and functions, and the system and method may perform processing, comprising the following: the System Administrator may edit talent files (block 472), delete talent files or information (block 474), and lock (block 476), unlock (block 478), or change the location (block 480) of talent information files. In addition, the System Administrator may reassign talent to an agency other than the one with which it had previously associated (block 482), or reassign a subscriber (subscriber talent) to an agency if the subscriber talent previously was not associated with an agency but has become associated with one (block 484). The System Administrator also may view and edit checklists for example, used to track portfolio items received from a system user who is a talent information provider (block 486).

New Member Registration (210) has been described above with regard to FIG. 5. As part of that processing or in connection with it, the System Administrator also is provided the capability in the presently preferred system embodiment and method to conduct or have conducted new registration screening processing, as indicated generally at block 490 in FIG. 7B. In processing for new member registration, the preferred system embodiment and method use a "general" queue for listing users and information that have not yet been approved for posting to the system to enable it to be accessed, e.g., by Other Professionals. The preferred system embodiment and method also use a "All Ready" queue, which lists portfolio items that have been approved and are ready to be posted to the system. In accordance with the preferred system embodiment and method, and under new registration screening 490, the System Administrator is given the capability to remove new registration applicants from either the "General" queue or the "All Ready" queue or both. These actions might be taken, for example, as indicated in block 492. The System Administrator also is given the capability under new registration screening processing 490 to delete new registration applications (block 494). The System Administrator also may set the status of a portfolio of a new registration applicant or newly registered member, as indicated at block 496. The status of a portfolio in accordance with the preferred system embodiment and method, for example, may comprise an "Approved" status, an "Activated" status, a "Deactivated" status, a "Suspended" status, and the like. The new registration screening processing 490 additionally gives the capability to view and edit the checklist status of a new registration applicant to a new registrant, as indicated at block 498. Moreover, the System Administrator is given the capability, for example, as indicated at block 499, of generating a resolution notification for the new registration applicant or new registrant based on the status of the checklist for that new registration applicant or new registrant and possibly other information, as indicated at block 499.

The capability of the preferred system embodiment and method also include processing to manage credit card accounts and services, as generally indicated at block 500 in FIG. 7B. The System Administrator is afforded the capability of viewing orders, viewing transactions, viewing and/or compiling sales statistics, calculating or viewing sales tax, etc., as indicated generally at block 502.

The capabilities afforded to the System Administrator by the preferred system embodiment and method further include processing relating to "Other Professionals," as generally indicated at block 510 in FIG. 7B. The System Administrator is given the capability with regard to Other Professionals, for example, to approve entries such as search requests (block 512), to suspend entries (block 514), to delete entries (block 516), and to search these entries (block 518). An entry as the term is used here comprises a search request of the talent files residing within the system.

In the existing member login procedure (block 212) described above with regard to FIG. 6, it was indicated that if the existing member was a subscriber ("subscriber talent") (block 394), processing control was transferred to page 5 of the Web Site (FIG. 8). Processing associated with the Subscriber Home Page will now be described with reference to FIG. 8. The Subscriber Home Page, identified generally at block 550, includes account management (block 552), billing functions (block 554), and portfolio management (block 556). In accordance with the preferred system embodiment and method, each registered subscriber is given an e-mail account or an existing e-mail account is associated with him or her, as generally indicated at block 558. When the registered subscriber first logs onto the system and is transferred to the Subscriber Home Page (block 550), the system for that user defaults to his or her e-mail account inbox, which is part of the e-mail account at block 558. This e-mail account also permits the subscriber to send e-mail, with or without attachments, to organize incoming and outgoing email, files and messages, etc. The subscriber as part of the preferred system embodiment and method also is given a "Guest Pass" capability, as indicated generally at block 560 in FIG. 8, as will be described in greater detail below.

Account management processing (block 552) for the Subscriber Home Page (block 550) comprises the ability to change the password for the registered subscriber (block 570), to modify contact information (block 572), and the like. Billing processing (block 554) comprises the ability to change the credit card number for the subscriber (block 574), to make payments or check payment status (block 576), and the like.

Processing according to the preferred system embodiment and method for managing subscriber talent information and portfolios is outlined under block 556 in FIG. 8. The System Administrator or manager may receive subscriber talent information from the subscriber or his or her representative. This information may be provided in any one or any combination of a number of different formats. These formats may include digital forms such as machine-readable text, such as resumes, bio statements, personal profiles, etc., digitized photographs or graphics, non-digitized photographs and/or graphics (hard copies), video, audio, and others. For the non-digitized formats, the system and method may comprise converting these formats into digital form. With hard copy photographs, for example, a scanner may be used to scan the photograph and create a digital image of it. Audio materials similarly may be converted to a digital format, for example, using known techniques. In accordance with the preferred system embodiment and method, the receipt and possible digitizing of such information is indicated generally at block 580 in FIG. 8. It may be necessary and/or appropriate to edit this media to make it compatible with the system, improve its quality or consistency, etc., as generally indicated at block 582. Each item of talent information then is marked with source information, for example, such as the subscriber ID, the date and time received, the type of file or item. The digitized and properly formatted item or items the are forwarded to the "Quality Assurance Queue," as generally indicated at block 584.

As part of this portfolio management processing (block 556), a number of tasks and functions are performed by the preferred system embodiment and method. These include, for example, viewing the subscriber talent information item (block 586), and updating it (block 588), for example, as comments are received, as it becomes desirable to improve or refresh the item, etc. The subscriber, for example, may update, replace, amend, etc., his or her biographical statement (block 590), personal profile (block 592), personal credits (block 594), reviews (block 596), and any other characteristics that are included as part of the talent information for that subscriber (block 598).

In accordance with another aspect of the invention, a method is provided for facilitating transactions involving a plurality of performing artists. The method comprises storing on a machine-readable medium a plurality of talent files, wherein each of the talent files comprises talent information for the one of the plurality of the performing artists. The method also comprises issuing at least one guest pass for a guest pass accessible one of the talent files, communicating the at least one guess pass to a guest pass holder, and enabling access to the guest pass accessible one of the talent files to the guest pass holder.

The guest pass may comprise, for example, an access code, a password, a card, and the like. The guest pass holder normally and preferably comprises a non-registrant, i.e., an individual or organization that is not registered for routine use of the system or method. Access to the one of the guess pass accessible one of the talent files is denied to non-registrants other than the guest pass holder. The guest pass holder may and preferably does comprise one or more talent information users.

In accordance with a separate but related aspect of the invention, a system is provided for facilitating transactions involving a plurality of performing artists and a guest pass holder. The system comprises storage means for storing a plurality of talent files. Each of the talent files is associated with one of the plurality of performing artists and comprises talent information for the one of the plurality of the performing artists. The storage means may and preferably does comprise a storage subsystem of a computer, which in the preferred embodiment comprises storage devices 24 and/or 26.

The system further comprises processing means operatively coupled to the storage means for processing a request from the guest pass holder for access to one of the talent files. The processing means preferably comprises a processing device operatively coupled to the storage subsystem for processing a request by the guest pass holder for access to one of the talent files. In the preferred embodiment, it comprises processor 22 and associated components as described above. The system further comprises user interface means operatively coupled to the processing means or device for communicating the request for the one of the talent files and a guest pass code to the processing means, and for selectively communicating the one of the talent files to the guest pass holder. In the preferred embodiment and method, the user interface means comprises an interface device that enables the guest pass holder to interface with the system to thereby use the guest pass to access the authorized file or files. The user interface may and preferably does comprise the computer or network used by the guest pass holder to access the system, e.g., 80-7, 80-8 etc.

The system further comprises access control means operative with at least one of the processing means and the storage means and responsive to a guest pass code for enabling the access to the one of the talent files by the guest pass holder upon receipt of the guest pass for the one of the talent files. The access control means preferably comprises an access control subsystem operative with at least one of the processing device and the storage subsystem and responsive to a guest pass code provided by the guest pass holder for enabling the access to the one of the talent files upon receipt of the guest pass code. This may comprise a processor such as processor 22 and associated circuitry as described above for processing the guest pass request and enabling access only where the user has a valid guest pass.

The access rights granted to the guest pass holder to the talent file or files for which the guest pass applies preferably but optionally are limited relative to a system registrant of the same type. A non-registered talent information user who has a guest pass, for example, preferably would have more limited access to a given talent file than a registered talent information user, although this is not necessarily the case. Limitations on the guest pass rights relative to fully registered members having full access to a particular talent file may comprise, for example, granting access to the guest pass accessible talent file or files to the guest pass holder only for a limited period of time, and/or only for a limited number of accesses. The limitations also may be in the form of a limited portion of the guest pass accessible one of the talent files. In this case, for example, the guest pass holder may be given access to a limited set of photographs or audio clips, but not to others, and perhaps not to video clips within the talent file.

As implemented in the presently preferred system embodiment and method, these features are embodied in what may be referred to as a "Guest Pass," as generally indicated at block 560 in FIG. 8. In accordance with this Guest Pass implementation, each subscriber performing artist or subscribing talent may be given the opportunity to provide a Guest Pass to individuals of his or her choosing. Normally, access to subscriber talent information is not given to anyone who is not a registered user of the system and/or method. Moreover, even for registered users, talent information for a given subscriber is only accessible by that subscriber, and by industry professionals or talent information users who are registered. It is not generally available to other subscriber talent.

If the subscriber performing artist desires to give access, usually on a limited basis, to anyone other than an industry professional registered with the system and/or method or a registered talent information user, they may do so by giving that individual a Guest Pass authorizing him or her to gain access to the authorized talent information for that subscriber. The Guest Pass may be implemented by causing the system and method to provide the predefined access when the Guest Pass holder demonstrates the authorization to access this information. This may be and preferably is implemented by designating one or more unique passwords or other access codes that are required by individuals not normally having access to this talent information. The Guest Pass, for example, might comprise a business card or similar token that identifies the subscriber performing artist, the Web Site domain name for the system and/or method, the subscriber talent ID, and the Guest Pass access code or password. The Guest Pass holder would gain access to the talent file information by logging onto the Web Site (see block 214 in FIG. 4), entering the subscriber talent ID for that subscriber talent, and entering the one or more passwords or pass codes provided with the Guest Pass. This would cause the system to provide access to and/or display the desired subscriber talent file information. This access may comprise the entire subscriber talent file for that subscriber, or a limited portion of it, such as a resume and selected photographs, a specifically designed display or page specifically created for such guests, etc.

In the presently preferred system embodiment and method, the guest would be permitted to view the authorized talent file information, as generally indicated at block 600 in FIG. 8. As indicated above, this talent information may or may not be the same information that would be made available to talent information users who are registered to use the system and/or method. Normally, and preferably, however, the Guest Pass portion 560 of the Subscriber Home Page 550 would permit only the specific subscriber talent for that talent file to gain access to or view the Guest Pass information, preferably in addition to the System Administrator. This Guest Pass information may comprise, for example, the number of Guest Passes issued, to whom the Guest Passes have been issued (if assigned), the passwords or pass codes associated with the Guest Passes, the information accessible from a given password or pass code, the instances in which the Guest Pass has been used to access the talent information, and the like. In addition, the preferred system embodiment and method provide the ability to create Guest Passes (block 602), to delete them (block 604), and the modify them (block 606).

The guest pass capability as thus far described has focused on those issued by subscribers. It is possible for guest pass access also to be given by the system users, such as talent representatives and entities, and professional talent.

In accordance with the preferred embodiment and method, a talent representative organization administrator is designated for each of the talent representative organizations. The talent representative organization administrator then is used for one of the talent representative organizations to designate selected ones of the talent representatives within the one talent representative organization to be an authorized talent representative. The talent representative organization administrator has authority exclusive of the talent representatives of the one talent representative organization to make the designation of the authorized talent representative. Access by the authorized talent representative is then enabled to the stored talent files of the performing artists associated with the one of the plurality of the talent representative organizations, and access is denied to the talent files of the performing artists associated with the one of the talent representative organizations by the talent representatives other than the authorized talent representative. Optionally, a plurality of talent representative organization administrators may be designated.

In accordance with the Web Site implementing the preferred system embodiment and method, the Site comprises an Agency Administrator Home Page. That page according to the presently preferred system embodiment and method will now be described with reference to FIG. 9. As indicated in FIG. 6 with regard to the Existing Member Login, an Agency Administrator who is an existing member of the system and/or method may log on to the Agency Administrator Home Page (block 395). The Agency Administrator Home Page as implemented in the preferred system embodiment and method and processing according to them are outlined in FIG. 9. The "Agency Administrator" as used herein refers to the person or persons who have the responsibility for the normal or day-to-day administration of the files and information for that agency on this system, including talent files for talent represented by that agency. When the Agency Administrator Home Page 395 is opened, processing begins by opening the e-mail for the Agency Administrator, and defaulting to the Inbox of that e-mail, as indicated at (block 620).

The preferred system embodiment and method provide for three categories or levels of agency administration: "Agency Management" category 622, an "Agent Management" category 624, and a "Talent Management" category 626.

The Agency Management category 622, includes management of information, events, etc. involving the agency itself. An example of such management would include the ability to modify the contact information, such as the address, telephone numbers, etc., of the agency as maintained on file with the system, as indicated at block 630.

Agent Management 624 involves management as it relates to the system and method for agents within an agency. Accordingly, such agent management may comprise, for example, listing or compiling lists of agents for that agency (block 632), creating authorizations or accesses for new agents of the agency, and editing of such authorizations, etc. (block 634), deleting agents or authorizations for agents with regard to the system and method (block 636), suspending agents or agent authorizations with respect to the system and method (block 638), reinstating such agents or agent authorizations (block 640), assigning or reassigning passwords or other access codes for or otherwise relating to the agents (block 642), and the like. This information preferably would comprise and interact with the information in the privileges matrix or its functional equivalent to control authorizations and accesses for the agents.

Talent Management 626 as it relates to agency administration is outlined at and under (block 626). This relates to management of talent that is associated with the given agency, but at the agency level as opposed to the individual agent level. In many agencies, each performing artist associated with an agency typically is assigned to an individual or agent or agents within the agency. The individual agents are responsible for many of the tasks relating to the talent assigned to him or her. There are tasks and information, however, that relate to the talent that is more of interest to the agency as a whole than merely to the assigned agents or agents. Talent Management block 626 generally relates to the latter. Under block 626, the Agency Administrator may add a new performing artist (block 650), edit the talent file or files of an existing performing artist associated with the agency (block 652), suspend activities, authorizations, etc. with regard to a particular performing artist (block 654), lock the talent files or accesses associated with a particular performing artist (block 656), or unlock it (block 658), and the like. The Agency Administrator also may search the agency database (block 660) and/or the system database 662. The Agency Administrator may, for example, may "go live" or communicate directly in real or near real time with the talent (block 664), he or she may consult or modify the calendar or availability of the talent (block 666), he or she may delete a talent file (block 668), he or she may register a new talent within the agency with respect to the preferred system and method (block 670), and the like.

The implementation of the Agency Super User will now be described with reference to FIG. 10. An "Agency Super User" or "Super User" as the terms are used herein refers to an individual or individuals who are within or authorized by a particular agency to have full access and authorization over any activities or information relating to that particular agency or the agents in it. As indicated above with regard to the Existing Member Login 212, in FIG. 6, a registered member who is authorized as an Agency Super User and who successfully logs on to the system with the appropriate user ID and password may go the Agency Super User Home Page 396. In the preferred implementation, this Agency Super User Home Page is part of page 6 of the Web Site, together with the Agency Administrator Home Page 395.

When the Agency Super User Home Page 396 is called up, it defaults to the e-mail Inbox of the Agency Super User, as indicated at (block 780). From this default location, the Agency Super User may undertake tasks or processing relating to the activity log (block 782), the Agency Super User may undertake administrator account management tasks or processing (block 784), the Super User may undertake activities or processing relating to or supporting agency administrator features (block 786), the Super User may undertake tasks and/or processing relating to or supporting talent representative tasks and features (block 788), and the like.

In accordance with the preferred system embodiment and method, as tasks and transactions are undertaken, e.g., by the agents or agent administrators for a given agency, an Activity Log is created and/or updated for a given agency. This Activity Log, therefore, provides a running list that reflects the activities of that particular agency. As indicated at block 782 in FIG. 10, the Agency Super User may undertake activities relating to the Activity Log, which may comprise viewing the submission activity of agents associated with the agency. In this presently preferred system embodiment and method, the Super User may not delete or modify the talent files for his or her agency, but merely may view them. This enhances system integrity and data management and control. It is possible, however, to permit the Super User to have such capabilities in other embodiments.

Administrator Account Management capabilities and processes relating to Administrator Account Management (block 784), relate to the controls and authorizations pertaining to the Agency Administrator or Agency Administrators for the given agency. Accordingly, such tasks and processing under block 784 may comprise, for example, adding an administrator account or authorization (block 800), modifying an Administrator account, authorization, etc. (block 802), deleting an Administrator account, authorization, etc. (block 804), and the like. Thus, this aspect of the preferred system and method may be used by an Agency Super User to monitor and control the accesses and activities of an Agency Administrator.

Figure 10:
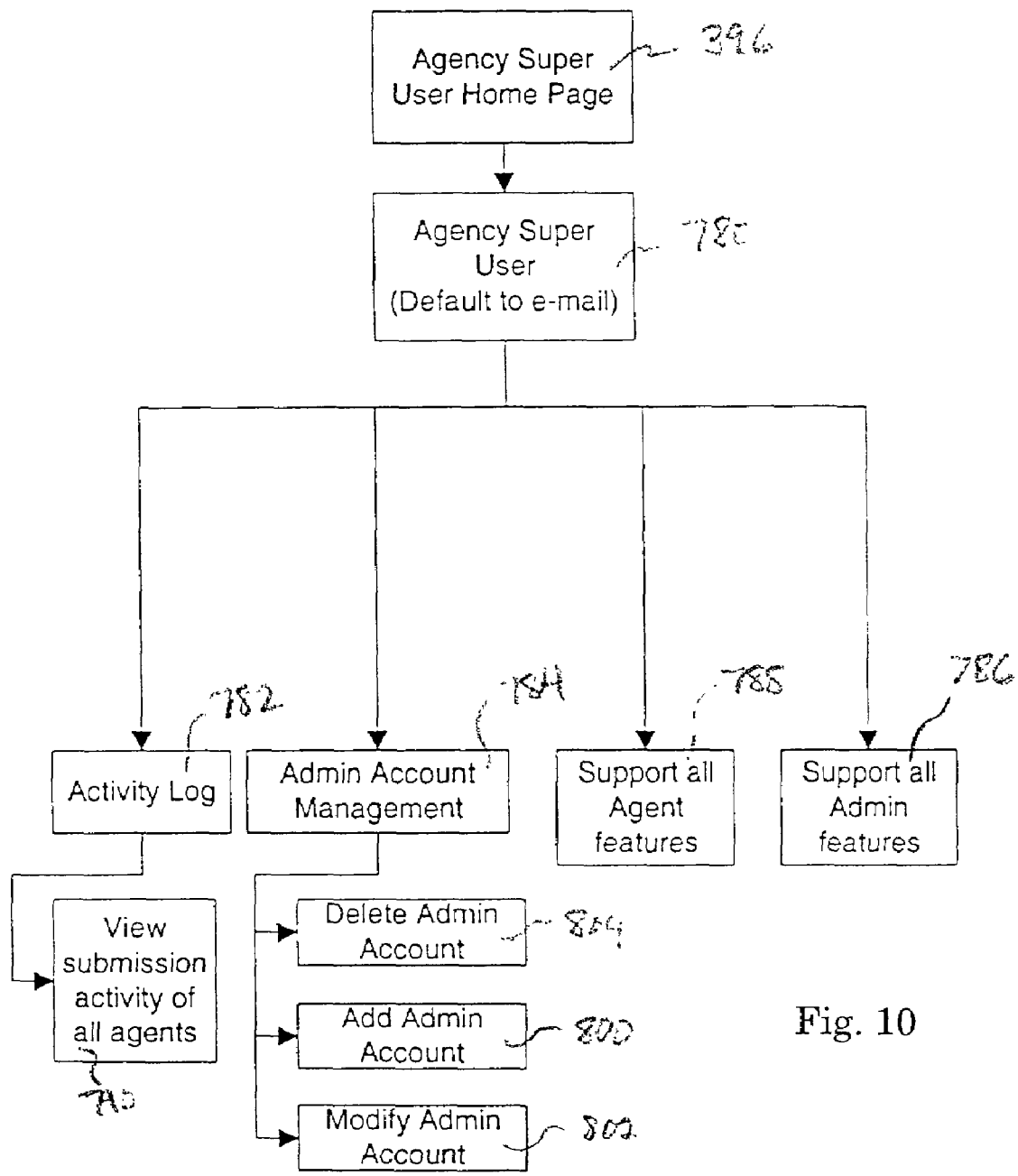
FIG. 10 is a flow diagram illustrating processing associated with the "Agency Super User Home Page" in accordance with the preferred system embodiment and method, and as is also associated with page 6 of the preferred Web Site.
Figure 11:
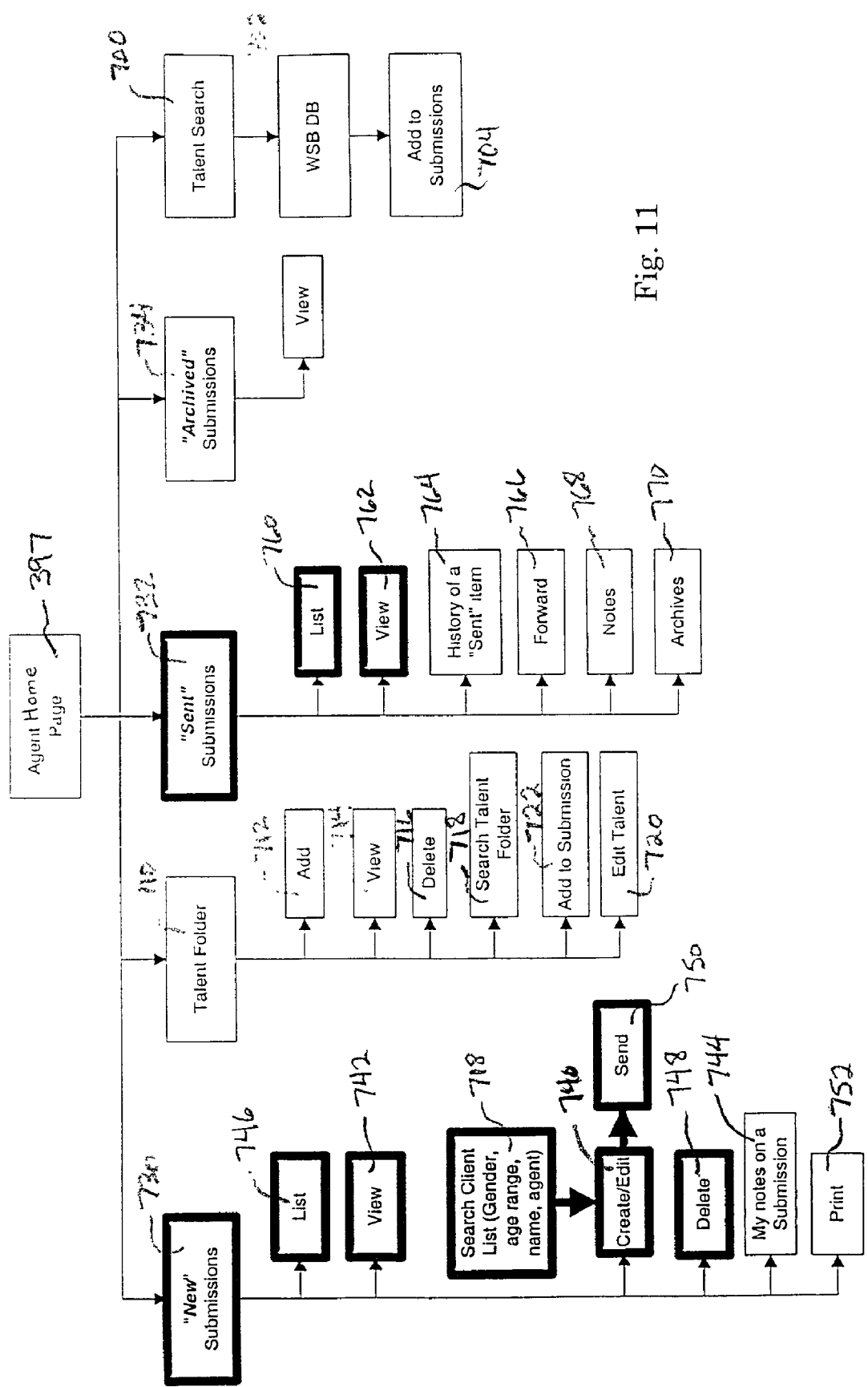
FIG. 11 is a flow diagram outlining processing associated with the "Agent Home Page" in accordance with the preferred system embodiment and method, and as is associated with page 7 of the preferred Web Site.

The activities and processes represented by block 788 in FIG. 10 reflect the capability of the preferred system and method to enable the Agency Super User to monitor, support, control, etc. the activities and processing relating to the agents associated with that particular agency. Through the capability and processing for the Agent Super User relating to Agency Administrator features (block 786), the Super User is provided with the capability and processing to enable him or her to monitor, interact in, control, etc., the Agency Administrator tasks and processing as described herein above, and as graphically outlined in FIG. 9. Also, these activities and processing are generally outlined herein above, and as more specifically graphically outlined in FIG. 11 relating to the Agent Home Page 397.

As has been noted, according to one aspect of the system and method according to the invention, access to a stored talent file of a given one of the performing artists associated with, e.g., represented by, a given agency or other talent representative entity is limited to only that agency or entity. In this instance, for example, if performing artist PT-A1 is represented by agency A, only agents within agency A may gain access to the file for PT-A1. The Agency Super User for agency A, of course, also would have access, as would the Agency Administrator or Administrators for Agency A. Agents, Super Users and Agency Administrators from agencies other than Agency A, however, would be denied access. The agent or agents who are responsible for, and who represent, a given performing artist, having access to the talent file for the represented talent, have a number of options for managing and using the talent file. This is illustrated in the presently preferred system embodiment and method through the Agent Home Page or Agent Landing Page, which comprises Page 7 of the preferred embodiment and method Web Site.

The Agent Home Page or Agent landing page 397 for processing agent-related transactions will now be described with reference to FIG. 11. "Agent" refers not only to talent agents, but also to other forms of talent representatives, such as managers and the like. As was explained with reference to FIG. 6, when an agent who is an existing member of the system and/or method logs on successfully, processing is transferred to the Agent Home Page 397. Agent-related aspects of the preferred system embodiment and method as implemented with this Agent Home Page and the related flows are shown in FIG. 11. These aspects as implemented here include a talent search capability, as indicated in block 700. This talent search capability comprises, for example, an ability to conduct a search of the subscriber talent files, to the extent they are not restricted, as indicated at block 702. This search capability also may comprise the capability to search within the talent files of the agency with which the agent is associated to identify talent. As talent is identified through this talent search capability, the performing artists identified in the search or searches may be added to submissions, as indicated at block 704 and as described in greater detail below.

The Agent Home Page also includes a talent folder management capability, indicated generally by block 710. These talent folder management capabilities include the ability to add a new folder, or add talent information to an existing folder (block 712), to view talent folders (block 714), to delete talent information in the talent folders (block 716), to search within a talent folder (block 718), to edit a talent folder (block 720), and the like. The talent folder management capabilities also comprise the ability to add a talent folder to a "submission" (block 722).

The Agent Home Page capabilities 397 in accordance with the preferred system embodiment and method also comprise the ability to manage submissions. A "submission" as the term is used herein refers to talent information, usually comprising one or more talent files that are submitted, usually by a talent representative, to a talent information user, generally for the purpose of interesting the talent information user in enlisting the services of the performing artist that is identified or is presented in the submission. As an example, when a talent information user, such as a movie producer, announces that a new movie will be made and identifies the roles or characters that will appear in the movie, this information is normally translated into a compilation and description of the role commonly referred to in the industry as a "breakdown." The breakdown is communicated to various professional talent representatives, most notably talent agents and/or talent agencies. This notification may be undertaken using the preferred system embodiment and method, as will be described in greater detail below. After having received this notification, e.g., the breakdown, the talent representative reviews it, in some cases performs a search to identify talent that would be a qualified candidate for the role or roles, and collects or compiles talent information for the performing artists that are believed by the agent to be qualified candidates for the role. This talent information is compiled into a package of information comprising the talent files or talent information, preferably packaged in a way to enlist the interest of the talent information user, e.g., the producer or casting director, and the information is submitted to the talent information user. This collection of information that is ultimately communicated by the talent representative to the talent information user is the "submission."

In the preferred system embodiment and method, the talent representative or "agent" has the ability, pursuant to Agent Home Page processing, to perform submission management processing, for example, comprising the ability to prepare new submissions (block 730), to view and manage submissions that have been previously sent (block 732), the ability to manage "archived" submissions (block 734), and the like.

New submission management and processing 730 in accordance with the preferred system and method comprise the ability to create (block 740), view (block 742), edit (block 740), annotate (block 744), list (block 746), delete (block 748), send (block 750), and print (block 752) a new submission or submissions. The creation and/or editing of a new submission (block 740) may comprise searching talent folders or talent information, such as the agent's own client list, the client list of his or her agency, etc., to identify certain performing artists as candidates for submission. This search also may be subscriber talent or it may comprise the search results of performing artists in other categories or databases, including those that may exist independently of the third system implementation. This searching may comprise searches pertaining to specific gender, age range, name, agent, agency, etc., as indicated in block 718 for new submissions 730.

The "sent" submissions aspects 732 of this embodiment and method refers to the ability afforded to the talent representative to manage and utilize submissions that already have been sent to a talent information user. Sent submissions processing under block 732 in FIG. 11 comprise the capability to list the sent submissions (block 760), to view them (block 762), to obtain information about the history of a "sent" item or submission (block 764), to forward a sent submission (block 766), to prepare notes regarding a sent submission (block 768) and to move a sent submission to the "archives" (block 770).

Archives of submissions comprise the storage of submissions that are no longer being used on a regular basis, or which are not expected to be used on a regular basis, at a remote or less readily accessible storage location or medium. In the presently preferred system embodiment and method, archiving may be accomplished by utilizing a separate "Archived Submissions" file folder or storage area in which archived submissions, such as those that are inactive, closed, or expected to become closed or inactive may be stored in a way that facilitates faster or more efficient operation of the machine. The archived submissions aspect (734) of the system principally involves viewing the archived submissions, although other archiving functions may be utilized here.

Activities and processing associated with "Other Professionals" may be outlined as part of the Other Professionals Home Page, which in the preferred system embodiment and method comprise page 8 of the Web Site. As has been noted above, "Other Professionals" as the term is used herein refers to talent information users other than talent representatives or talent representative entities functioning in the capability of a representative of a performing artist working in that capability. Common examples of "Other Professionals" would comprise producers, promoters, directors, casting directors, and the like. Talent representatives may fall in the class of "Other Professionals" when they function as talent information users, not on behalf of a particular performing artist that they represent, but in the capability of using talent information to identify new performing artists that they may wish to represent in the future but do not currently. Preferably, however, such persons or entities would be excluded from this Other Professionals class, at least without being granted special access privileges, to avoid the concern among talent representatives and talent representative entities that other talent representatives and/or talent representative entities not be permitted access to the files of talent whom they represent.

Other Professionals typically would be in a position of wishing to receive submissions from talent information providers with an overall objective of identifying and selecting a particular performing artist or artists. In the case of a producer, promoter, director, casting director, and the like, this typically would involve selecting a particular performing artist for a given role. In the case of a talent representative seeking new performing artists to represent, this typically would involve using talent information to identify, select, and hopefully contract with a particular performing artist or performing artists. Other Professionals accordingly are in a position of receiving and using talent information to achieve their objectives. Related tasks for Other Professionals typically would include conducting searches to identify candidate talent, and managing the various talent information and talent files received as part of these functions and objectives.

The Other Professionals who are existing members of the preferred system and method, upon successful completion of the Existing Member Login as depicted in FIG. 6, are taken to the Other Professionals Home Page (block 398), which comprises page 8 of the Web Site according to the preferred system embodiment and method. Capabilities and processing associated with the Other Professionals Home Page are outlined in FIG. 12. Upon opening the Other Professionals Home Page, the Other Professional is presented with a "Submissions" display. Capabilities and processing relating to the Other Professionals Home Page 398 in accordance with the preferred system embodiment and method comprise capabilities, tasks and processing relating to preparing, outputting or distributing, and otherwise managing "Projects" and related role information (block 820), searching capabilities (block 822) to identify talent that may constitute satisfactory candidates for the Projects and Roles, Submissions Inbox related capabilities, functions and processes (block 824), Submission Management (block 826), Talent Folder Management (block 828), and the like.

The Projects Management functionality (block 820) in accordance with the preferred system embodiment and method comprises those tasks, capabilities, processing, etc. to prepare, compile, disseminate, and otherwise manage documents and information relating to "Projects" of the particular of the Other Professional system and/or method user. This input commonly involves enlisting the services of the performing artist or artists, an example of which would include enlisting an actor or actress to play a particular role in a movie, television production, or the like, the provision of a musical performance by a performing artist group of musicians, etc. The "Project" in each of these instances typically involves the overall event in which the input of the performing artist is required. The "role" to which the input of the performing artist will relate comprises the specific input of the performing artist. In a movie, for example, the role might constitute the character that the performing artist will portray in the movie. In the modeling field, the Project may involve the preparation and publication of a catalog, magazine, or print ad, in which case the role would be a particular person or character that a particular model will portray in the catalog, magazine, or print ad.

A given Other Professional may be involved in one or a number of Projects. As part of his or her work in connection with a particular Project, the Other Professional typically will be given information about the overall nature and objective of the Project, the roles that are involved in the Project and need to be filled, and other information regarding the Project, its planning, its timing, its location, etc. The Other Professional typically is required to prepare a notification or announcement that will be disseminated to individuals and entities having talent information concerning performing artist who may be candidates for the roles in the Project. The Other Professional for example, might disseminate the Project information to various talent representatives, such as talent agents, talent agencies and the like. The Project information also may be disseminated more broadly for example, to aspiring performing artists, or made generally available so that both established and aspiring performing artists are reasonably likely to learn about the Project and the roles that need to be filled.

Accordingly, in the preferred system embodiment and method, the Other Professional is given the capability, e.g., pursuant to processing identified by block 820, to disseminate Projects to these various individuals, to establish a file or files for a particular Project, to compile, list and view the history of activities, events, etc., relating to that Project (block 840) to view Projects and Project-related documents and information that have been created, disseminated, etc. (block 842) to copy and/or edit Project-related documents, files and information (block 844), to forward Project-related documents, files, information, and the like (block 846), and similar capabilities and tasks.

The preferred system and method also provide registered Other Professionals with the ability to search the database or databases associated with the preferred system embodiment and/or method, or other databases or sources of information relating to performing artists who may be candidates for the Project and/or role involve. As search results are obtained, the preferred system embodiment and method afford the ability to view and in some cases edit and/or manipulate the search results, and to add part or all of them to the Projects documents, files, etc., and/or to add part of all of the search results to talent-related documents, files and information (block 852) as explained in greater detail below.

In the preferred system and method, certain restricted files may be included within a search of the system database, but in view of their restricted classification, neither the specific performing artist or his or her talent information may be revealed to the external system user conducting the search. In this instance, a code or identifier that serves to identify that performing artist, such as a unique identification number, may be disclosed, and this may be revealed to the system user conducting the search. The system then may provide means for the user to seek further information. The system, for example, may notify the external system user that the file is restricted, but that the user may contact the System Administrator for more information. The System Administrator then may contact the performing artist or his or her talent representative and ask whether there is any interest in having direct communication with the artist or representative. Alternatively, the system may notify the external user conducting the search that the file is restricted, but that he or she may contact the specific talent representative that represents the artist. They then can communicate directly.

The Submissions Inbox functionality (block 824) in accordance with the preferred system embodiment and method comprises the ability to list (block 860), view (block 862), create (block 864), edit (block 866), copy (block 868), send (block 870), and delete (block 872) submissions that are received in the Submissions Inbox. With reference to FIG. 4, it was noted that the screening room (block 216) enables an authorized user to view or "screen" submissions. When an Other Professional logs on to the system and a submission has been sent to him or her, that Other Professional may view the submission, in processing terms, by entering the screening room, wherein the appropriate processing and support enable him or her to view, listen to, read, etc., the submission and its contents.

The submissions management capabilities, tasking and processing (block 826) in accordance with the preferred system embodiment and method relate to previously received submissions. In accordance with this embodiment and method, this submissions management functionality comprises the ability to list (block 880), view (block 882), forward (block 884), and delete (block 886) these previously received submissions.

The talent folder aspects (block 828) of the Other Professional's Home Page 398 relate to the capability and processing for the Other Professionals to select, handle, delete and otherwise process the talent information for specific performing artists that are or may be selected as a candidate for a role in a given project. Talent information preferably is organized under talent folder management 828 by creating a Project folder for each project, a Role folder for each role, and a Talent folder for each talent or performing artist for a given role. The talent folder processing 828 provides the capability for the Other Professional user to add (block 890), view (block 892), delete (block 894), and similarly process or manage talent folders. This talent folder processing aspect 828 also comprises the capability to add a given talent folder or collection of talent folders to a particular project folder or role folder (see generally block 896). In this preferred system embodiment and method, the Other Professional may move or delete a talent portfolio but may not modify it. This is not, however, necessarily limiting as to other embodiments and versions of the method.

Figure 13:
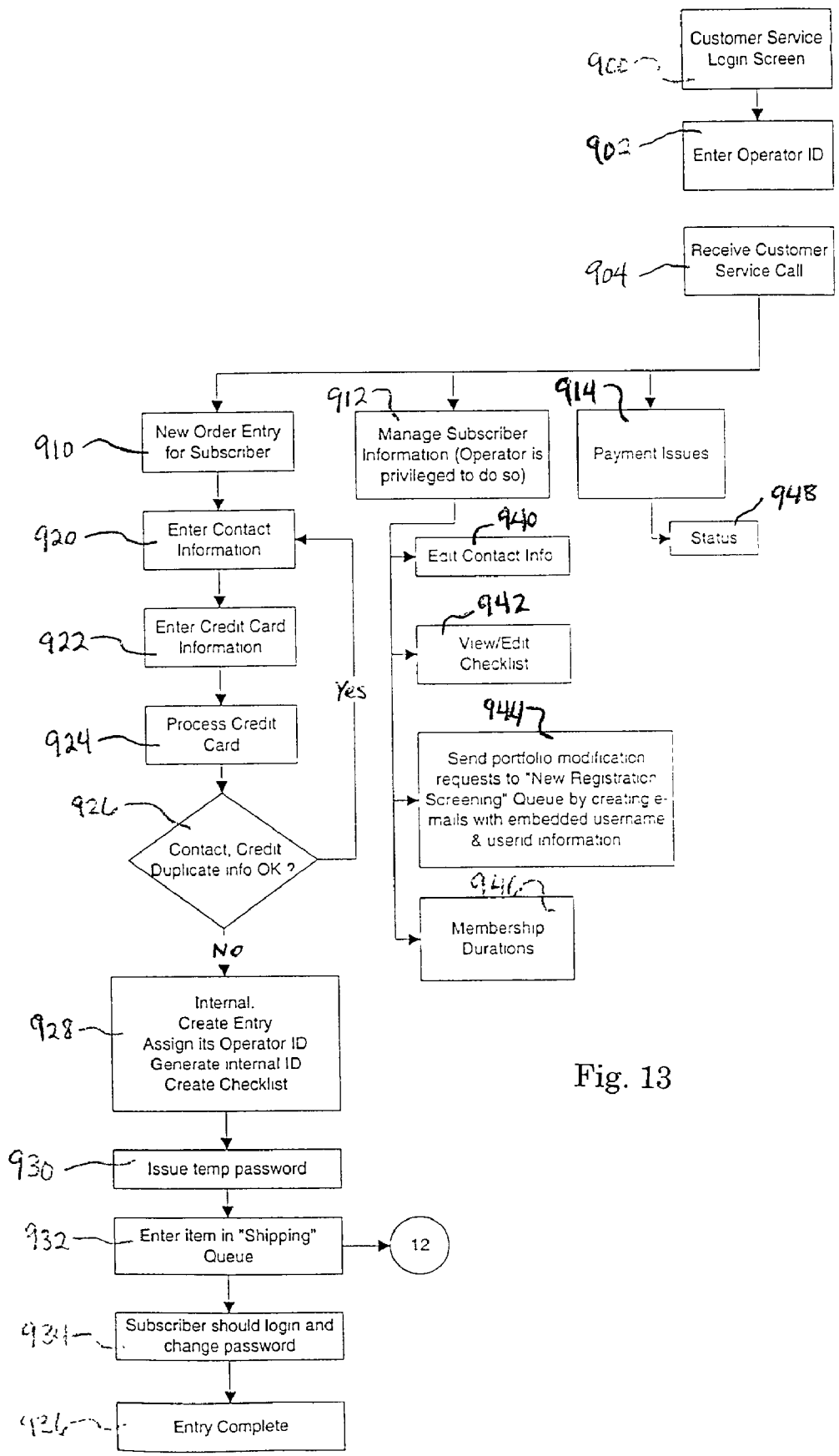
FIG. 13 is a flow diagram outlining "Customer Service" processing in accordance with the preferred system embodiment and method, and as is associated with page 9 of the preferred Web Site.

The preferred system embodiment and method provide a means for individuals to register with the system and method via means other than direct online access. An example of such registration would be a circumstance in which the applicant for registration calls in by telephone to the System Administrator or his or her delegate and provides the necessary information to register. Processing and flows implemented within the preferred system embodiment and method to provide this capability are illustrated in FIG. 13, and comprise page 9 of the preferred Web Site.

This "customer service" functionality is accessed in the preferred system embodiment and method by logging on to the customer service portion of the Web Site. The system and method are adapted to present a Customer Service Login Screen 900. The user responds to a prompt in that screen to enter his or her operator identification (block 902). The system and method then report to the user, preferably by displaying a list on the display monitor all customer service calls (block 904). A customer service call may comprise any task relating to customer service that has been requested or has not yet been completed. Examples of customer service calls in accordance with the preferred system embodiment and method comprise new order entry for subscriber talent registration applications (block 910), management of subscriber talent information (block 912), management of payment issues (block 914), and the like.

Addressing new order entry for subscriber talent (block 910), the procedure implemented in the illustrative preferred system embodiment and method as described herein preferably is as follows. An aspiring performing artist who desires to become a subscriber registered to use the preferred system embodiment and method normally would initiate the process of applying for registration by accessing the Web Site, for example, as illustrated in FIG. 4 at block 200, and selecting New Member Registration (block 210). This would cause processing to be transferred to New Member Registration 210, as generally outlined in FIG. 5. The aspiring performing artist then would make the appropriate selection to indicate that he or she is a performing artist (block 302) where upon processing would proceed along the flow at the left side of FIG. 5. As indicated there, this processing would comprise entry of contact information (block 308) and credit card information (block 310) for the performing artist applicant. Appropriate documents to be sent to the applicant are then generated (block 320), and steps are taken to communicate these documents to the applicant (block 322) either by transmitting them via the Internet or network, by mail, etc. To this processing, the applicant provides the appropriate information, usually comprising the compilation and forwarding of talent information, to the System Administrator or customer service representative. As these materials are received, a "customer service call" is used, for example, by entering the applicant identification, the date of receipt of the materials from the applicant, and the like.

Upon receipt of the materials or information from the applicant and the related customer service call, the customer service representative enters any new or additional contact information related to the applicant (block 920), he or she enters any new or additional credit card information (block 922), and he or she causes the credit card to be processed (block 924). A check is then made to determine whether, based on the information entered thus far for this applicant, the applicant already has been registered or an application for registration from the applicant already has been entered into the system (block 926).

If such duplication exists or appears to exist, processing is returned to block 920 and the user is prompted to reenter or confirm the information. If there is no duplication at block 926, or if the information has been appropriately confirmed, the preferred system embodiment and method create an entry in the database for a new subscriber registrant, attached or assigned to the entry the identification of the operator, a new internal identification number is issued to identify this particular new subscriber, and a checklist is created for use internally to aid in processing and ensure that all tasks, documents, shipments, etc. have been made for the new registrant (block 928). The system then causes a temporary password to be issued for this new user (block 930). An appropriate entry then is made in the "Shipping Queue" (block 932). The Shipping Queue and the information in it is used in this preferred system embodiment and method to facilitate shipment, as will be described in greater detail below. The preferred system and method then cause processing to occur in which the new subscriber will be prompted, either at that time or when the new subscriber next logs onto the system, to change the password to one that is created by the subscriber, and which hopefully will be easier to remember and use by the subscriber (block 934). As this point, new order entry processing for this subscriber is completed (block 936), and processing then preferably is idled to wait for the next customer service call.

The customer service representative is able to manage the subscriber information (block 912) in a number of respects in the preferred system embodiment and method. Examples include the ability to edit contact information for the new subscriber (block 940), the ability to view and/or edit the checklist or checklists related to this new subscriber (block 942), the ability to send portfolio modification requests to the quality assurance processing aspects of the system and method, for example, by creating e-mail or other messages, preferably with the operator user name and user ID information embedded in the e-mail or message, requesting specific modification to the talent information provided by the subscriber (block 944), and the like.

The customer service operator also may address payment issues that may be raised during a customer service call (block 914). The customer service representative, for example, may be provide with the ability to check the status of any payments made or received on behalf of a subscriber or other registrant (block 948). Messages also may be received from or on behalf of the registrant.

As has been previously described, in accordance with the presently preferred system embodiment and method, a response is made to a "Subscriber" performing artist who has applied for registration or a subscription on the system by shipping certain materials to that applicant. In connection with the New Member Registration processing (block 210) of FIG. 5, for example, it was noted that a "Shipping Queue" (block 322) was maintained, and that an entry was made where a new member registration application had been successfully processed. Where the subscriber application is made by means other than direct connection to the Web Site and processing according to FIG. 5, e.g., through a customer service call, entries are made to the Shipping Queue (block 932) as indicated in FIG. 13.

Figure 14:
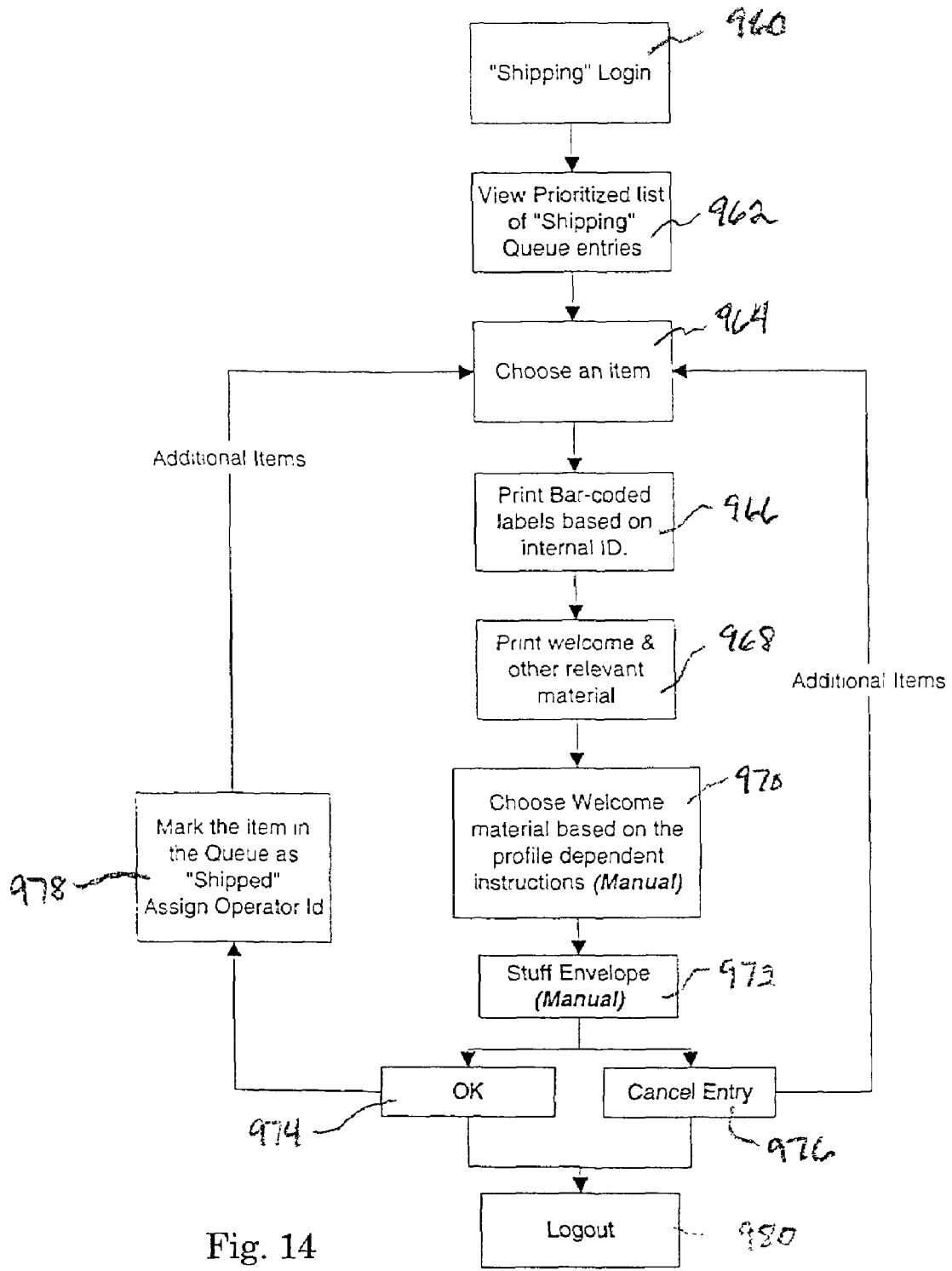
FIG. 14 is a flow diagram illustrating processing associated with the "Shipping" in accordance with the preferred system embodiment and method, and as is associated with page 10 of the preferred Web Site.
Figure 15:
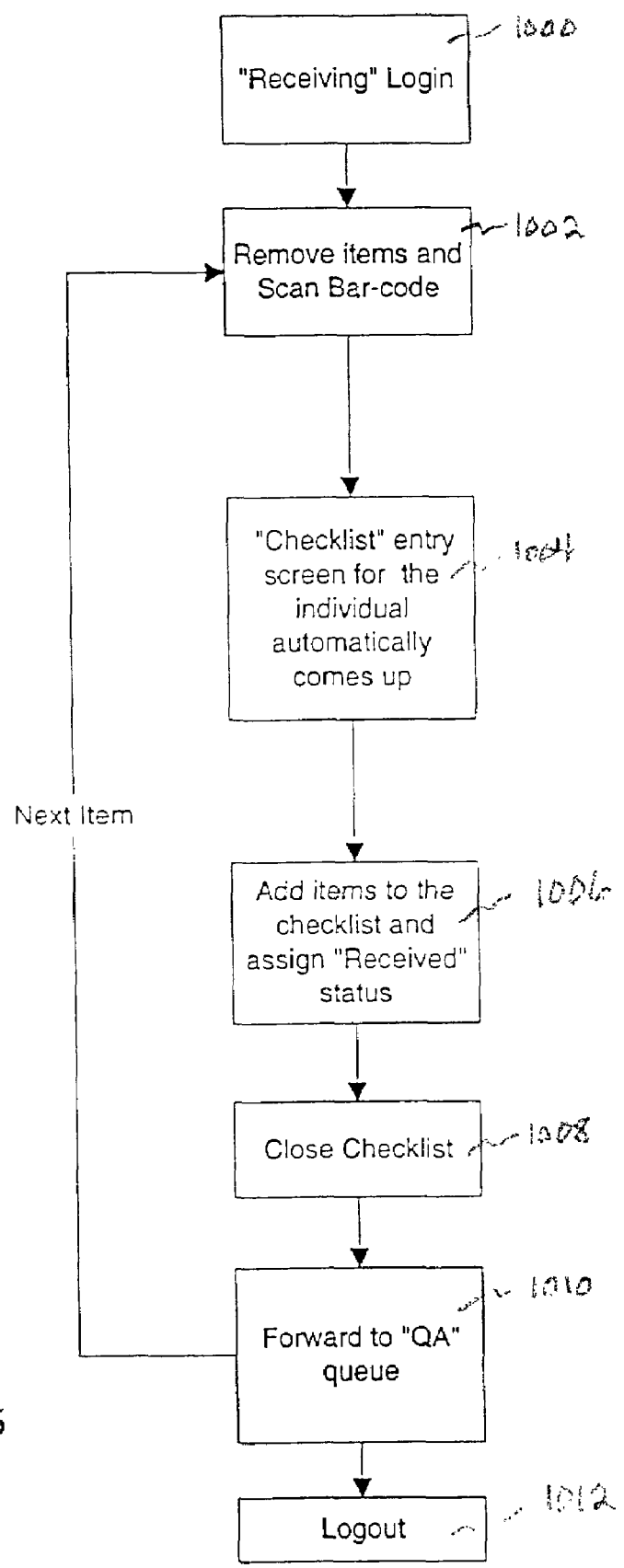
FIG. 15 is a flow diagram illustrating processing associated with "Receiving" in accordance with the preferred system embodiment and method, and as is also associated with page 10 of the preferred Web Site.
Figure 16:
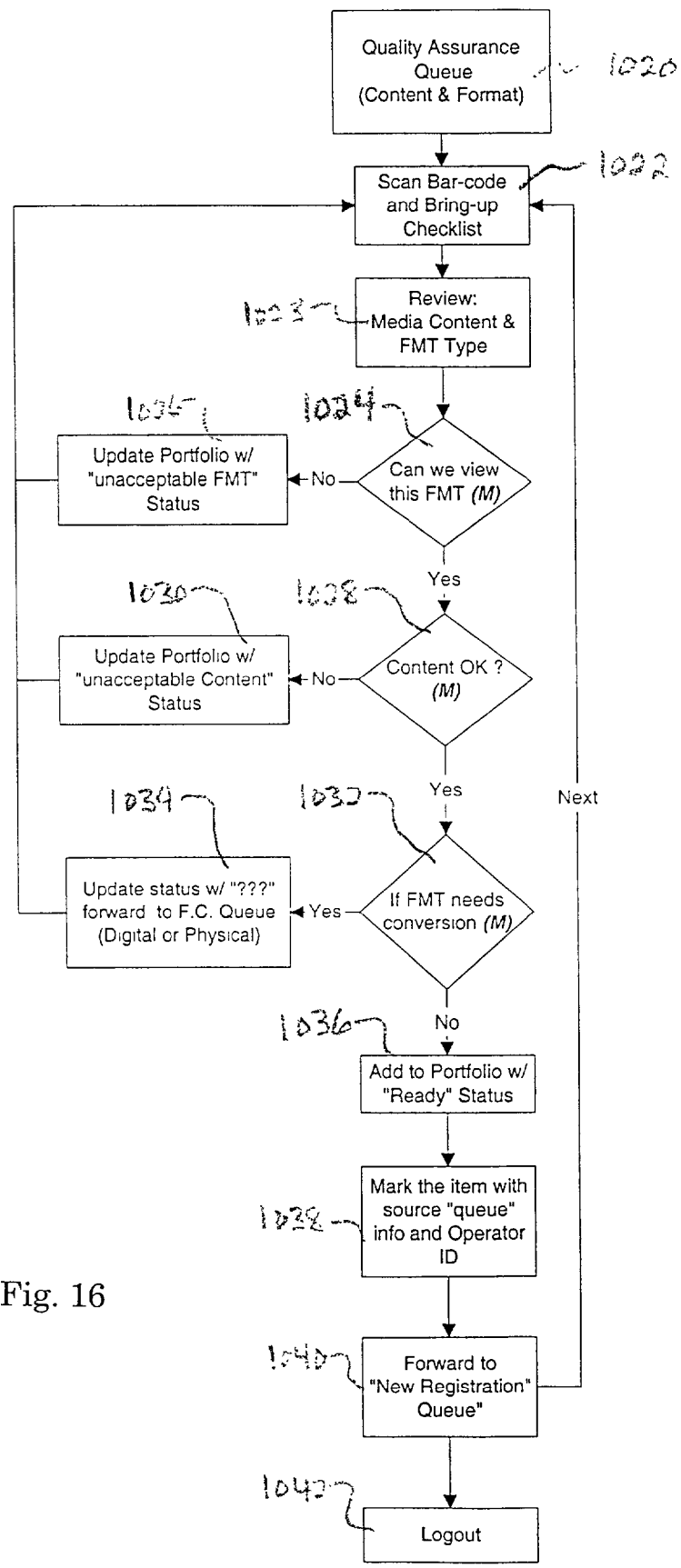
FIG. 16 is a flow diagram illustrating processing associated with "Quality Assurance" in accordance with the preferred system embodiment and method, and as is associated with page 11 of the preferred Web Site.

FIG. 14 outlines and summarizes the tasks and processing associated with the shipping functions of the preferred system embodiment and method. This processing is implemented in the preferred system embodiment and method as page 10 of the Web Site.

These shipping functions, tasks and capabilities are initiated by logging on and opening the Shipping page (block 960). The System Administrator or other authorized person performs this login by clicking on the appropriate portion of the display to cause login processing to occur. Optionally but preferably, a user ID and password must be entered to gain access to the shipping-related information and processing capabilities.

Upon logging in, a display lists the prioritized list of "Shipping Queue" entries (block 962). The priority may and preferably is automatically set by the date and time a particular item was placed on the Shipping Queue. In the preferred system embodiment and method, however, this priority may be modified by the user. In addition, again, optionally but preferably, the preferred system method may include a set of criteria in related processing for adjusting the priority automatically.

The System Administrator or his or her delegate, in conjunction with the preferred system embodiment and method, processes a shipping order on the Shipping Queue by selecting that item, for example, by clicking on it (block 964). This causes the system to print a set of bar coded labels based on information associated with the internal identification number or code for the subscriber whose order is being processed. See block 966. The preferred system and method then prepare appropriate documents that will accompany the shipment, for example, a welcome letter or brochure, informational materials, and/or other relevant materials (block 968). The preferred system embodiment and method optionally but preferably also may comprise the ability to choose particular welcome material or materials based on information about the subscriber in question (block 970). Where the materials are to be physically sent to the subscriber, for example, through the mails, the system user or another authorized person or persons will physically prepare the package that is to be forwarded to the subscriber (block 972). The system user then preferably but optionally will record this status (block 974). If for some reason a decision is made not to send the materials, an appropriate notation is made, e.g., at block 976. If the item is actually shipped, this fact is recorded, e.g., at block 978. Processing then may be returned to handle the next shipping item on the Shipping Queue, e.g., process control is returned to block 964, as indicated in FIG. 14. When all of the outstanding items on the Shipping Queue have been processed, or when the user elects to terminate the shipping order processing tasks, he or she logs out of the shipping processing section (block 980).

Also in connection with customer service processing, the preferred system embodiment and method comprises a "Receiving" aspect or section for processing receipt of materials from registered subscribing talent. The "Receiving" functionality, which in the presently preferred system embodiment and method are part of or associated with Web page 10, are initiated, the System Administrator or other authorized person logs on to the "Receiving" section by undertaking the receiving login procedure (block 1000). Similarly to the "Shipping Login" (block 960), this optionally but preferably involves providing a user ID and password.

Receiving typically involves physical receipt of subscriber talent information, typically in the form of a resume, typically based on the template portfolio or resume and other materials provided to the subscriber as part of the shipping function, e.g., as outlined in FIG. 14. These items in this illustrative embodiment and method typically will include the bar coding provided as part of block 966 in FIG. 14. The user removes items received from the subscriber talent, and uses bar code scanner 42 to read these bar codes (block 1002). When this bar code information is scanned into computer 12, the processor causes the "Checklist" entry screen for the individual subscriber talent automatically to be displayed on monitor 50 (block 1004). The user then enters or records that these items have been received into the checklist (block 1006). Other appropriate notations such as the date and time received and/or recorded, notes or comments regarding the received items, etc. also may be recorded. Preferably but optionally the date and time that these items are added to the checklist are automatically recorded. After the newly received items have been recorded on the checklist, the user closes the checklist (block 1008), and, either manually or automatically, the checklist or the newly added receipt entries are forwarded to the quality assurance queue (block 1010). If there are additional items that have been received and need to be recorded, processing returns to block 1002 in FIG. 15. Otherwise, the user logs out (block 1012).

In accordance with the preferred system embodiment and method, quality assurance is undertaken to provide reasonable measures that the quality of the talent information, and particularly subscriber talent information, is of satisfactory quality, consistency, etc. Accordingly, the preferred system embodiment and method comprise a Quality Assurance Queue to manage quality assurance tasks (block 1020). This quality assurance functionality in the preferred system and method are initiated by the user pulling up or otherwise accessing or activating the Quality Assurance Queue (block 1020). This may be done by clicking on an appropriate icon or button, etc. When this is done, the system is configured to receive bar code information scanned from bar code reader 42 (block 1022). When the bar code information from bar code scanner 42 is inputted into computer 14, e.g., more specifically into processor 22, the system and method use this information to activate, access or otherwise make available the Checklist for the performing artist or subscriber talent identified by the bar coded information (block 1022).

The talent information is then reviewed for quality assurance, preferably including reviews for appropriate content, format, etc. (block 1023). This review may be implemented in a number of ways. For example, OCR/Scanner 40 may be used to scan photographic or graphical material and image processing algorithms used to assess the quality of the scanned material. Similarly, where the file has been previously digitized, quality assurance software, such as image processing software, may be used to evaluate the quality and determine whether it is acceptable. This review process also may be, and preferably is, formed at least in part by the System Administrator or other authorized user of the preferred system and method. Pursuant to this review, it is determined as part of block 1024 whether the format of the item in question can be viewed or read satisfactorily. If it cannot, the portfolio and/or Checklist are marked to indicate that the format is unacceptable (block 1026). If there are other items to be processed, process control returns to block 1022 where the next item may be scanned to obtain its bar code information and bring up the appropriate checklist. If the format is acceptable as determined at block 1024, the content is checked to determine whether it is satisfactory. This may be done automatically, semi-automatically, or manually. If the content is unsatisfactory, the checklist is modified and/or the portfolio updated to indicate this fact (block 1030).

If the format can be viewed (block 1024) and the content is acceptable, (block 1028), then the decision is made whether the format requires conversion (block 1032). This normally would be performed manually, although that is not necessarily the case. If it is determined that the format requires conversion at block 1032, this fact is indicated in the quality assurance record or queue, and or in the portfolio for the talent in question, and processing may be returned to block 1022 to begin processing for the next item. The item in question also will be transferred to file conversion processing, which will be discussed in greater detail below.

If the format does not require conversion as determined at block 1032, the item is added to the portfolio or talent file with a "Ready" Status associated with it (block 1036). The item itself is marked with the source "Q" information and operator identification (1038). An appropriate flag or other indication then is forwarded "New Registration Q" (block 1040). This completes the principal components of processing for the performance of quality assurance on a particular item. If there are additional outstanding items in the Quality Assurance Q to be processed, process control and/or tasking is returned to block 1022 to initiate processing for that next item. If there are no more items to be processed under quality assurance, or if user elects to terminate quality assurance processing, he or she logs out, as indicated at block 1042.

It is noted above that some of the talent information material received from the performing artist, typically a subscriber talent, requires file conversion. Accordingly, the preferred system embodiment and method include the ability to conduct this file conversion and/or to manage and create an appropriate document this file conversion. The tasks, capabilities and processing for this file conversion aspect are outlined in FIG. 17. File conversion 1050 as implemented in the preferred system embodiment and method comprises conversion from one digital format to another (block 1052), conversion from a non-digital format to a digital format (block 1054), and conversion, updating or modification of a text file or other data entry-type file (block 1056).

Figure 17:
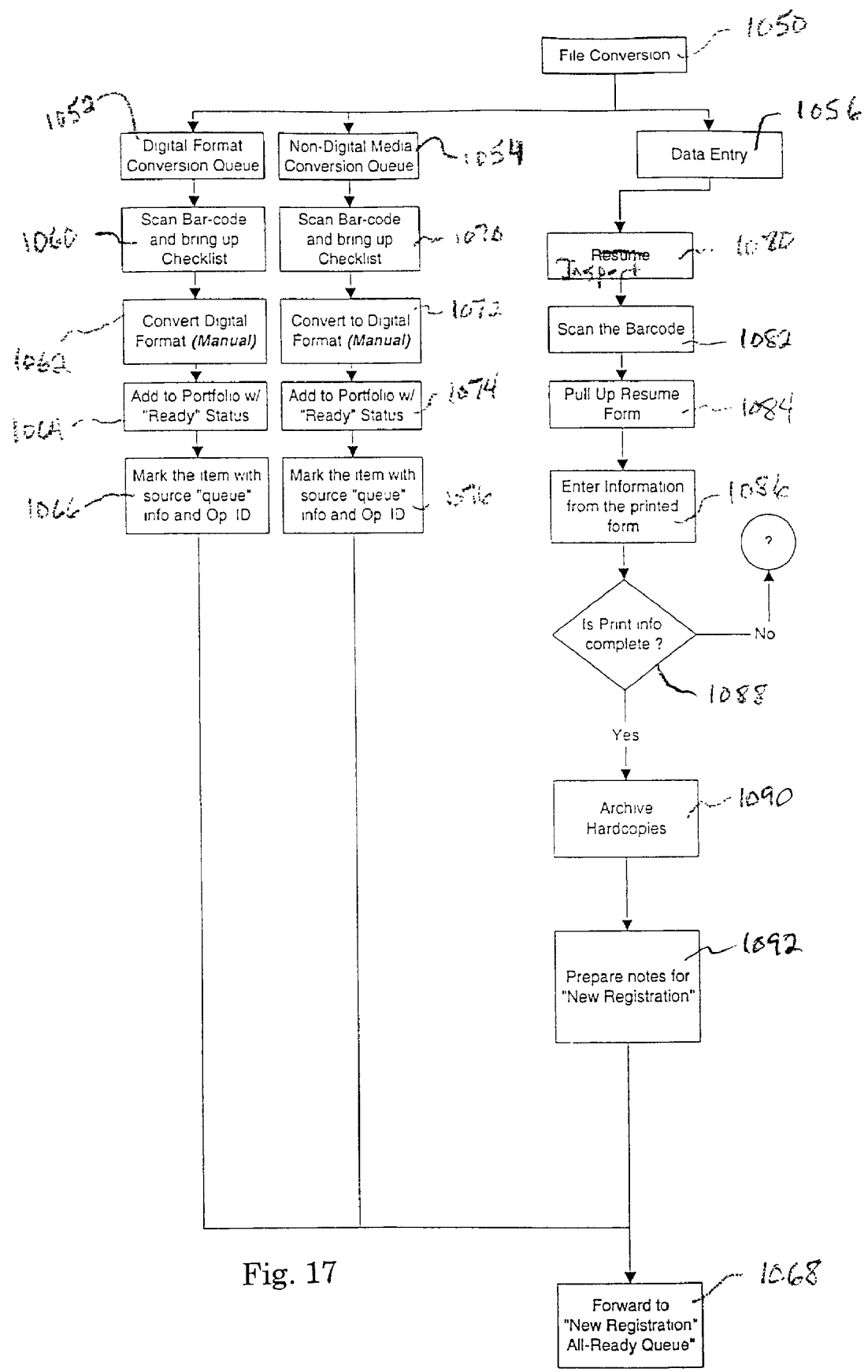
FIG. 17 is a flow diagram illustrating processing associated with "File Conversion" in accordance with the preferred system embodiment and method, and as is associated with page 12 of the preferred Web Site.

In some instances an item is received from a registrant, most notably a subscriber performing artist, that is in a digital format, such as a digital photograph or graphic to a different format. For example, it may be necessary, appropriate or desirable to convert a file provided by the performing artist in a GIF format to a JPG format. Processing for this conversion in the preferred system embodiment and method may be implemented as follows. The barcode attached to or associated with the item to be converted is first scanned, which causes the Checklist for the performing artist in question (block 1060). The format of the item is then converted to the desired format (block 1062), which may be done automatically or semi-automatically, but preferably is performed with manual input using appropriate conversion hardware and software. If the conversion is satisfactory, the item in its newly converted format may then be added to the talent file or portfolio, and the checklist may be modified to indicate a "Ready" status (block 1064). The item may be marked with the appropriate source Q information and the identification code or designation for the operator conducting or managing the conversion (block 1066). An appropriate flag or indication has been forwarded to the "New Registration All Ready Q" (block 1068).

Where an item received from a performing artist registrant is in a non-digital format and conversion to an appropriate digital format is required, the conversion is processed pursuant to blocks under block 1054 in FIG. 17. Again, the user uses bar code scanner 42 to scan the barcode on or associated with the item. This causes the Checklist for the talent in question to be retrieved and displayed (block 1070). The item is then converted to the appropriate format (block 1072), which may be done automatically, semi-automatically, or under manual control. If the conversion is satisfactory, the newly-converted item in the new digital format is added to the appropriate talent file or portfolio, and it is given a "Ready" status (block 1074). The item is then marked with the source Q information and operator ID (block 1076).

Where a resume or other text document is received and required conversion or modification (block 1056) the following processing occurs with respect to the preferred system embodiment and method. The document is first inspected (block 1080), and the barcode on or associated with it is scanned (block 1082). This causes the appropriate form document, such as a résumé form or template portfolio to be retrieved (block 1084). The information is then entered from the received item into the form document (block 1086). If the information provided by the performing artist is satisfactory and complete and has been properly converted into the appropriate form, processing is performed to save the document, forward or incorporate them into the appropriate talent file, and appropriate archive copies are saved. During this part of this process, an inquiry is made to determine whether the print information is complete (block 1088). If the print information is complete, a hard copy of the documents is printed out (block 1090). The note and other information may be prepared, entered or otherwise associated with the modified or archived documents or files (block 1092). An appropriate indication has been forwarded or made to the "New Registration All Ready Q" (block 1068).

Figure 18:
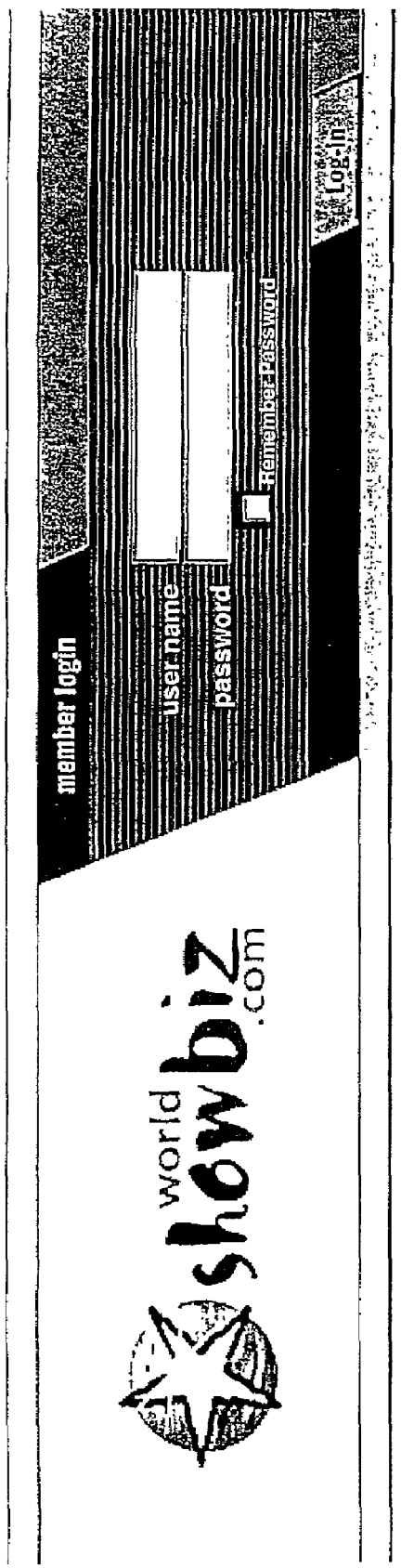
FIG. 18 is an illustrative opening page for the Web Site according to the presently preferred system embodiment and method.

FIGS. 18-37 provide presently preferred but merely illustrative versions of the pages and screens of the Web Site according to the presently preferred system embodiment and method. FIG. 18 is an illustrative opening page for the Web Site. It includes fields for entry of a user name and password.

FIG. 19 shows an illustrative Agency Administration page for the Web Site, in which the Clients tab has been selected. This page and screen provide a listing of the clients of the agent's agency. Each row represents a client entry. Each client entry comprises a name, photo or headshot, the agent or agents, and possibly other information. By selecting the box to the left of the photo, the client may be selected, thus causing the system and method to display additional information about the selected client.

Figure 20:
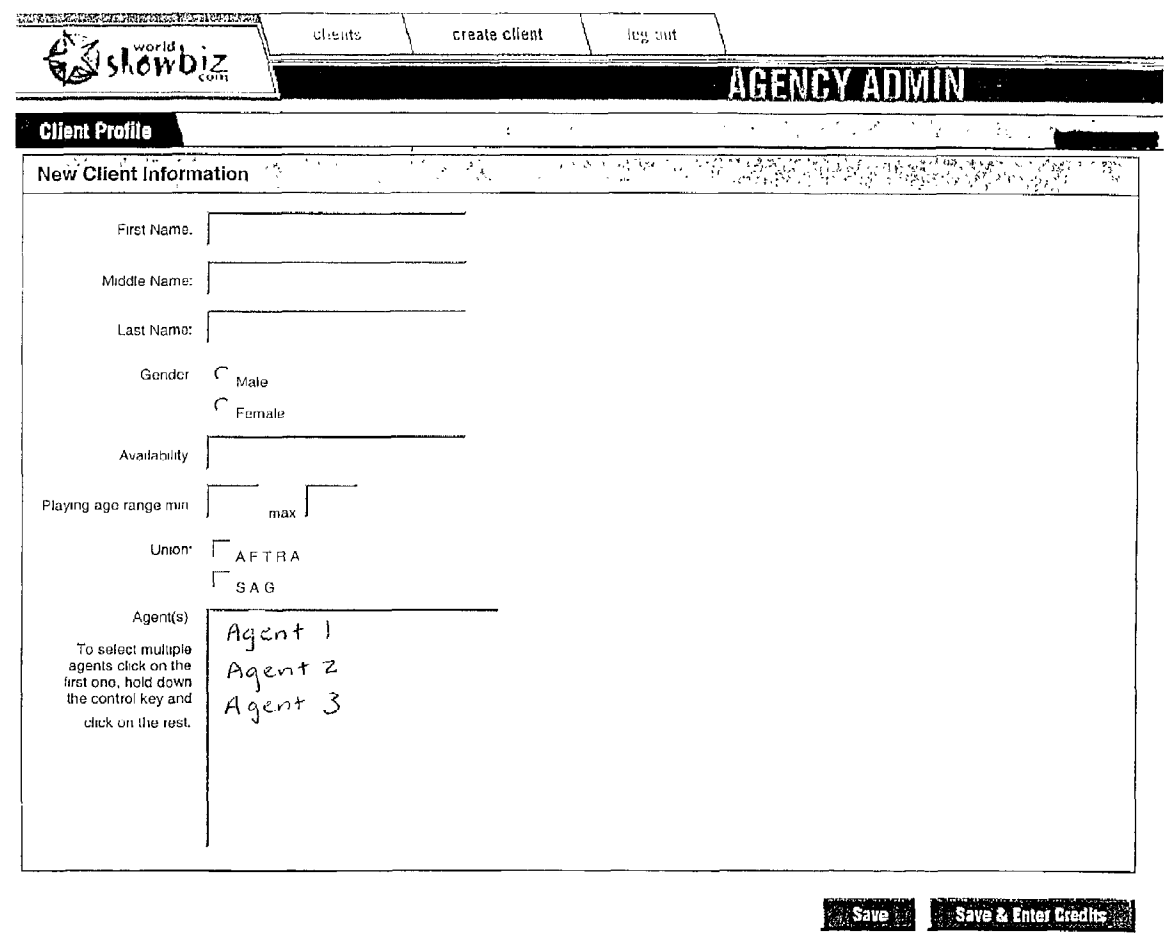

FIG. 20 shows a screen that is part of the Agency Administration page of FIG. 19, wherein the Create Client tab has been selected. This would occur when a new performing artist is to be added as a new client for that agency. Fields are provided for the relevant information for that performing artist, such as name, gender, availability, age ranges, union memberships or affiliations, agent or agents, and the like.

FIG. 21 shows a screen that is part of the Agency Administration page of FIG. 19, wherein the Portfolio tab has been selected. This screen displays the basic client portfolio information. This screen indicates what the portfolio for the client includes, e.g., whether there are video clips, credits, etc.

Figure 22:
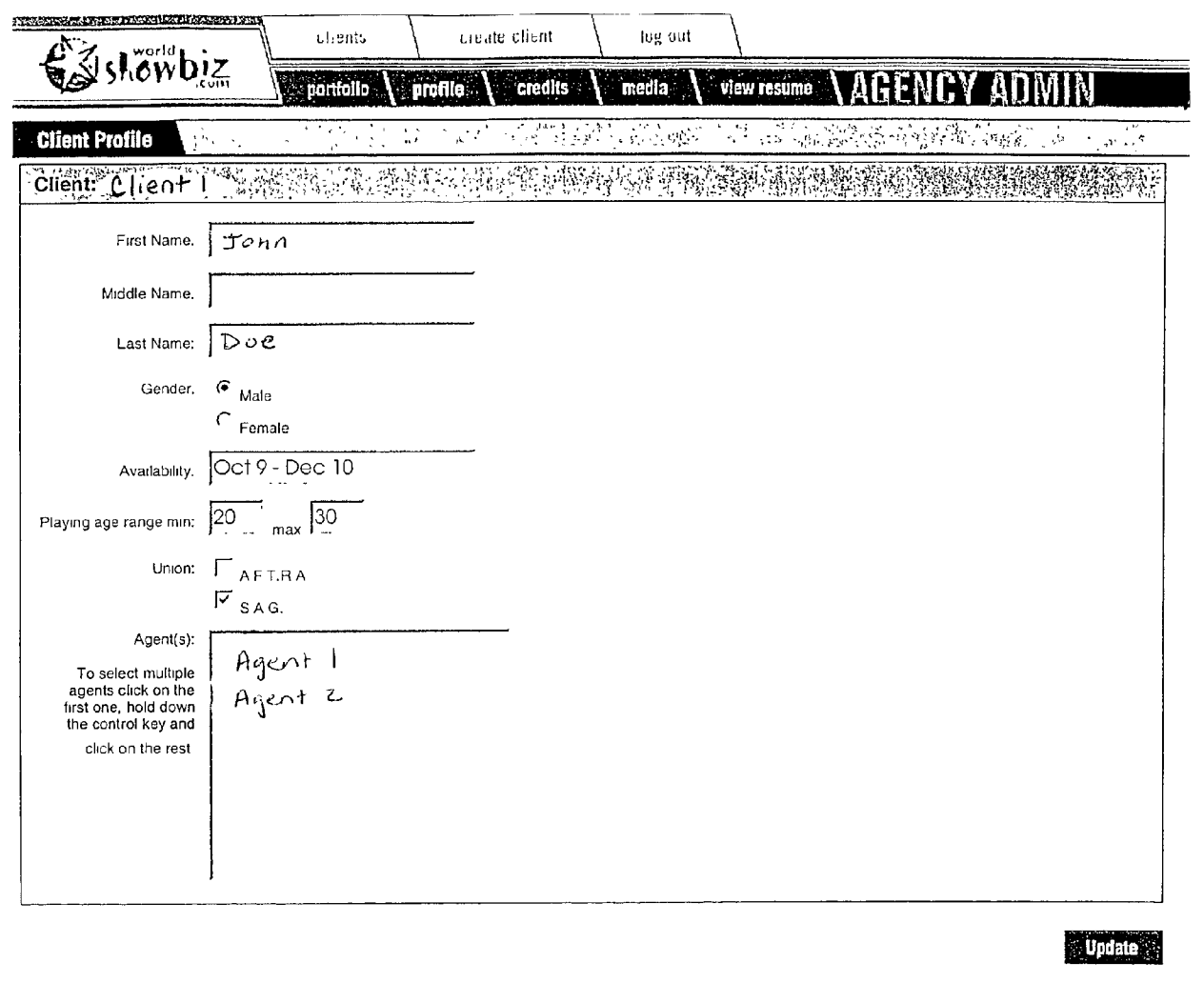

FIG. 22 shows a screen that is part of the Agency Administration page of FIG. 19, wherein the Client Profile tab has been selected. This profile includes basic information concerning the clients, similar to that entered for the new client as shown in FIG. 20.

Figure 24:
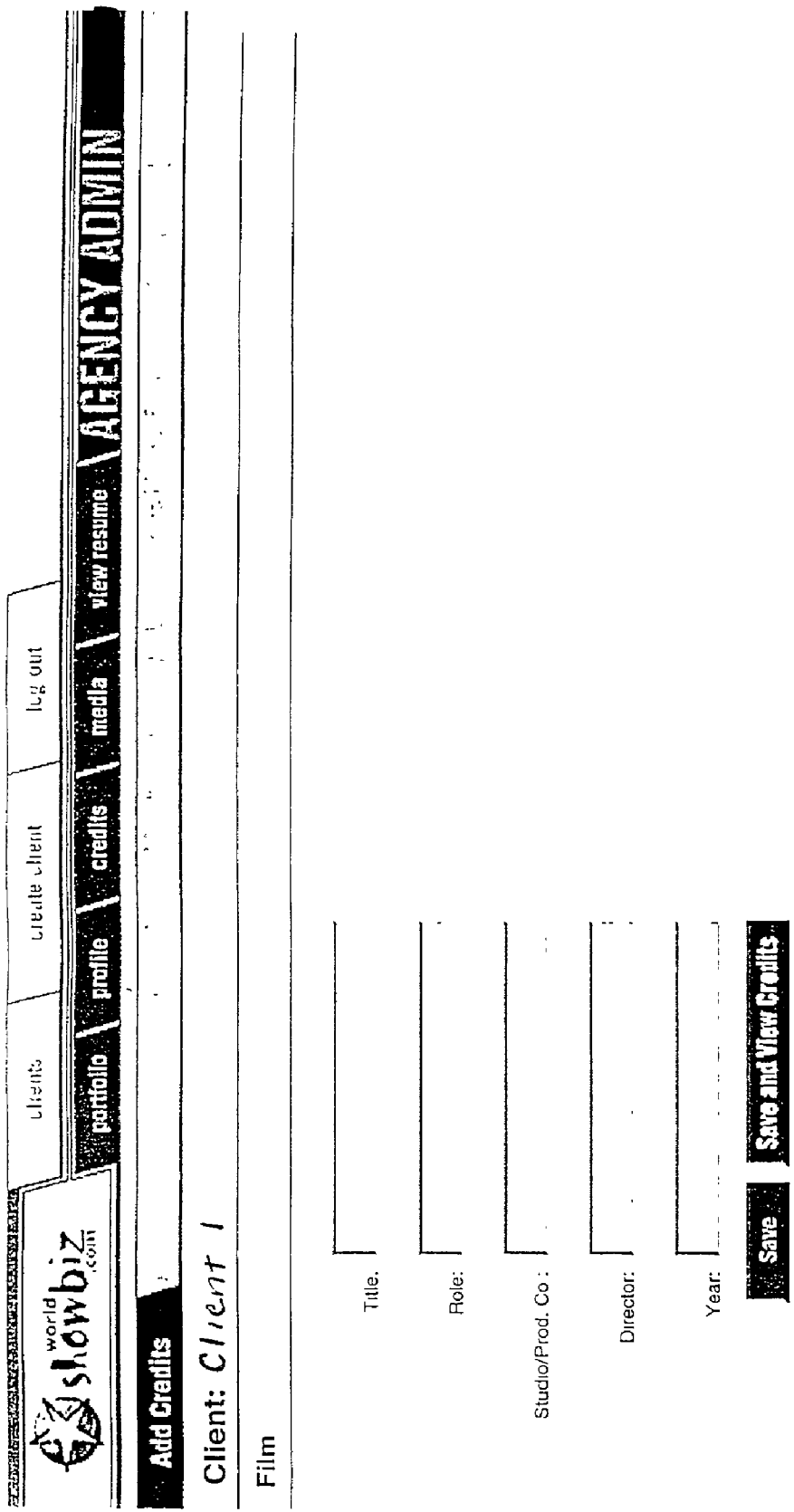
FIG. 24 shows a screen that is part of the Agency Administration page of FIG. 19, wherein the Add button of FIG. 23 has been selected.

FIG. 23 shows a screen that is part of the Agency Administration page of FIG. 19, wherein the Credits tab has been selected. This screen displays the credits for that client as recorded in his or her talent file. Add buttons are provided at the right portion of the screen to add additional credits. FIG. 24 shows a screen that is part of the Agency Administration page of FIG. 19, wherein the Add button of FIG. 23 has been selected. This screen provides fields corresponding to a credit, and provides a means to enter new credit information. FIG. 25 shows a screen that is part of the Agency Administration page of FIG. 23, after information has been added according to FIG. 24.

Figure 26:
FIG. 26 shows a client Resume as displayed when the View Resume button of FIGS. 21-25 is selected.

FIG. 26 shows a simplified illustrative client Resume as displayed when the View Resume button of FIGS. 21-25 is selected.

FIG. 27 shows a screen that is part of the Agent Web page according to the presently preferred system embodiment and method, wherein the Portfolio tab has been selected for a particular client. It provides basic portfolio information regarding the talent file of a particular performing artist managed or represented by the agent using the system.

Figure 28:
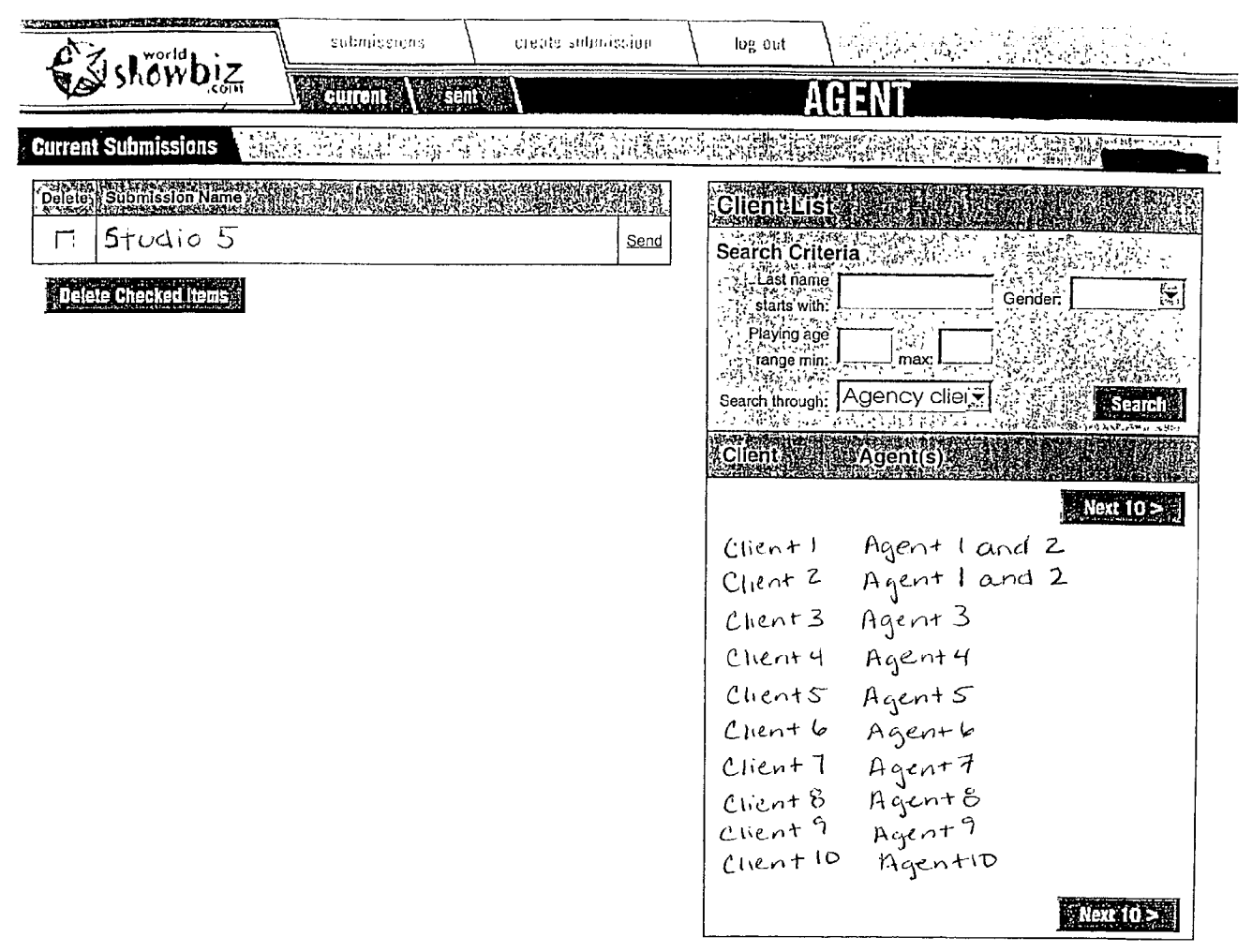

FIGS. 28-37 relate to the preparation, forwarding, and viewing of a submission. FIG. 28 shows an illustrative Agent page for the Web Site according to the presently preferred system embodiment and method, wherein the Current tab has been selected. This screen shows the agent a listing of the submissions that he or she has created and which are current. A submission is considered current in this preferred implementation if it has been created and has not yet been closed, archived or deleted. The display optionally may provide such information for a given submission as its current status (e.g., draft, sent with no response, sent with response, etc.), the date it was last updated, sent, etc. By selecting a given submission, for example, by clicking on it with the mouse, a new screen with information on the selected submission is presented.

The Current Submissions screen (FIG. 28) also provides a client list for that agent, and optionally a client list for all performing artists represented by the agency for whom that agent has been given talent file access. By selecting a given client, a new page presenting information for the selected client appears. A search capability also is provided in the Current Submission window or page, for example, to enable the agent to search for clients or others that meet certain search criteria. The search criteria may be selected based upon the particular application to which the system and method are being put.

Figure 29:
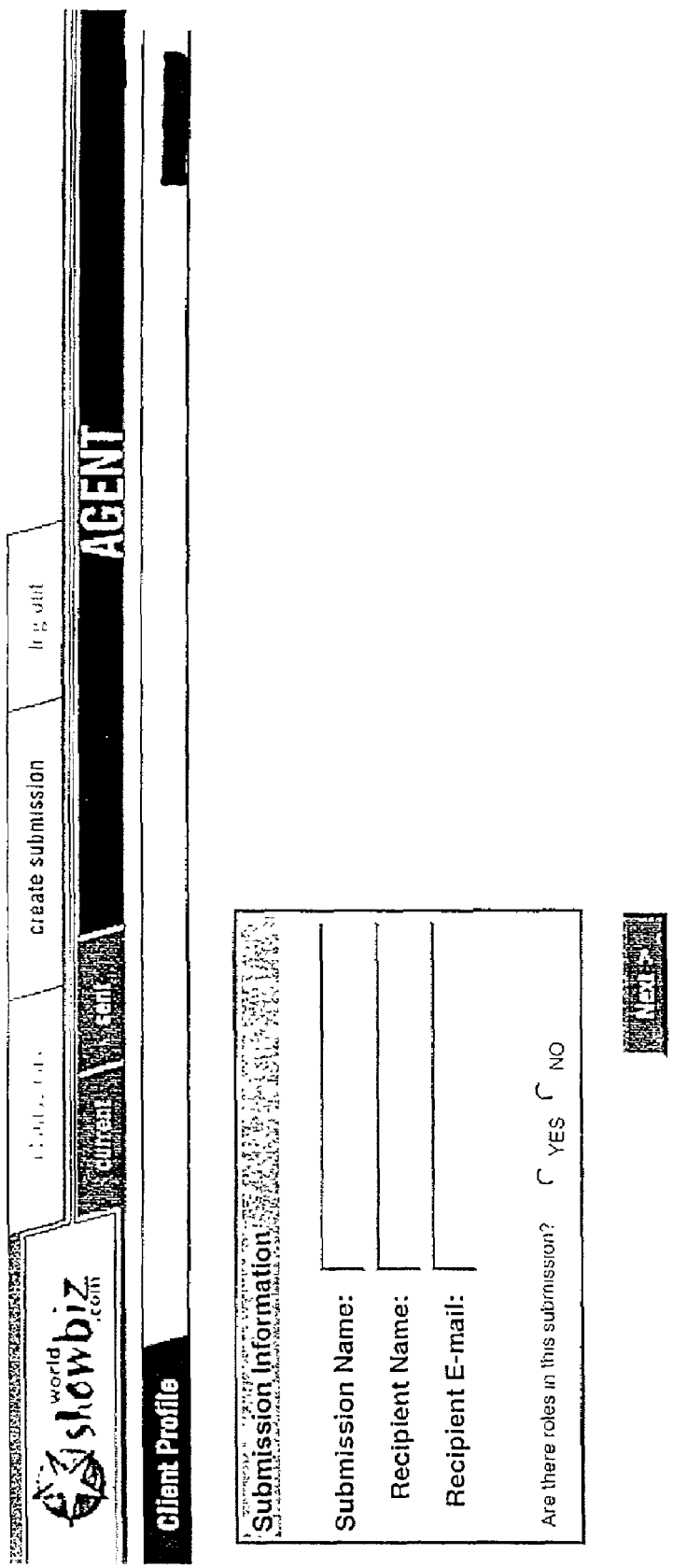
FIG. 29 shows a screen that is part of the Agent Web page of FIG. 28, wherein the Create Submissions tab has been selected.

FIG. 29 shows a screen that is part of the Agent Web page of FIG. 28, wherein the Create Submissions tab has been selected. This screen may be used to initiate preparation of a new submission. Fields are provided for entry of the submission name, the name of the recipient, and the e-mail or network address of the recipient.

Figure 30:
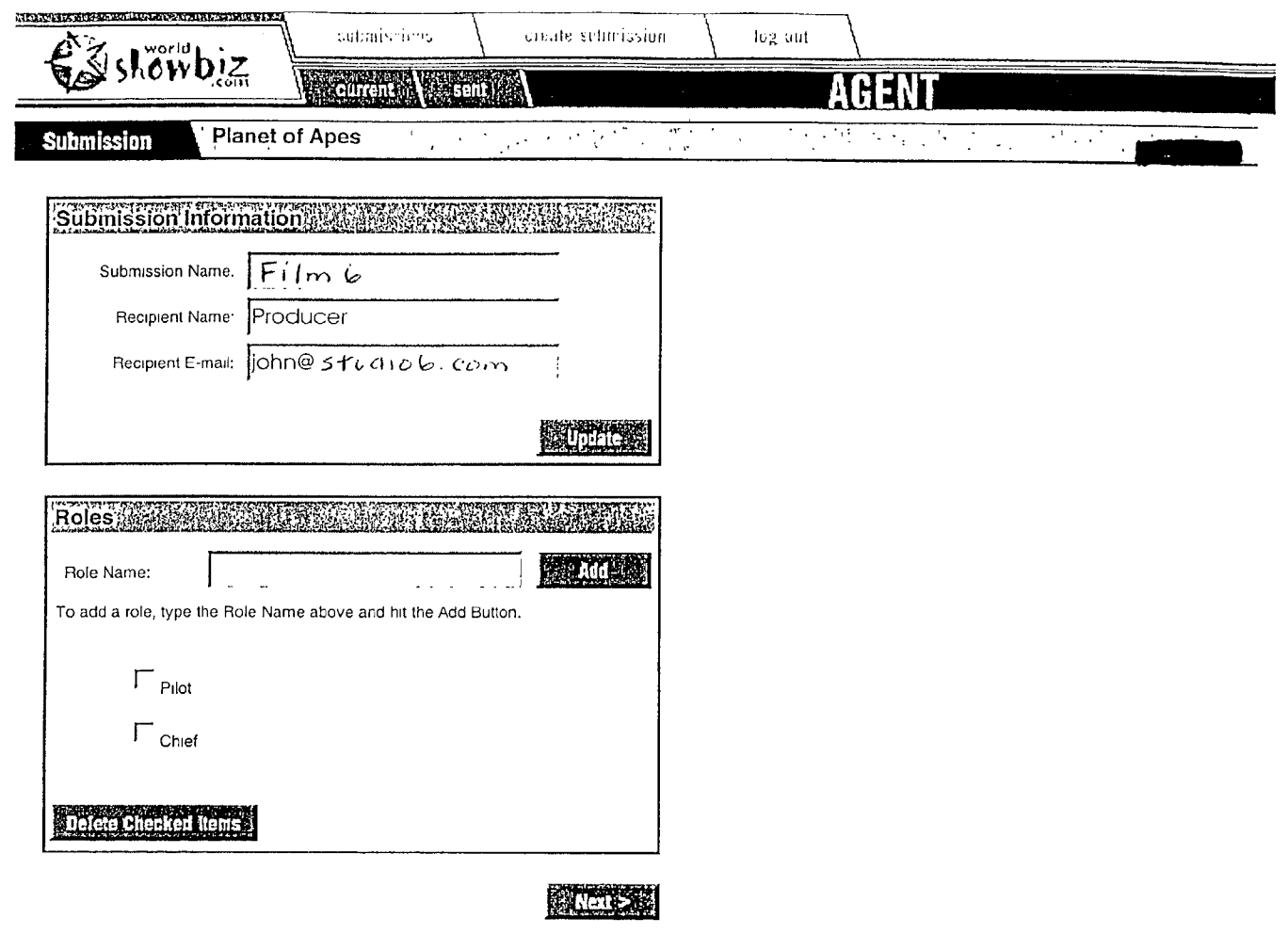

Upon entry of the appropriate information in the fields provided in FIG. 29 and selection of the Next button, the screen shown as FIG. 30 appears. FIG. 30 shows a screen that is part of the Agent Web page of FIG. 28, wherein information for the newly-created current submission is shown. It also includes a field for roles associated with the project for which the submission is being made. The agent may place the cursor in the "role name" field and add a name and/or description for the role. Additional descriptions or information also may be added. The Roles box also includes an "Add" button. As roles are added, the name or description of the role is added below the Role Name Field. In FIG. 30, for example, roles have been added for a "pilot" (a female role) and a "chief" (a male role).

Figure 31:
FIG. 31 shows a screen that is part of the Agent Web page of FIG. 28, wherein a new Role has been added for the submission by selecting the Add button in the page of FIG. 30.

Upon entry of the roles information in FIG. 30, revised Current Submission screen appears as shown in FIG. 31. It displays separate entries for each of the roles entered as part of the processing through the screen of FIG. 30. Performing artists may be selected for each role by selecting or highlighting the role, and then selecting a performing artist or artists for that role from the current client list, by searching based upon a set of search criteria as defined, for example, in this screen, or by other methods.

Figure 32:
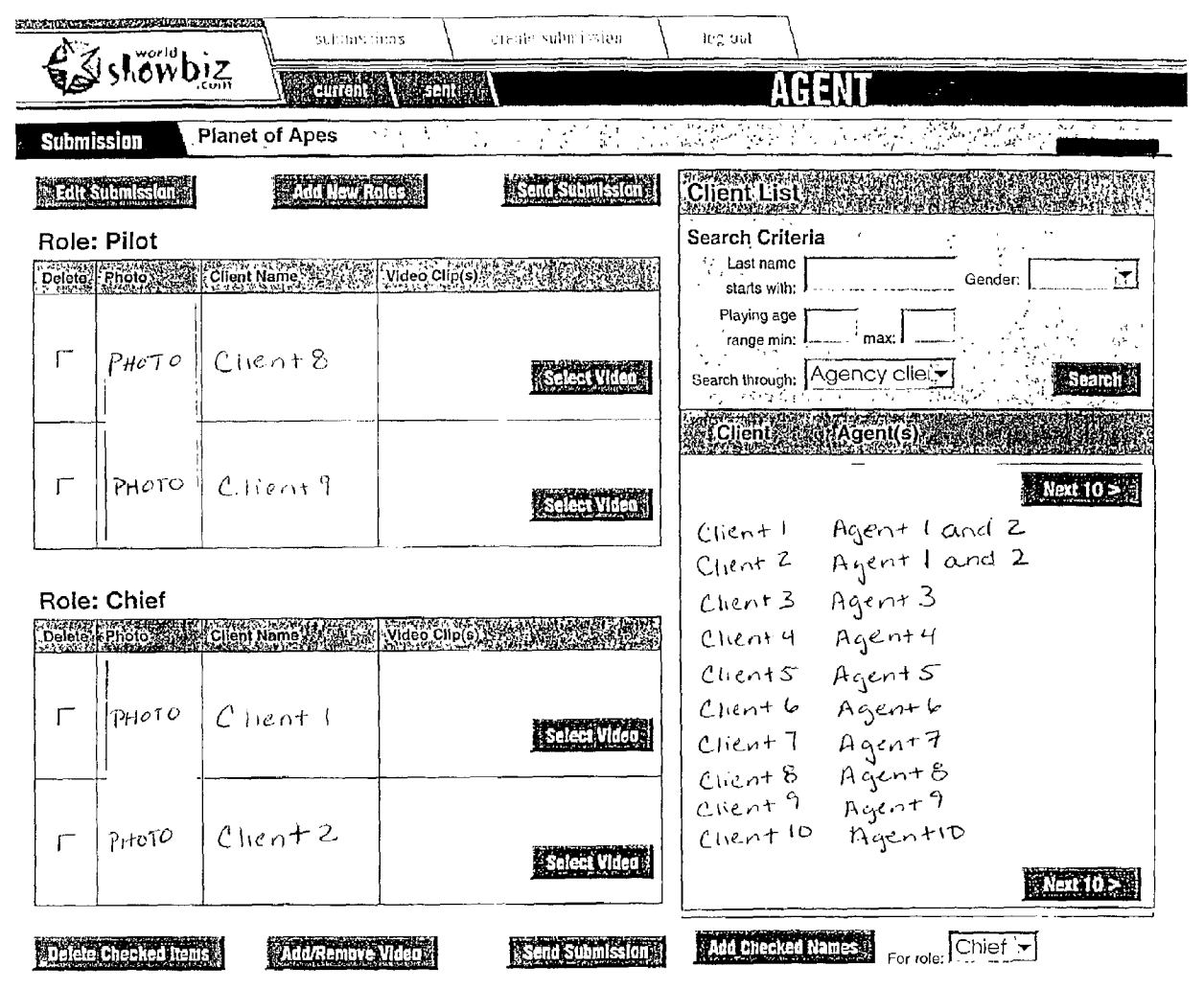

FIG. 32 shows a screen that is part of the Agent Web page of FIG. 28, wherein performing artists have been selected as part of a submission. The format of this screen is similar to that of FIG. 31, but performing artist selection information is included.

Figure 33:
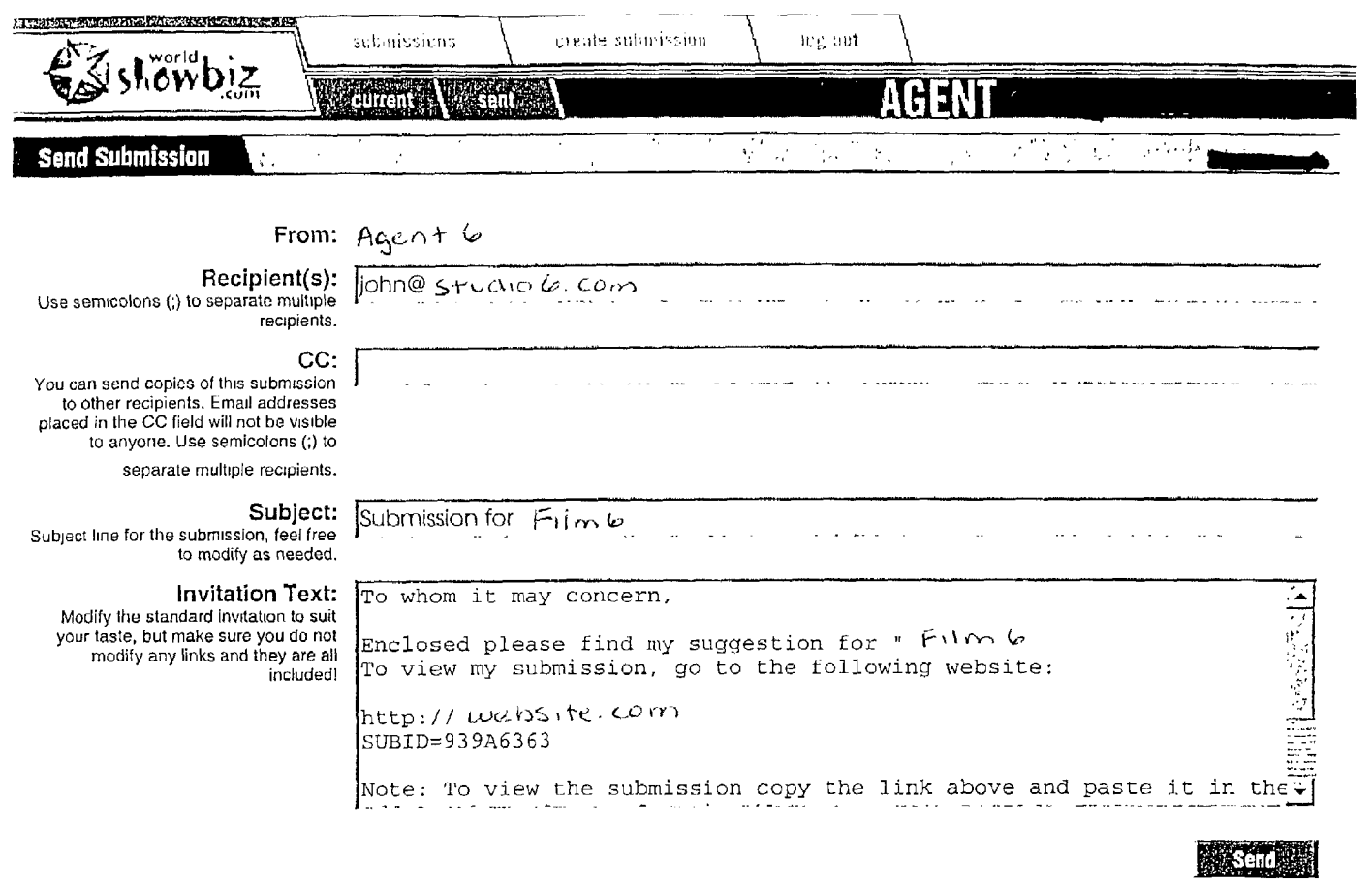
Figure 34:
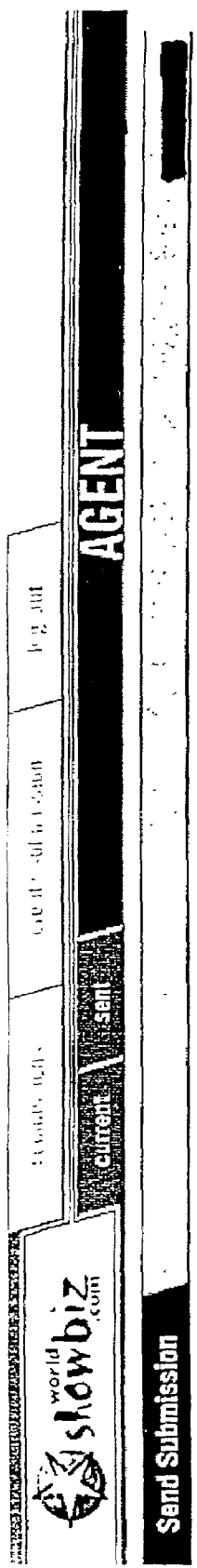
FIG. 34 shows a screen that is part of the Agent Web page of FIG. 28, and which indicates that the submission was sent.

FIG. 33 shows a screen that is part of the Agent Web page of FIG. 28 and that is used to send or forward the submission. It includes fields for recipient information, a brief description of the subject matter, a brief note, etc. It includes a "Send" button to actually cause the submission to be sent. FIG. 34 shows a screen that is part of the Agent Web page of FIG. 28, and which indicates that the submission was sent. This screen appears on the agent's screen to confirm that the submission has been properly sent.

Figure 35:
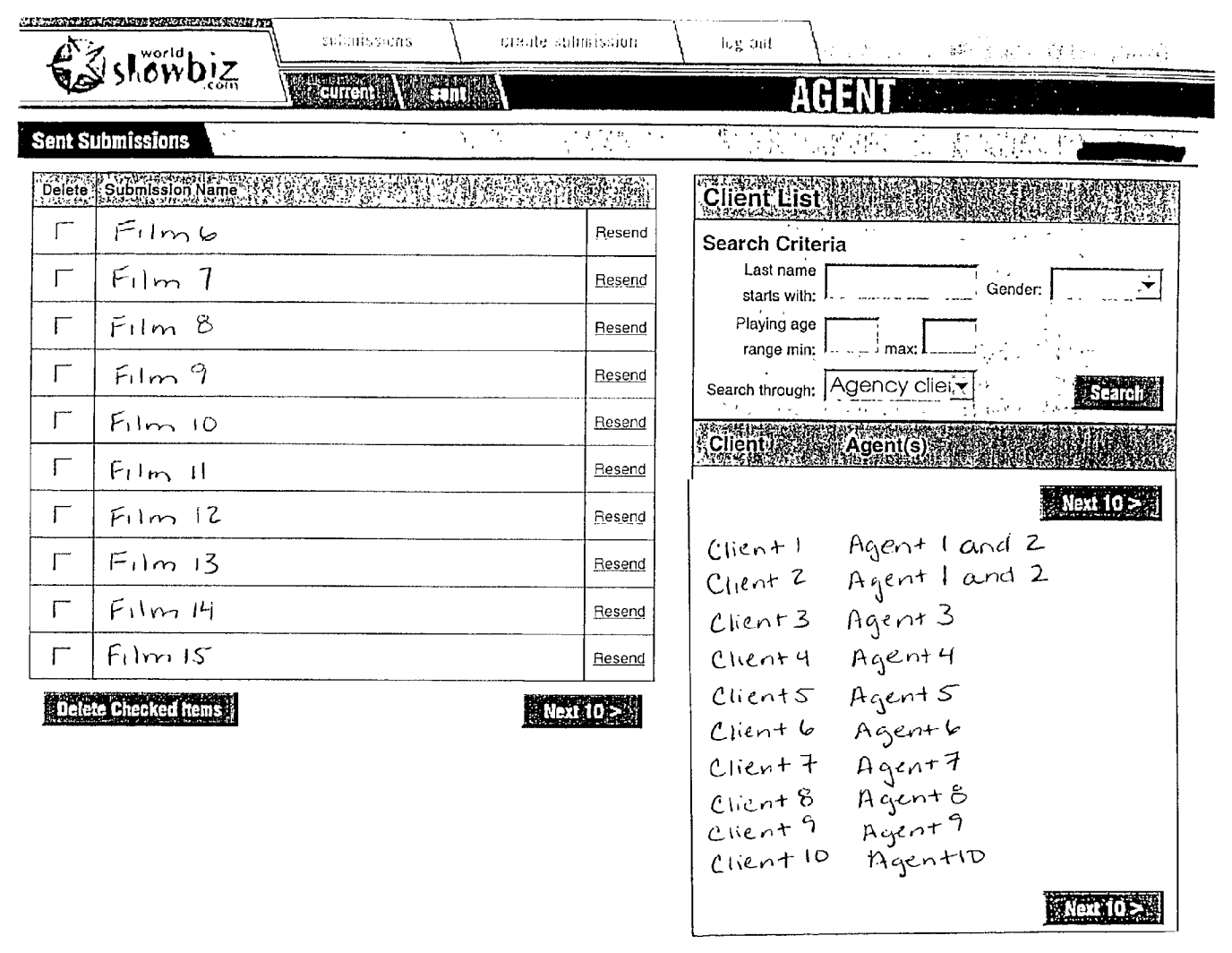

FIG. 35 shows a screen that is part of the Agent Web page of FIG. 28, wherein the Sent Submissions tab has been selected. On the left is a list of the submissions that have been made by the agent. Any one or combination may be selected. Buttons also are provided to resend the submissions.

Figure 37:
FIG. 37 shows a sample of the submission.

FIG. 36 shows a screen that includes an e-mail message to the intended recipient of the submission, indicating that the submission has been sent. FIG. 37 shows a sample of the submission as it would be viewed by the recipient.

It should be noted that the description of the preferred embodiment and method have included agents and agencies, but that these are not necessarily limiting. They have been used in part to illustrate the principles wherein talent representatives and talent representative entities perform their roles. Accordingly, other forms of talent representatives and talent representative agencies could be used or involved. In addition, it has been assumed in parts of the discussion of the preferred implementation herein that professional talent are represented by talent representatives, whereas subscriber talent are not. This also is not necessarily limiting.

Additional advantages and modifications will readily occur to those skilled in the art. Therefore, the invention in its broader aspects is not limited to the specific details, representative devices and methods, and illustrative examples shown and described. Accordingly, departures may be made from such details without departing from the spirit or scope of the general inventive concept as defined by the appended claims and their equivalents.

What is claimed is:

1. A method for facilitating transactions involving a plurality of performing artists and a plurality of talent representative entities, each of the performing artists being associated with one of the talent representative entities, the method comprising:

storing on a machine-readable medium a plurality of talent files, each of the talent files being associated with one of the plurality of performing artists and comprising talent information for the one of the plurality of the performing artists;

enabling access to the stored talent file of the one of the plurality of performing artists by the one of the talent representative entities associated with the one of the plurality of performing artists; and denying access to the talent file of the one of the plurality of performing artists by the talent representative entities other than the one of the talent representative entity associated with the one of the plurality of performing artists.

2. A method as recited in claim 1, wherein the talent representative entity comprises a talent representative.

3. A method as recited in claim 1, wherein the talent representative entity comprises a talent agent.

4. A method as recited in claim 1, wherein the talent representative entity comprises a talent agency.

5. A method as recited in claim 4, wherein the talent representative entity comprises a plurality of talent agents within the talent agency.

6. A method as recited in claim 1, wherein the talent representative entity comprises a group of affiliated talent agencies.

7. A method as recited in claim 1, wherein the talent representative entity comprises a talent manager.

8. A method as recited in claim 1, wherein:

the one of the talent representative entities comprises a plurality of talent representatives, one of the talent representatives of the one of the talent representative entities being associated with the one of the plurality of the performing artists;

the enabling of access to the stored talent file of the one of the plurality of performing artists by the talent representative entity comprises enabling access to the stored talent file of the one of the plurality of performing parties to the talent representative associated with the one of the plurality of performing artists and denying access to the talent file of the one of the plurality of performing artists to talent representatives of the one of the talent representative entity other than the talent representative associated with the one of the plurality of performing artists.

9. A method as recited in claim 1, further including:

designating selected ones of the talent files as restricted access talent files, and associating with each of the restricted access talent files a restricted access talent file identifier; and enabling a talent information user to have access to the restricted access talent file identifiers, but denying the talent information user access to the talent information that comprises the restricted access talent files.

10. A method as recited in claim 1, further including:

designating selected ones of the talent files as restricted access talent files; and enabling a talent information user to conduct a search of the stored talent information to obtain a search output comprising at least one of the restricted access talent files, the search output excluding the talent information for each of the at least one restricted access talent files but including a restricted access talent file identifier for each of the at least one restricted access talent files in the search output.

11. A method as recited in claim 1, further comprising:

issuing at least one guest pass for a guest pass accessible one of the talent files;

communicating the at least one guess pass to a guest pass holder; and enabling access to the guest pass accessible one of the talent files to the guest pass holder.

12. A method for facilitating transactions involving a plurality of performing artists, talent representatives and talent representative organizations, each of the performing artists being associated with one of the talent representative organizations, the method comprising:

storing on a machine-readable medium a plurality of talent files, each of the talent files being associated with one of the plurality of performing artists and comprising talent information for the one of the plurality of the performing artists;

designating a talent representative organization administrator for each of the talent representative organizations;

using the talent representative organization administrator for one of the talent representative organizations to designate selected ones of the talent representatives within the one talent representative organization to be an authorized talent representative, the talent representative organization administrator having authority exclusive of the talent representatives of the one talent representative organization to make the designation of the authorized talent representative;

enabling access by the authorized talent representative to the stored talent files of the performing artists associated with the one of the plurality of the talent representative organizations; and denying access to the talent files of the performing artists associated with the one of the talent representative organizations by the talent representatives other than the authorized talent representative.

13. A method as recited in claim 12, wherein the talent representative organization administrator designation comprises designating a plurality of talent representative organization administrators.

14. A method as recited in claim 13, wherein one of the plurality of talent representative organization administrators comprises a super user.

15. A method as recited in claim 12, further comprising:

designating a super user for each of the talent representative organizations; and using the super user for the one of the talent representative organizations to designate the talent representative organization administrator.

16. A method for facilitating transactions involving a plurality of performing artists and a talent information user, the method comprising:

storing on a machine-readable medium a plurality of talent files, each of the talent files being associated with one of the plurality of performing artists and comprising talent information for the one of the plurality of the performing artists;

designating selected ones of the talent files as restricted access talent files, and associating with each of the restricted access talent files a restricted access talent file identifier; and enabling the talent information user to have access to the restricted access talent file identifiers, but denying the talent information user access to the talent information that comprises the restricted access talent files.

17. A method as recited in claim 16, further comprising enabling the talent information user to conduct a search of the stored talent information to obtain a search output comprising at least one of the restricted access talent files, the search output excluding the talent information for at least one restricted access talent files but including a restricted access talent file identifier for each of the at least one restricted access talent files in the search output.

18. A method as recited in claim 16, further comprising:

issuing to the talent information user an authorization pass for the at least one restricted access talent files; and enabling access to talent information in the at least one restricted talent files based upon the authorization pass.

19. A method as recited in claim 16, wherein the authorization pass comprises an access code.

20. A method as recited in claim 16, wherein the authorization pass comprises a password.

21. A method as recited in claim 16, wherein the authorization pass comprises a card.

22. A method as recited in claim 16, wherein the authorization pass enables the talent information user to access the talent information of the at least one restricted talent file for a limited period of time.

23. A method as recited in claim 16, wherein the authorization pass enables the talent information user to access the talent information of the at least one restricted talent file for a limited number of accesses.

24. A method as recited in claim 16, wherein the authorization pass enables the talent information user to access the talent information of the at least one restricted talent file for a limited portion of the at least one restricted talent files.

25. A method for facilitating transactions involving a plurality of performing artists, the method comprising:
storing on a machine-readable medium a plurality of talent files, each of the talent files comprising talent information for the one of the plurality of the performing artists;
issuing at least one guest pass for a guest pass accessible one of the talent files;
communicating the at least one guess pass to a guest pass holder; and
enabling access to the guest pass accessible one of the talent files to the guest pass holder.

26. A method as recited in claim 25, wherein the guest pass comprises an access code.

27. A method as recited in claim 25, wherein the guest pass comprises a password.

28. A method as recited in claim 25, wherein the guess pass comprises a card.

29. A method as recited in claim 25, wherein:
the method further comprises designating registrants and non-registrants; and
the guest pass holder comprises one of the non-registrants.

30. A method as recited in claim 25, wherein access to the one of the guess pass accessible one of the talent files is denied to non-registrants other than the guest pass holder.

31. A method as recited in claim 25, wherein the guest pass holder comprises a talent information user.

32. A method as recited in claim 25, wherein the access enabling comprises enabling access to the guest pass accessible one of the talent files to the gust pass holder for a limited period of time.

33. A method as recited in claim 25, wherein the access enabling comprises enabling access to the guest pass accessible one of the talent files to the gust pass holder for a limited number of accesses.

34. A method as recited in claim 25, wherein the access enabling comprises enabling access to a limited portion of the guest pass accessible one of the talent files.

35. A system for facilitating transactions involving a plurality of performing artists and a plurality of talent representative entities for a system user, each of the performing artists being associated with one of the talent representative entities, the system comprising:
storage means for storing a plurality of talent files, each of the talent files being associated with one of the plurality of performing artists and comprising talent information for the one of the plurality of the performing artists;
processing means operatively coupled to the storage means for processing requests for the talent files and the talent information;
user interface means operatively coupled to the processing means for communicating the requests for the talent files and the talent information, and for communicating the talent files and talent information to the system user; and
access control means operative with at least one of the processing means and the storage means for enabling access to the stored talent file of the one of the plurality of performing artists by the one of the talent representative entities associated with the one of the plurality of performing artists, and for denying access to the talent file of the one of the plurality of performing artists by the talent representative entities other than the one of the talent representative entity associated with the one of the plurality of performing artists.

36. A system as recited in claim 35, wherein the access control means comprises logic means operatively coupled to the processing means for comparing a pre-stored talent representative entity access code with a user-inputted code provided by the system user and, if the pre-stored talent representative entity access code matches the user-inputted code, causing the processing means to enable the system user to have access to the stored talent file of the one of the plurality of performing artists.

37. A system as recited in claim 35, wherein the access control means comprises logic means operatively coupled to the processing means for comparing a pre-stored talent representative access code with a user-inputted code provided by the system user and, if the pre-stored talent representative access code matches the user-inputted code, causing the processing means to enable the system user to have access to the stored talent file of the one of the plurality of performing artists.

38. A system as recited in claim 35, wherein:
the storage means comprises a restricted access talent file code associated with each of restricted access ones of the talent files; and
the access control means comprises logic means operatively coupled to at least one of the processing means and the storage means for using one of the restricted access talent file codes for one of the restricted access talent files and a user-inputted code provided by the system user to selectively cause the processing means to enable the system user to have access to the one of the restricted access talent files associated with the one of the restrictive access talent file codes.

39. A system as recited in claim 38, wherein the access control means comprises logic means for outputting a restricted access talent file identifier code in response to a request for the talent information in the restricted access talent file associated with the restricted access talent file identifier code.

40. A system as recited in claim 38, further comprising:
searching means for enabling the system user to conduct a search of the stored talent files and for creating search results;
search output means for outputting the search results to the system user.

41. A system as recited in claim 38, further comprising:
means for designating selected ones of the talent files as restricted access talent files; and
searching means for enabling a system user to conduct a search of the stored talent information to obtain a search output comprising at least one of the restricted access talent files, the search output excluding the talent information for each of the at least one restricted access talent files but including a restricted access talent file identifier for each of the at least one restricted access talent files in the search output.

42. A system for facilitating transactions involving a plurality of performing artists and a plurality of talent representative entities for a system user, each of the performing artists being associated with one of the talent representative entities, the system comprising:
   a storage subsystem for storing a plurality of talent files, each of the talent files being associated with one of the plurality of performing artists and comprising talent information for the one of the plurality of the performing artists;
   a processing device operatively coupled to the storage subsystem for processing requests for the talent files and the talent information;
   a user interface operatively coupled to the processing device for communicating the requests for the talent files and the talent information, and for communicating the talent files and talent information to the system user; and
   an access control subsystem operative with the processing device for enabling access to the stored talent file of the one of the plurality of performing artists by the one of the talent representative entities associated with the one of the plurality of performing artists, and for denying access to the talent file of the one of the plurality of performing artists by the talent representative entities other than the one of the talent representative entity associated with the one of the plurality of performing artists.

43. A system as recited in claim 42, wherein the access control subsystem comprises a logic device operatively coupled to the processing device for comparing a pre-stored talent representative entity access code with a user-inputted code provided by the system user and, if the pre-stored talent representative entity access code matches the user-inputted code, causing the processing device to enable the system user to have access to the stored talent file of the one of the plurality of performing artists.

44. A system as recited in claim 42, wherein the access control subsystem comprises a logic device operatively coupled to the processing device for comparing a pre-stored talent representative access code with a user-inputted code provided by the system user and, if the pre-stored talent representative access code matches the user-inputted code, causing the processing device to enable the system user to have access to the stored talent file of the one of the plurality of performing artists.

45. A system as recited in claim 42, wherein:
   the storage subsystem comprises a restricted access talent file code associated with each of restricted access ones of the talent files; and
   the access control subsystem comprises a logic device operatively coupled to the processing device for using one of the restricted access talent file codes for one of the restricted access talent files and a user-inputted code provided by the system user to selectively cause the processing device to enable the system user to have access to the one of the restricted access talent files associated with the one of the restrictive access talent file codes.

46. A system as recited in claim 45, wherein the access control subsystem comprises a logic device that outputs a restricted access talent file identifier code in response to a request for the talent information in the restricted access talent file associated with the restricted access talent file identifier code.

47. A system as recited in claim 45, further comprising:
   searching means for enabling the system user to conduct a search of the stored talent files and for creating search results;
   search output means for outputting the search results to the system user.

48. A system as recited in claim 45, further comprising:
   designating selected ones of the talent files as restricted access talent files; and
   searching means for enabling a system user to conduct a search of the stored talent information to obtain a search output comprising at least one of the restricted access talent files, the search output excluding the talent information for each of the at least one restricted access talent files but including a restricted access talent file identifier for each of the at least one restricted access talent files in the search output.

49. A system for receiving talent information from a plurality of talent information providers, the talent information providers comprising a plurality of talent representative entities, and providing the talent information to a plurality of talent information users, the system comprising:
   a storage subsystem for storing the talent information organized into a plurality of talent files, each of the talent files being associated with one of the talent representative entities,
   a processing device operatively coupled to the storage subsystem for processing requests for the talent files and the talent information;
   a user interface operatively coupled to the processing device for communicating requests for the talent information by the talent information users to the processing device, and for communicating the talent files and talent information to the user interface;
   access control means operatively coupled to at least one of the processing device and the storage subsystem for enabling access to the requested talent files associated with the one of the talent representative entities by the one of the talent representative entities, and for denying access to the requested talent files associated with the one of the talent representative entities by others of the talent representative entities; and
   an output device for outputting the requested talent files to the one of the talent representative entities.

50. A system for facilitating transactions involving a plurality of performing artists and a guest pass holder, the system comprising:
   storage means for storing a plurality of talent files, each of the talent files being associated with one of the plurality of performing artists and comprising talent information for the one of the plurality of the performing artists;
   processing means operatively coupled to the storage means for processing a request from the guest pass holder for access to one of the talent files;
   user interface means operatively coupled to the processing means for communicating the request for the one of the talent files and a guest pass code to the processing means, and for selectively communicating the one of the talent files to the guest pass holder; and
   access control means operative with at least one of the processing means and the storage means and responsive to a guest pass code for enabling the access to the one of the talent files by the guest pass holder upon receipt of the guest pass for the one of the talent files.

51. A system as recited in claim 50, wherein the access control means comprises means for enabling the guest pass holder to the access to the one of the talent files for a limited period of time.

52. A system as recited in claim 50, wherein the access control means comprises means for enabling the guest pass holder to the access to the one of the talent files for a limited number of accesses.

53. A system as recited in claim 50, wherein the access control means comprises means for enabling the guest pass holder to the access to a limited portion of the one of the talent files.

54. A system for facilitating transactions involving a plurality of performing artists and a guest pass holder, the system comprising:

a storage subsystem for storing a plurality of talent files, each of the talent files being associated with one of the plurality of performing artists and comprising talent information for the one of the plurality of the performing artists;

a processing device operatively coupled to the storage subsystem for processing a request by the guest pass holder for access to one of the talent files;

a user interface operatively coupled to the processing device for communicating the request for the one of the talent files and a guest pass code, and for selectively communicating the one of the talent files to the guest pass holder; and an access control subsystem operative with at least one of the processing device and the storage subsystem and responsive to a guest pass code provided by the guest pass holder for enabling the access to the one of the talent files upon receipt of the guest pass code.

55. A system as recited in claim 54, wherein the access control subsystem comprises means for enabling the guest pass holder to the access to the one of the talent files for a limited period of time.

56. A system as recited in claim 54, wherein the access control subsystem comprises means for enabling the guest pass holder to the access to the one of the talent files for a limited number of accesses.

57. A system as recited in claim 54, wherein the access control subsystem comprises means for enabling the guest pass holder to the access to a limited portion of the one of the talent files.

\* \* \* \* \*